United States Patent
Nakamura

(10) Patent No.: US 11,014,155 B2
(45) Date of Patent: *May 25, 2021

(54) GEAR, DECELERATION DEVICE, ROBOT, AND MOVING OBJECT

(71) Applicant: Seiko Epson Corporation, Tokyo (JP)

(72) Inventor: Hidefumi Nakamura, Hachinohe (JP)

(73) Assignee: Seiko Epson Corporation

( * ) Notice: Subject to any disclaimer, the term of this patent is extended or adjusted under 35 U.S.C. 154(b) by 758 days.

This patent is subject to a terminal disclaimer.

(21) Appl. No.: 15/637,226

(22) Filed: Jun. 29, 2017

(65) Prior Publication Data

US 2018/0009030 A1   Jan. 11, 2018

(30) Foreign Application Priority Data

Jul. 6, 2016   (JP) .............................. JP2016-134537

(51) Int. Cl.
*F16H 55/06* (2006.01)
*C22C 38/08* (2006.01)
(Continued)

(52) U.S. Cl.
CPC ............ *B22F 1/0003* (2013.01); *B22F 3/001* (2013.01); *B22F 3/162* (2013.01); *B22F 3/164* (2013.01);
(Continued)

(58) Field of Classification Search
CPC ........ B22F 1/0003; B22F 3/001; B22F 3/162; B22F 3/164; B22F 5/08; B22F 2998/10; B22F 3/168; C22C 33/0285; C22C 33/0264; C22C 1/055; C22C 1/053; C22C 19/07; C22C 38/105; C22C 38/14; C22C 38/08; C22C 38/12; F16H 55/06

See application file for complete search history.

(56) References Cited

U.S. PATENT DOCUMENTS 8,702,835 B2   4/2014   Yu et al.
2004/0042926 A1*   3/2004   Shimizu ................ C22C 38/04
420/38

(Continued)

FOREIGN PATENT DOCUMENTS

CN   103600065 A   2/2014
CN   104593693 A   5/2015
(Continued)

OTHER PUBLICATIONS

Arai et al., JP 08-337853A. machine translation. (Year: 1996).*
(Continued)

*Primary Examiner* — John A Hevey
(74) *Attorney, Agent, or Firm* — Harness, Dickey & Pierce, P.L.C.

(57) ABSTRACT

A gear includes a sintered body, in which Fe is contained as a principal component, Ni is contained in a proportion of 2 mass % or more and 20 mass % or less, Si is contained in a proportion of 0.3 mass % or more and 5.0 mass % or less, C is contained in a proportion of 0.005 mass % or more and 0.3 mass % or less, and one element selected from the group consisting of Ti, V, Y, Zr, Nb, Hf, and Ta is defined as a first element, that is contained in a proportion of 0.01 mass % or more and 0.7 mass % or less.

12 Claims, 3 Drawing Sheets

(51) Int. Cl.
  *C22C 38/12*  (2006.01)
  *B22F 1/00*  (2006.01)
  *C22C 33/02*  (2006.01)
  *C22C 1/05*  (2006.01)
  *B22F 3/00*  (2006.01)
  *B22F 3/16*  (2006.01)
  *B22F 5/08*  (2006.01)
  *C22C 19/07*  (2006.01)
  *C22C 38/10*  (2006.01)
  *C22C 38/14*  (2006.01)

(52) U.S. Cl.
  CPC ............... *B22F 5/08* (2013.01); *C22C 1/053* (2013.01); *C22C 1/055* (2013.01); *C22C 33/0264* (2013.01); *C22C 33/0285* (2013.01); *C22C 38/08* (2013.01); *C22C 38/12* (2013.01); *B22F 3/168* (2013.01); *B22F 2998/10* (2013.01); *C22C 19/07* (2013.01); *C22C 38/105* (2013.01); *C22C 38/14* (2013.01); *F16H 55/06* (2013.01)

(56) References Cited

U.S. PATENT DOCUMENTS

| | | | |
|---|---|---|---|
| 2008/0107559 A1* | 5/2008 | Nishiyama | ............ C22C 38/005 420/38 |
| 2010/0258217 A1 | 10/2010 | Kuehmann et al. | |
| 2011/0314965 A1 | 12/2011 | Nakamura | |
| 2011/0319218 A1* | 12/2011 | Imase | ...................... F16H 3/72 475/168 |
| 2012/0082583 A1* | 4/2012 | Kohida | .................... B22F 3/24 419/2 |
| 2012/0082587 A1 | 4/2012 | Yu et al. | |
| 2014/0261918 A1 | 9/2014 | Jin et al. | |
| 2015/0000468 A1 | 1/2015 | Nakamura | |
| 2015/0114178 A1 | 4/2015 | Ishigami et al. | |
| 2015/0252459 A1 | 9/2015 | Tamura et al. | |
| 2015/0273581 A1 | 10/2015 | Nakamura | |
| 2016/0194740 A1 | 7/2016 | Tamura et al. | |
| 2016/0228948 A1 | 8/2016 | Nakamura | |
| 2016/0333450 A1 | 11/2016 | Ikeda et al. | |
| 2017/0192392 A1 | 7/2017 | Nakamura | |
| 2018/0009031 A1* | 1/2018 | Nakamura | ............ B22F 1/0059 |

FOREIGN PATENT DOCUMENTS

| | | | | |
|---|---|---|---|---|
| CN | 105750536 A | 7/2016 | | |
| CN | 105855534 A | 8/2016 | | |
| CN | 106978574 A | 7/2017 | | |
| EP | 0747497 A1 | 12/1996 | | |
| EP | 1640469 A1 | 3/2006 | | |
| JP | 06-279913 A | 10/1994 | | |
| JP | 08337853 A | * 12/1996 | ............... G21C 3/07 |
| JP | H08-337853 A | 12/1996 | | |
| JP | 11-061360 A | 3/1999 | | |
| JP | 2006-233331 A | 9/2006 | | |
| JP | 2007-177675 A | 7/2007 | | |
| JP | 2012-087416 A | 5/2012 | | |
| JP | 2012-527535 A | 11/2012 | | |
| JP | 2013-170295 A | 9/2013 | | |
| JP | 2015-175054 A | 10/2015 | | |
| JP | 2015-180767 A | 10/2015 | | |
| JP | 2015-193904 A | 11/2015 | | |
| JP | 2016-125124 A | 7/2016 | | |

OTHER PUBLICATIONS

Extended European Search Report for Application No. 17179523.0, dated Nov. 30, 2017; 8 pages.
G. S. Upadhyaya, Powder Metallurgy Technology, Cambridge International Science Publishing, 1997, Chapters 1-2, (27 pages).
Malvern Panalytical, "Metal Characterization Solutions for Powder Metallurgy", Malvern Instruments Ltd., 2017 (16 pages).

* cited by examiner

GEAR, DECELERATION DEVICE, ROBOT, AND MOVING OBJECT

CROSS-REFERENCE TO RELATED APPLICATION

This application claims priority to Japanese Patent Application No. 2016-134537 filed on Jul. 6, 2016. The entire disclosures of Japanese Patent Application No. 2016-134537 is hereby incorporated herein by reference.

BACKGROUND

1. Technical Field

The present invention relates to a gear, a deceleration device, a robot, and a moving object.

2. Related Art

In a powder metallurgy method, a composition containing a metal powder and a binder is molded into a desired shape to obtain a molded body, and the obtained molded body is degreased and sintered, whereby a sintered body is produced. In such a process for producing a sintered body, an atomic diffusion phenomenon occurs among particles of the metal powder, whereby the molded body is gradually densified, resulting in sintering.

For example, JP-A-2012-87416 (Patent Document 1) proposes a metal powder for powder metallurgy which contains Zr and Si, with the remainder including at least one element selected from the group consisting of Fe, Co, and Ni, and inevitable elements. According to such a metal powder for powder metallurgy, the sinterability is improved by the action of Zr, whereby a sintered body having a high density can be easily produced.

The thus obtained sintered body is getting widely used in various machine components, structural components, etc. recently.

For example, JP-A-2013-170295 (Patent Document 2) discloses a technique in which a gear is produced by subjecting a sintered component produced using a powder of a precipitation hardening stainless steel to a heat treatment of carburizing, quenching, and tempering.

However, the heat treatment such as carburizing, quenching, and tempering is generally performed at a high temperature of 900° C. or higher over several hours. Therefore, the sintered component is likely to be deformed, resulting in a decrease in the dimensional accuracy of the gear.

SUMMARY

An advantage of some aspects of the invention is to provide a gear having high dimensional accuracy and mechanical properties, and also a deceleration device, a robot, and a moving object, each having high reliability.

The advantage can be achieved by the following configurations.

A gear according to an aspect of the invention includes a sintered body in which Fe is contained as a principal component, Ni is contained in a proportion of 2 mass % or more and 20 mass % or less, Si is contained in a proportion of 0.3 mass % or more and 5.0 mass % or less, C is contained in a proportion of 0.005 mass % or more and 0.3 mass % or less, and when one element selected from the group consisting of Ti, V, Y, Zr, Nb, Hf, and Ta is defined as a first element, and one element selected from the group consisting of Ti, V, Y, Zr, Nb, Hf, and Ta, and having a higher group number in the periodic table than that of the first element or having the same group number in the periodic table as that of the first element and a higher period number in the periodic table than that of the first element is defined as a second element, the first element is contained in a proportion of 0.01 mass % or more and 0.7 mass % or less, and the second element is contained in a proportion of 0.01 mass % or more and 0.7 mass % or less.

According to this configuration, a gear having high dimensional accuracy and mechanical properties is obtained.

In the gear according to the aspect of the invention, it is preferred that when a ratio X1/X2 of a value X1 obtained by dividing the content E1 of the first element by the mass number of the first element to a value X2 obtained by dividing the content E2 of the second element by the mass number of the second element is 0.3 or more and 3 or less.

According to this configuration, when a metal powder for powder metallurgy is fired for obtaining a sintered body, a difference in timing between the deposition of a carbide or the like of the first element and the deposition of a carbide or the like of the second element can be optimized. As a result, pores remaining in a molded body can be eliminated as if they were swept out sequentially from the inside, and therefore, pores generated in the sintered body can be minimized. Accordingly, a sintered body (gear) having a high density and excellent sintered body properties is obtained.

In the gear according to the aspect of the invention, it is preferred that the sum of the content of the first element and the content of the second element is 0.05 mass % or more and 0.8 mass % or less.

According to this configuration, the densification of a sintered body (gear) to be produced becomes necessary and sufficient.

In the gear according to the aspect of the invention, it is preferred that the sintered body further contains Cr in a proportion of 9 mass % or more and 19 mass % or less.

According to this configuration, a sintered body (gear) capable of maintaining high mechanical properties over a long period of time is obtained.

In the gear according to the aspect of the invention, it is preferred that the sintered body further contains Co in a proportion of 6 mass % or more and 14 mass % or less.

According to this configuration, the heat resistance of the sintered body (gear) can be further enhanced without causing a large decrease in the density of the sintered body to be produced.

A deceleration device according to an aspect of the invention includes the gear according to the aspect of the invention.

According to this configuration, a deceleration device having high reliability is obtained.

A robot according to an aspect of the invention includes a power transmission section having the gear according to the aspect of the invention.

According to this configuration, a robot having high reliability is obtained.

A moving object according to an aspect of the invention includes a power transmission section having the gear according to the aspect of the invention.

According to this configuration, a moving object having high reliability is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a gear, a deceleration device, a robot, and a moving object according to the invention will be described in detail.

Gear

First, an embodiment of a gear according to the invention will be described.

Figure 1:
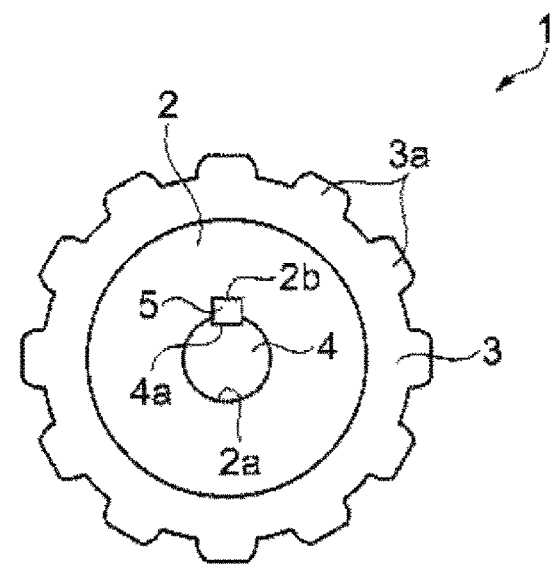
FIG. 1 is a plan view schematically showing an embodiment of a gear according to the invention.

FIG. 1 is a plan view schematically showing an embodiment of a gear according to the invention.

A gear 1 shown in FIG. 1 includes a core section 2, and a tooth section 3 provided around the core section 2.

Among these, the core section 2 has a disk shape, and a round hole 2a is formed in the thickness direction of the core section 2 at the center. Then, by inserting a shaft 4 into this round hole 2a, the gear 1 can be rotated according to the rotation of the shaft 4.

On the other hand, the tooth section 3 has an annular shape thicker than the core section 2 and is formed integrally with the core section 2. The tooth section 3 includes a plurality of teeth 3a provided protruding toward the outside thereof. The plurality of teeth 3a are provided at equal intervals and are disposed so as to surround the outer periphery of the tooth section 3.

Further, in the round hole 2a, a first concave section 2b in a substantially rectangular shape is formed. On the other hand, on a side surface of the shaft 4, a second concave section 4a is formed. When these first concave section 2b and second concave section 4a are combined, a hole in a substantially rectangular shape is formed. In FIG. 1, a key 5 is inserted into this hole. By doing this, the core section 2 and the shaft 4 are fixed to each other.

The gear 1 shown in FIG. 1 is configured such that the entire gear is constituted by a sintered body produced by a powder metallurgy method, however, the invention is not limited thereto, and it is only necessary to use the sintered body in, for example, at least a portion of the gear 1. That is, the gear according to the invention may only include the sintered body. At this time, a region constituted by the sintered body is not particularly limited, however, it is preferred that the tooth section 3 is constituted by the sintered body. According to this, the dimensional accuracy of the tooth section 3 can be increased, and the gear 1 having high reliability is obtained.

The sintered body included in the gear 1 is a sintered body in which Fe is contained as a principal component, Ni is contained in a proportion of 2 mass % or more and 20 mass % or less, Si is contained in a proportion of 0.3 mass % or more and 5.0 mass % or less, C is contained in a proportion of 0.005 mass % or more and 0.3 mass % or less, the below-mentioned first element is contained in a proportion of 0.01 mass % or more and 0.7 mass % or less, and the below-mentioned second element is contained in a proportion of 0.01 mass % or more and 0.7 mass % or less. Such a sintered body can be subjected to a heat treatment for increasing the mechanical properties such as hardness thereof at a relatively low temperature, or even at a high temperature for a relatively short period of time, and therefore, the amount of deformation accompanying the heat treatment is reduced, and thus, the dimensional accuracy is increased. Due to this, the gear 1 having high dimensional accuracy and mechanical properties is obtained. Incidentally, the mechanical properties include so-called tribology which is a phenomenon occurring between two surfaces that interact with each other in relative motion, for example, friction, wear, lubrication, and the like. Therefore, the phrase "the mechanical properties are high" refers to a state where such a phenomenon is favorable, for example, friction or wear is small, or lubrication is favorable.

Further, the gear 1 shown in FIG. 1 is a so-called spur gear, however, the invention is not limited thereto, and may be a gear in another shape, for example, a helical gear, a double-helical gear, a worm gear, a hypoid gear, a sprocket, a ratchet, or the like.

Method for Producing Gear

Next, a method for producing a sintered body (gear) using a metal powder for powder metallurgy will be described.

The method for producing a sintered body includes (A) a composition preparation step in which a composition for producing a sintered body is prepared, (B) a molding step in which a molded body is produced, (C) a degreasing step in which a degreasing treatment is performed, and (D) a firing step in which firing is performed. Hereinafter, the respective steps will be sequentially described.

(A) Composition Preparation Step

First, a metal powder for powder metallurgy and a binder are prepared, and these materials are kneaded using a kneader, whereby a kneaded material is obtained.

In this kneaded material, the metal powder for powder metallurgy is uniformly dispersed.

The metal powder for powder metallurgy is produced by, for example, any of a variety of powdering methods such as an atomization method (such as a water atomization method, a gas atomization method, or a spinning water atomization method), a reducing method, a carbonyl method, and a pulverization method.

Among these, the metal powder for powder metallurgy is preferably a metal powder produced by an atomization method, more preferably a metal powder produced by a water atomization method or a spinning water atomization method. The atomization method is a method in which a molten metal (metal melt) is caused to collide with a fluid (liquid or gas) sprayed at a high speed to atomize the metal melt into a fine powder and also to cool the fine powder, whereby a metal powder is produced. By producing the metal powder for powder metallurgy through such an atomization method, an extremely fine powder can be efficiently produced. Further, the shape of the particle of the obtained powder is closer to a spherical shape by the action of surface tension. Due to this, a metal powder having a high packing factor when molding is obtained. That is, a powder capable of producing a sintered body having a high density can be obtained.

On the other hand, examples of the binder include polyolefins such as polyethylene, polypropylene, and ethylene-vinyl acetate copolymers, acrylic resins such as polymethyl methacrylate and polybutyl methacrylate, styrenic resins such as polystyrene, polyesters such as polyvinyl chloride, polyvinylidene chloride, polyamide, polyethylene terephthalate, and polybutylene terephthalate, various resins such as polyether, polyvinyl alcohol, polyvinylpyrrolidone, and copolymers thereof, and various organic binders such as various waxes, paraffins, higher fatty acids (such as stearic acid), higher alcohols, higher fatty acid esters, and higher fatty acid amides. These can be used alone or by mixing two or more types thereof.

The content of the binder is preferably about 2 mass % or more and 20 mass % or less, more preferably about 5 mass % or more and 10 mass % or less with respect to the total amount of the kneaded material. By setting the content of the binder within the above range, a molded body can be formed with good moldability, and also the density is increased, and thus, the stability of the shape of the molded body and the like can be particularly enhanced. Further, according to this, a difference in size between the molded body and the degreased body, that is, a so-called shrinkage ratio is optimized, whereby a decrease in the dimensional accuracy of the finally obtained sintered body can be prevented. That is, a sintered body having a high density and high dimensional accuracy can be obtained.

In the kneaded material, a plasticizer may be added as needed. Examples of the plasticizer include phthalate esters (such as DOP, DEP, and DBP), adipate esters, trimellitate esters, and sebacate esters. These can be used alone or by mixing two or more types thereof.

Further, in the kneaded material, other than the metal powder for powder metallurgy, the binder, and the plasticizer, for example, any of a variety of additives such as a lubricant, an antioxidant, a degreasing accelerator, and a surfactant can be added as needed.

Incidentally, depending on the molding method described below, in place of the kneaded material, a granulated powder may be produced. The kneaded material, the granulated powder, and the like are examples of the composition to be subjected to the molding step described below.

The granulated powder is a granulated powder obtained by binding a plurality of metal particles to one another with the binder by subjecting the metal powder for powder metallurgy to a granulation treatment.

Examples of the binder to be used for producing the granulated powder include polyolefins such as polyethylene, polypropylene, and ethylene-vinyl acetate copolymers, acrylic resins such as polymethyl methacrylate and polybutyl methacrylate, styrenic resins such as polystyrene, polyesters such as polyvinyl chloride, polyvinylidene chloride, polyamide, polyethylene terephthalate, and polybutylene terephthalate, various resins such as polyether, polyvinyl alcohol, polyvinylpyrrolidone, and copolymers thereof, and various organic binders such as various waxes, paraffins, higher fatty acids (such as stearic acid), higher alcohols, higher fatty acid esters, and higher fatty acid amides. These can be used alone or by mixing two or more types thereof.

Among these, as the binder, a binder containing a polyvinyl alcohol or polyvinylpyrrolidone is preferred. These binder components have a high binding ability, and therefore can efficiently form the granulated powder even in a relatively small amount. Further, the thermal decomposability thereof is also high, and therefore, the binder can be reliably decomposed and removed in a short time during degreasing and firing.

The content of the binder is preferably about 0.2 mass % or more and 10 mass % or less, more preferably about 0.3 mass % or more and 5 mass % or less, furthermore preferably about 0.3 mass % or more and 2 mass % or less with respect to the total amount of the granulated powder. By setting the content of the binder within the above range, the granulated powder can be efficiently formed while preventing significantly large particles from being formed or the metal particles which are not granulated from remaining in a large amount. Further, since the moldability is improved, the stability of the shape of the molded body and the like can be particularly enhanced. Further, by setting the content of the binder within the above range, a difference in size between the molded body and the degreased body, that is, a so-called shrinkage ratio is optimized, whereby a decrease in the dimensional accuracy of the finally obtained sintered body can be prevented.

Further, in the granulated powder, any of a variety of additives such as a plasticizer, a lubricant, an antioxidant, a degreasing accelerator, and a surfactant may be added as needed.

Examples of the granulation treatment include a spray drying method, a tumbling granulation method, a fluidized bed granulation method, and a tumbling fluidized bed granulation method.

(B) Molding Step

Subsequently, the kneaded material or the granulated powder is molded, whereby a molded body having the same shape as that of a target sintered body is produced.

The method for producing a molded body (molding method) is not particularly limited, and for example, any of a variety of molding methods such as a powder compaction molding (compression molding) method, a metal injection molding (MIM) method, and an extrusion molding method can be used.

Among these, a powder compaction molding method is preferably used. According to the powder compaction molding method, the binder concentration distribution is likely to be relatively uniform. Due to this, in the below-mentioned firing step, the molded body is likely to be shrunk uniformly. As a result, a sintered body having higher dimensional accuracy is obtained in the end.

The molding conditions in the case of a powder compaction molding method are preferably such that the molding pressure is about 200 MPa or more and 1000 MPa or less (2 t/cm$^2$ or more and 10 t/cm$^2$ or less), which vary depending on the respective conditions such as the composition and the particle diameter of the metal powder for powder metallurgy to be used, the composition of the binder, and the blending amount thereof.

The molding conditions in the case of a metal injection molding method are preferably such that the material temperature is about 80° C. or higher and 210° C. or lower, and the injection pressure is about 50 MPa or more and 500 MPa or less (0.5 t/cm$^2$ or more and 5 t/cm$^2$ or less), which vary depending on the respective conditions.

The molding conditions in the case of an extrusion molding method are preferably such that the material temperature is about 80° C. or higher and 210° C. or lower, and the extrusion pressure is about 50 MPa or more and 500 MPa or less (0.5 t/cm$^2$ or more and 5 t/cm$^2$ or less), which vary depending on the respective conditions.

The thus obtained molded body is in a state where the binder is uniformly distributed in gaps between the particles of the metal powder.

The shape and size of the molded body to be produced are determined in anticipation of shrinkage of the molded body in the subsequent degreasing step and firing step.

(C) Degreasing Step

Subsequently, the thus obtained molded body is subjected to a degreasing treatment (binder removal treatment), whereby a degreased body is obtained.

Specifically, the degreasing treatment is performed by heating the molded body to decompose the binder, thereby removing the binder from the molded body.

Examples of the degreasing treatment include a method of heating the molded body and a method of exposing the molded body to a gas capable of decomposing the binder.

In the case of using a method of heating the molded body, the conditions for heating the molded body are preferably such that the temperature is about 100° C. or higher and 750° C. or lower and the time is about 0.1 hours or more and 20 hours or less, and more preferably such that the temperature is about 150° C. or higher and 600° C. or lower and the time is about 0.5 hours or more and 15 hours or less, which slightly vary depending on the composition and the blending amount of the binder. According to this, the degreasing of the molded body can be performed necessarily and sufficiently without sintering the molded body. As a result, it is possible to reliably prevent the binder component from remaining inside the degreased body in a large amount.

The atmosphere when the molded body is heated is not particularly limited, and an atmosphere of a reducing gas such as hydrogen, an atmosphere of an inert gas such as nitrogen or argon, an atmosphere of an oxidative gas such as air, a reduced pressure atmosphere obtained by reducing the pressure of such an atmosphere, or the like can be used.

Examples of the gas capable of decomposing the binder include ozone gas.

Incidentally, by dividing this degreasing step into a plurality of steps in which the degreasing conditions are different, and performing the plurality of steps, the binder in the molded body can be more rapidly decomposed and removed so that the binder does not remain in the molded body.

Further, according to need, the degreased body may be subjected to a machining process such as grinding, polishing, or cutting. The degreased body has a relatively low hardness and relatively high plasticity, and therefore, the machining process can be easily performed while preventing the degreased body from losing its shape. According to such a machining process, a sintered body having high dimensional accuracy can be easily obtained in the end.

(D) Firing Step

The degreased body obtained in the above step (C) is fired in a firing furnace, whereby a sintered body (gear) is obtained.

By this firing, in the metal powder for powder metallurgy, diffusion occurs at the boundary surface between the particles, resulting in sintering. At this time, by the mechanism as described above, the degreased body is rapidly sintered. As a result, a sintered body which is dense and has a high density on the whole is obtained.

The firing temperature varies depending on the composition, the particle diameter, and the like of the metal powder for powder metallurgy used in the production of the molded body and the degreased body, but is set to, for example, about 980° C. or higher and 1330° C. or lower, and preferably set to about 1050° C. or higher and 1260° C. or lower.

Further, the firing time is set to 0.2 hours or more and 7 hours or less, but is preferably set to about 1 hour or more and 6 hours or less.

The atmosphere in the firing is not particularly limited, however, in consideration of prevention of significant oxidation of the metal powder, an atmosphere of a reducing gas such as hydrogen, an atmosphere of an inert gas such as argon, a reduced pressure atmosphere obtained by reducing the pressure of such an atmosphere, or the like is preferably used.

The sintered body has a sufficiently high density and excellent mechanical properties even without performing an additional treatment, however, in order to further increase the density and enhance the mechanical properties, a variety of additional treatments may be performed.

As the additional treatment, for example, an additional treatment of increasing the density such as the HIP treatment described above may be performed, and also a variety of quenching treatments, a variety of sub-zero treatments, a variety of tempering treatments, a variety of hardening treatments, and the like may be performed. These additional treatments may be performed alone or two or more treatments thereof may be performed in combination.

Among these, examples of the hardening treatment include a treatment in which after a solid solution heat treatment of performing quenching from a temperature of 1020° C. or higher and 1060° C. or lower is performed, a precipitation hardening heat treatment of performing air-cooling from a temperature of 470° C. or higher and 630° C. or lower is performed, and a treatment in which only the precipitation hardening heat treatment is performed. Further, such a hardening treatment may be performed as needed, and for example, in the case where a material is in a state of being subjected to a heat treatment equivalent to the above-mentioned hardening treatment as a result of the firing step, or the like, this treatment may be omitted.

According to the metal powder for powder metallurgy as described above, even if such a hardening treatment is performed at a relatively low temperature or even at a high temperature for a relatively short period of time, a sufficient effect for the improvement of the mechanical properties can be obtained. Because of this, while improving the mechanical properties accompanying the hardening treatment, the deformation of the sintered body accompanying the hardening treatment can be minimized, and the dimensional accuracy of the sintered body can be made closer to the desired value.

Further, in the above-mentioned firing step or a variety of additional treatments, a light element in the metal powder (in the sintered body) is volatilized, and the composition of the finally obtained sintered body slightly changes from the composition of the metal powder in some cases.

For example, the content of C in the final sintered body may change within the range of 5% or more and 100% or less (preferably within the range of 30% or more and 100% or less) of the content of C in the metal powder for powder metallurgy, which varies depending on the conditions for the step or the conditions for the treatment. Therefore, in consideration of the reduced amount of C, C is additionally added other than the metal powder for powder metallurgy or the amount of C in the metal powder for powder metallurgy may be increased.

Further, also the content of 0 in the final sintered body may change within the range of 1% or more and 50% or less (preferably within the range of 3% or more and 50% or less) of the content of 0 in the metal powder for powder metallurgy, which varies depending on the conditions for the step or the conditions for the treatment.

On the other hand, as described above, the produced sintered body may be subjected to an HIP treatment as part of the additional treatments to be performed as needed. However, a sufficient effect is not exhibited even if an HIP treatment is performed in many cases. In the HIP treatment, the sintered body can be further densified, however, the sintered body obtained according to the invention has already been sufficiently densified at the end of the firing step. Therefore, even if the HIP treatment is further performed, further densification hardly proceeds.

In addition, in the HIP treatment, it is necessary to apply pressure to a material to be treated through a pressure medium, and therefore, the material to be treated may be contaminated, the composition or the physical properties of the material to be treated may unintentionally change due to the contamination, or the color of the material to be treated may change due to the contamination. Further, by the application of pressure, residual stress is generated or increased in the material to be treated, and a problem such as a change in the shape or a decrease in the dimensional accuracy may occur as the residual stress is released over time.

On the other hand, by using the above-mentioned metal powder for powder metallurgy, a sintered body having a sufficiently high density can be produced without performing such an HIP treatment, and therefore, a sintered body having an increased density and also an increased strength can be obtained in the same manner as in the case of performing an HIP treatment. Such a sintered body is less contaminated or discolored, and an unintended change in the composition or physical properties, or the like occurs less, and also a problem such as a change in the shape or a decrease in the dimensional accuracy occurs less. Therefore, according to the invention, a sintered body (gear) having high mechanical strength and dimensional accuracy, and excellent durability can be efficiently produced.

Further, such a sintered body tends to have a uniform composition and a uniform crystal structure in the entire sintered body. Due to this, a gear which has high structural isotropy and therefore has excellent durability against a load from every direction regardless of its shape is obtained.

Metal Powder for Powder Metallurgy

Next, the metal powder for powder metallurgy to be used in the production of the gear as described above will be described.

This metal powder for powder metallurgy is a metal powder in which Fe is contained as a principal component, Ni is contained in a proportion of 2 mass % or more and 20 mass % or less, Si is contained in a proportion of 0.3 mass % or more and 5.0 mass % or less, C is contained in a proportion of 0.005 mass % or more and 0.3 mass % or less, the below-mentioned first element is contained in a proportion of 0.01 mass % or more and 0.7 mass % or less, and the below-mentioned second element is contained in a proportion of 0.01 mass % or more and 0.7 mass % or less. According to such a metal powder, as a result of optimizing the alloy composition, the densification during sintering can be particularly enhanced. As a result, a sintered body (gear) having a high density and high dimensional accuracy can be produced without performing an additional treatment.

The first element is one element selected from the group consisting of the following seven elements: Ti, V, Y, Zr, Nb, Hf, and Ta, and the second element is one element selected from the group consisting of the above-mentioned seven elements and having a higher group number in the periodic table than that of the first element or one element selected from the group consisting of the above-mentioned seven elements and having the same group number in the periodic table as that of the element selected as the first element and a higher period number in the periodic table than that of the first element.

Hereinafter, the alloy composition of the metal powder for powder metallurgy will be described in further detail. In the following description, the "metal powder for powder metallurgy" is sometimes simply referred to as "metal powder".

Ni

Ni is an element which imparts corrosion resistance and heat resistance to a sintered body to be produced.

The content of Ni in the metal powder is set to 2 mass % or more and 20 mass % or less, but is set to preferably 2.5 mass % or more and 19.5 mass % or less, more preferably 3 mass % or more and 19 mass % or less. By setting the content of Ni within the above range, a sintered body having excellent mechanical properties over a long period of time is obtained.

When the content of Ni is less than the above lower limit, the corrosion resistance or heat resistance of a sintered body to be produced may not be sufficiently increased depending on the overall composition, and on the other hand, when the content of Ni exceeds the above upper limit, the corrosion resistance or heat resistance may be decreased instead.

A particularly preferred range of the content of Ni is appropriately set according to the contents of the below-mentioned Si and Cr.

For example, in the case where the content of Si in the metal powder is less than 3 mass % and the content of Cr therein is less than 13 mass %, the content of Ni is preferably 16 mass % or more and 20 mass % or less, more preferably 17 mass % or more and 19 mass % or less.

On the other hand, in the case where the content of Si in the metal powder is less than 3 mass % and the content of Cr therein is 13 mass % or more and 19 mass % or less, the content of Ni is preferably 2 mass % or more and 10 mass % or less, more preferably 2.5 mass % or more and 9 mass % or less.

Further, in the case where the content of Si in the metal powder is 3 mass % or more, the content of Ni is preferably 5 mass % or more and 8 mass % or less, more preferably 6 mass % or more and 7 mass % or less.

Si

Si (silicon) is an element which imparts corrosion resistance and high mechanical properties to a sintered body to be produced, and by using the metal powder containing Si, a sintered body capable of maintaining high mechanical properties over a long period of time is obtained.

The content of Si in the metal powder is set to 0.3 mass % or more and 5 mass % or less, but is set to preferably 0.4 mass % or more and 4.5 mass % or less, more preferably 0.5 mass % or more and 4 mass % or less. When the content of Si is less than the above lower limit, the effect of the addition of Si is weakened depending on the overall composition, and therefore, the corrosion resistance or mechanical properties of a sintered body to be produced is/are deteriorated. On the other hand, when the content of Si exceeds the above upper limit, the amount of Si is too large depending on the overall composition, and therefore, the corrosion resistance or mechanical properties is/are decreased instead.

C

C (carbon) can particularly enhance the sinterability when it is used in combination with the below-mentioned first element and second element. Specifically, the first element and the second element each form a carbide by binding to C. By dispersedly depositing this carbide, an effect of preventing the significant growth of crystal grains is exhibited. A clear reason for obtaining such an effect is not known, but one of the reasons is considered to be because the dispersed deposit serves as an obstacle to inhibit the significant growth of crystal grains, and therefore, a variation in the size of crystal grains is suppressed. Accordingly, it becomes difficult to generate pores in a sintered body, and also the increase in the size of crystal grains is prevented, and thus, a sintered body having a high density and excellent mechanical properties is obtained.

The content of C in the metal powder is set to 0.005 mass % or more and 0.3 mass % or less, but is set to preferably 0.008 mass % or more and 0.15 mass % or less, more preferably 0.01 mass % or more and 0.08 mass % or less. When the content of C is less than the above lower limit, crystal grains are liable to grow depending on the overall composition, and therefore, the mechanical properties of the sintered body become insufficient. On the other hand, when the content of C exceeds the above upper limit, the amount of C is too large depending on the overall composition, and therefore, the sinterability is decreased instead.

Al

The metal powder for powder metallurgy may contain either one of Al (aluminum) and Cu (copper), and may contain both.

Al is an element which deposits an intermetallic compound in a sintered body to be produced and enhances the mechanical properties of the sintered body. Further, in the case where Cu is contained in the metal powder, further, Al may be contained therein.

The content of Al in the metal powder is not particularly limited, but is preferably 0.03 mass % or more and 5 mass % or less, more preferably 0.04 mass % or more and 3 mass % or less, furthermore preferably 0.75 mass % or more and 2 mass % or less. By setting the content of Al within the above range, the mechanical properties of a sintered body to be produced can be further enhanced without causing a large decrease in the density of the sintered body.

When the content of Al is less than the above lower limit, the deposition of an intermetallic compound is limited, and therefore, the mechanical properties of the sintered body may not be able to be sufficiently enhanced depending on the overall composition. On the other hand, when the content of Al exceeds the above upper limit, an intermetallic compound may be excessively deposited, and therefore, the density of the sintered body may be decreased, and also the mechanical properties of the sintered body may be decreased instead depending on the overall composition.

Cu

Cu is an element which deposits an intermetallic compound in a sintered body to be produced and enhances the mechanical properties of the sintered body. Further, in the case where Al is contained in the metal powder, further, Cu may be contained therein.

The content of Cu in the metal powder is not particularly limited, but is preferably 0.03 mass % or more and 5 mass % or less, more preferably 0.5 mass % or more and 4.2 mass % or less, furthermore preferably 0.75 mass % or more and 4 mass % or less. By setting the content of Cu within the above range, the mechanical properties of a sintered body to be produced can be further enhanced without causing a large decrease in the density of the sintered body.

When the content of Cu is less than the above lower limit, the deposition of an intermetallic compound is limited, and therefore, the mechanical properties of the sintered body may not be able to be sufficiently enhanced depending on the overall composition. On the other hand, when the content of Cu exceeds the above upper limit, an intermetallic compound may be excessively deposited, and therefore, the density of the sintered body may be decreased, and also the mechanical properties of the sintered body may be decreased instead depending on the overall composition.

Cr

The metal powder for powder metallurgy may contain Cr (chromium).

Cr is an element which imparts corrosion resistance to a sintered body to be produced, and by using the metal powder containing Cr, a sintered body (gear) capable of maintaining high mechanical properties over a long period of time is obtained.

The content of Cr in the metal powder is not particularly limited, but is set to 9 mass % or more and 19 mass % or less, but is set to preferably 9.5 mass % or more and 18 mass % or less, more preferably 10 mass % or more and 17.5 mass % or less. When the content of Cr is less than the above lower limit, the corrosion resistance of a sintered body to be produced is insufficient depending on the overall composition. On the other hand, when the content of Cr exceeds the above upper limit, the sinterability is deteriorated depending on the overall composition, and therefore, it becomes difficult to increase the density of the sintered body.

A particularly preferred range of the content of Cr is appropriately set according to the content of the below-mentioned Si.

For example, in the case where the content of Si in the metal powder is less than 3 mass %, the content of Cr is particularly preferably 13 mass % or more and 19 mass % or less, more preferably 14 mass % or more and 18 mass % or less.

On the other hand, in the case where the content of Si in the metal powder is 3 mass % or more and 5 mass % or less, the content of Cr is particularly preferably 9 mass % or more and 14 mass % or less, more preferably 10 mass % or more and 13 mass % or less.

Co

The metal powder for powder metallurgy may contain Co (cobalt).

Co is an element which enhances the heat resistance of a sintered body to be produced.

The content of Co in the metal powder is not particularly limited, but is preferably 6 mass % or more and 14 mass % or less, more preferably 7 mass % or more and 13 mass % or less, further more preferably 7.5 mass % or more and 12.5 mass % or less. By setting the content of Co within the above range, the heat resistance of a sintered body (gear) to be produced can be further enhanced without causing a large decrease in the density of the sintered body.

Particularly preferred ranges of the content of Co and the content of the above-mentioned Cr are appropriately set according to the content of the above-mentioned Ni.

For example, in the case where the content of Ni in the metal powder is 10 mass % or more, Co is preferably contained within the above range, and with respect to Cr, the content thereof is preferably comparable to or less than the content of the below-mentioned impurities.

On the other hand, in the case where the content of Ni in the metal powder is less than 10 mass %, Cr is preferably contained within the above range, and with respect to Co, the content thereof is preferably comparable to or less than the content of the below-mentioned impurities.

Mo

The metal powder for powder metallurgy may contain Mo (molybdenum).

Mo is an element which enhances the corrosion resistance of a sintered body to be produced.

The content of Mo in the metal powder is not particularly limited, but is preferably 0.1 mass % or more and 6 mass % or less, more preferably 0.3 mass % or more and 5.2 mass % or less, furthermore preferably 0.5 mass % or more and 5 mass % or less. By setting the content of Mo within the above range, the corrosion resistance of a sintered body to be produced can be further enhanced without causing a large decrease in the density of the sintered body.

First Element and Second Element

The first element and the second element each deposit a carbide or an oxide (hereinafter also collectively referred to as "carbide or the like"). It is considered that this deposited carbide or the like inhibits the significant growth of crystal grains when the metal powder is sintered. As a result, as described above, it becomes difficult to generate pores in a sintered body, and also the increase in the size of crystal grains is prevented, and thus, a sintered body having a high density and excellent mechanical properties is obtained.

In addition, although a detailed description will be given later, the deposited carbide or the like promotes the accumulation of silicon oxide at a crystal grain boundary, and as a result, the sintering is promoted and the density is increased while preventing the increase in the size of crystal grains.

The first element and the second element are two elements selected from the group consisting of the following seven elements: Ti, V, Y, Zr, Nb, Hf, and Ta, but preferably include an element belonging to group IIIA or group IVA in the long periodic table (Ti, Y, Zr, or Hf). By including an element belonging to group IIIA or group IVA as at least one of the first element and the second element, oxygen contained as an oxide in the metal powder is removed and the sinterability of the metal powder can be particularly enhanced.

The first element is only required to be one element selected from the group consisting of the following seven elements: Ti, V, Y, Zr, Nb, Hf, and Ta as described above, but is preferably an element belonging to group IIIA or group IVA in the long periodic table in the group consisting of the above-mentioned seven elements. An element belonging to group IIIA or group IVA removes oxygen contained as an oxide in the metal powder and therefore can particularly enhance the sinterability of the metal powder. According to this, the concentration of oxygen remaining in the crystal grains after sintering can be decreased. As a result, the content of oxygen in the sintered body can be decreased, and the density can be increased. Further, these elements are elements having high activity, and therefore are considered to cause rapid atomic diffusion. Accordingly, this atomic diffusion acts as a driving force, and thereby a distance between particles of the metal powder is efficiently decreased and a neck is formed between the particles, so that the densification of a molded body is promoted. As a result, the density of the sintered body can be further increased.

On the other hand, the second element is only required to be one element selected from the group consisting of the following seven elements: Ti, V, Y, Zr, Nb, Hf, and Ta and different from the first element as described above, but is preferably an element belonging to group VA in the long periodic table in the group consisting of the above-mentioned seven elements. An element belonging to group VA particularly efficiently deposits the above-mentioned carbide or the like, and therefore, can efficiently inhibit the significant growth of crystal grains during sintering. As a result, the formation of fine crystal grains is promoted, and thus, the density of the sintered body can be increased and also the mechanical properties of the sintered body can be enhanced.

Incidentally, by the combination of the first element with the second element composed of the elements as described above, the effects of the respective elements are exhibited without inhibiting each other. Due to this, the metal powder containing such a first element and a second element enables the production of a sintered body having a particularly high density.

More preferably, a combination of an element belonging to group IVA as the first element with Nb as the second element is adopted.

Further, more preferably, a combination of Zr or Hf as the first element with Nb as the second element is adopted.

By adopting such a combination, the above-mentioned effect becomes more prominent.

Among these elements, Zr is a ferrite forming element, and therefore deposits a body-centered cubic lattice phase. This body-centered cubic lattice phase has more excellent sinterability than the other crystal lattice phases, and therefore contributes to the densification of a sintered body.

The content of the first element in the metal powder is set to 0.01 mass % or more and 0.7 mass % or less, but is set to preferably 0.03 mass % or more and 0.65 mass % or less, more preferably 0.05 mass % or more and 0.6 mass % or less. When the content of the first element is less than the above lower limit, the effect of the addition of the first element is weakened depending on the overall composition, and therefore, the density of a sintered body to be produced is not sufficiently increased. On the other hand, when the content of the first element exceeds the above upper limit, the amount of the first element is too large depending on the overall composition, and therefore, the ratio of the above-mentioned carbide or the like is too high, and the densification is deteriorated instead.

The content of the second element in the metal powder is set to 0.01 mass % or more and 0.7 mass % or less, but is set to preferably 0.03 mass % or more and 0.55 mass % or less, more preferably 0.05 mass % or more and 0.45 mass % or less. When the content of the second element is less than the above lower limit, the effect of the addition of the second element is weakened depending on the overall composition, and therefore, the density of a sintered body to be produced is not sufficiently increased. On the other hand, when the content of the second element exceeds the above upper limit, the amount of the second element is too large depending on the overall composition, and therefore, the ratio of the above-mentioned carbide or the like is too high, and the densification is deteriorated instead.

Further, as described above, each of the first element and the second element deposits a carbide or the like, however, in the case where an element belonging to group IIIA or group IVA is selected as the first element as described above and an element belonging to group VA is selected as the second element as described above, it is presumed that when the metal powder is sintered, the timing when a carbide or the like of the first element is deposited and the timing when a carbide or the like of the second element is deposited differ from each other. It is considered that due to the difference in timing when a carbide or the like is deposited in this manner, sintering gradually proceeds so that the generation of pores is prevented, and thus, a dense sintered body is obtained. That is, it is considered that by the presence of both of the carbide or the like of the first element and the carbide or the like of the second element, the increase in the size of crystal grains can be suppressed while increasing the density of the sintered body.

In the metal powder, it is only necessary that two elements selected from the group consisting of the above-mentioned seven elements are contained, however, an element which is selected from this group and is different from the two elements may be further contained. That is, in the metal powder, three or more elements selected from the group consisting of the above-mentioned seven elements may be contained. According to this, although it varies a little depending on the combination of the elements, the above-mentioned effect can be further enhanced.

Further, it is preferred to set the ratio of the content of the first element to the content of the second element in consideration of the mass number of the element selected as the first element and the mass number of the element selected as the second element.

Specifically, when a value obtained by dividing the content E1 (mass %) of the first element by the mass number of the first element is represented by an index X1 and a value obtained by dividing the content E2 (mass %) of the second element by the mass number of the second element is represented by an index X2, the ratio (X1/X2) of the index X1 to the index X2 is preferably 0.3 or more and 3 or less, more preferably 0.5 or more and 2 or less, furthermore preferably 0.75 or more and 1.3 or less. By setting the ratio X1/X2 within the above range, when the metal powder for powder metallurgy is fired for obtaining a sintered body, a difference between the timing when a carbide or the like of the first element is deposited and the timing when a carbide or the like of the second element is deposited can be optimized. According to this, pores remaining in a molded body can be eliminated as if they were swept out sequentially from the inside, and therefore, pores generated in a sintered body can be minimized. Therefore, by setting the ratio X1/X2 within the above range, a metal powder capable of producing a sintered body (gear) having a high density and excellent mechanical properties can be obtained. Further, the balance between the number of atoms of the first element and the number of atoms of the second element is optimized, and therefore, an effect brought about by the first element and an effect brought about by the second element are synergistically exhibited, and thus, a sintered body having a particularly high density can be obtained.

Here, with respect to a specific example of the combination of the first element with the second element, based on the above-mentioned range of the ratio X1/X2, the ratio (E1/E2) of the content E1 (mass %) to the content E2 (mass %) is also calculated.

For example, in the case where the first element is Zr and the second element is Nb, since the mass number of Zr is 91.2 and the mass number of Nb is 92.9, E1/E2 is preferably 0.29 or more and 2.95 or less, more preferably 0.49 or more and 1.96 or less.

In the case where the first element is Hf and the second element is Nb, since the mass number of Hf is 178.5 and the mass number of Nb is 92.9, E1/E2 is preferably 0.58 or more and 5.76 or less, more preferably 0.96 or more and 3.84 or less.

In the case where the first element is Ti and the second element is Nb, since the mass number of Ti is 47.9 and the mass number of Nb is 92.9, E1/E2 is preferably 0.15 or more and 1.55 or less, more preferably 0.26 or more and 1.03 or less.

In the case where the first element is Nb and the second element is Ta, since the mass number of Nb is 92.9 and the mass number of Ta is 180.9, E1/E2 is preferably 0.15 or more and 1.54 or less, more preferably 0.26 or more and 1.03 or less.

In the case where the first element is Y and the second element is Nb, since the mass number of Y is 88.9 and the mass number of Nb is 92.9, E1/E2 is preferably 0.29 or more and 2.87 or less, more preferably 0.48 or more and 1.91 or less.

In the case where the first element is V and the second element is Nb, since the mass number of V is 50.9 and the mass number of Nb is 92.9, E1/E2 is preferably 0.16 or more and 1.64 or less, more preferably 0.27 or more and 1.10 or less.

In the case where the first element is Ti and the second element is Zr, since the mass number of Ti is 47.9 and the mass number of Zr is 91.2, E1/E2 is preferably 0.16 or more and 1.58 or less, more preferably 0.26 or more and 1.05 or less.

In the case where the first element is Zr and the second element is Ta, since the mass number of Zr is 91.2 and the mass number of Ta is 180.9, E1/E2 is preferably 0.15 or more and 1.51 or less, more preferably 0.25 or more and 1.01 or less.

In the case where the first element is Zr and the second element is V, since the mass number of Zr is 91.2 and the mass number of V is 50.9, E1/E2 is preferably 0.54 or more and 5.38 or less, more preferably 0.90 or more and 3.58 or less.

Also in the case of a combination other than the above-mentioned combinations, E1/E2 can be calculated in the same manner as described above.

The sum (E1+E2) of the content E1 of the first element and the content E2 of the second element is preferably 0.05 mass % or more and 0.8 mass % or less, more preferably 0.10 mass % or more and 0.7 mass % or less, further more preferably 0.12 mass % or more and 0.6 mass % or less. By setting the sum of the content of the first element and the content of the second element within the above range, the densification of a sintered body to be produced becomes necessary and sufficient.

When the ratio of the sum of the content of the first element and the content of the second element to the content of Si is represented by (E1+E2)/Si, (E1+E2)/Si is preferably 0.01 or more and 0.7 or less, more preferably 0.015 or more and 0.6 or less, further more preferably 0.02 or more and 0.5 or less. By setting the ratio (E1+E2)/Si within the above range, a decrease in the toughness or the like when Si is added is sufficiently compensated by the addition of the first element and the second element. As a result, a metal powder capable of producing a sintered body which has excellent mechanical properties such as toughness in spite of having a high density and also has excellent corrosion resistance attributed to Si is obtained.

In addition, it is considered that by the addition of appropriate amounts of the first element and the second element, the carbide or the like of the first element and the carbide or the like of the second element act as "nuclei", and silicon oxide is accumulated at a crystal grain boundary in the sintered body. By the accumulation of silicon oxide at a crystal grain boundary, the concentration of oxides inside the crystal grain is decreased, and therefore, sintering is promoted. As a result, it is considered that the densification of the sintered body is further promoted.

The deposited silicon oxide easily moves to the triple point of a crystal grain boundary during the accumulation, and therefore, the crystal growth is suppressed at this point (a flux pinning effect). As a result, the significant growth of crystal grains is suppressed, and thus, a sintered body having finer crystals is obtained. Such a sintered body has particularly high mechanical properties.

The accumulated silicon oxide is easily located at the triple point of a crystal grain boundary as described above, and therefore tends to be shaped into a particle. Therefore, in the sintered body, a first region which is in the form of such a particle and has a relatively high silicon oxide content and a second region which has a relatively lower silicon oxide content than the first region are likely to be formed. By the presence of the first region, the concentration of oxides inside the crystal is decreased, and the significant growth of crystal grains is suppressed as described above.

When a qualitative and quantitative analysis is performed for the first region and the second region using an electron beam microanalyzer (EPMA), the first region contains (oxygen) as a principal element, and the second region contains Fe as a principal element in many cases. As described above, the first region mainly tends to exist at a crystal grain boundary, and the second region tends to exist mainly inside the crystal grain. Therefore, in the first region, when the sum of the contents of the two elements, O and Si, and the content of Fe are compared, the sum of the contents of the two elements is higher than the content of Fe in many cases. On the other hand, in the second region, the sum of the contents of the two elements, O and Si, is much smaller than the content of Fe in many cases. Based on these analysis results, Si and O tend to be easily accumulated in the first region. Specifically, the sum of the content of Si and the content of O is preferably 1.5 times or more and 10000 times or less the content of Fe in the first region. Further, the content of Si in the first region is preferably 3 times or more and 10000 times or less the content of Si in the second region.

Further, at least one of the content of the first element and the content of the second element often satisfies the relationship that the content in the first region is higher than the content in the second region, which varies depending on the compositional ratio in some cases. This indicates that in the first region, the carbide or the like of the first element and the carbide or the like of the second element tend to act as nuclei when silicon oxide is accumulated. Specifically, the content of the first element in the first region is preferably 3 times or more and 10000 times or less the content of the first element in the second region. Similarly, the content of the second element in the first region is preferably 3 times or more and 10000 times or less the content of the second element in the second region.

The accumulation of silicon oxide as described above is considered to be one of the causes for the densification of a sintered body. Therefore, it is considered that even in a sintered body having a density increased according to the invention, silicon oxide is not accumulated depending on the compositional ratio in some cases. That is, the first region and the second region may not be included depending on the compositional ratio.

The diameter of the first region in the form of a particle varies depending on the content of Si in the entire sintered body, but is set to about 0.5 μm or more and 15 μm or less, and preferably about 1 μm or more and 10 μm or less. According to this, the densification of the sintered body can be sufficiently promoted while preventing the decrease in the mechanical properties of the sintered body accompanying the accumulation of silicon oxide.

The diameter of the first region can be obtained as the average of the diameter of a circle having the same area (circle equivalent diameter) as that of the first region determined by the color shade in an electron micrograph of the cross section of the sintered body. When the average is obtained, the measured values of 10 or more regions are used.

Further, when the ratio of the sum of the content of the first element and the content of the second element to the content of C is represented by (E1+E2)/C, (E1+E2)/C is preferably 1 or more and 16 or less, more preferably 2 or more and 13 or less, further more preferably 3 or more and 10 or less. By setting the ratio (E1+E2)/C within the above range, an increase in the hardness and a decrease in the toughness when C is added, and an increase in the density brought about by the addition of the first element and the second element can be both achieved. As a result, a metal powder capable of producing a sintered body which has excellent mechanical properties such as tensile strength and toughness is obtained.

Case where the contents of Ni and Cr are within the predetermined ranges, and also the first element or the second element is Nb Next, a case where the contents of Ni and Cr are within the predetermined ranges, and also the first element or the second element is Nb will be particularly described. Incidentally, matters other than those described below are the same as the above-mentioned matters described with respect to the first element and the second element.

Specifically, in the case where the content of Ni is 2 mass % or more and 7 mass % or less, the content of Cr is 15 mass % or more and 18 mass % or less, and Nb is selected as the first element or the second element, particularly, the content of Nb is preferably 0.1 mass % or more and 0.7 mass % or less, more preferably 0.15 mass % or more and 0.45 mass % or less.

Also in this case, it is preferred that the ratio of the content of the first element to the content of the second element is set in consideration of the mass number of the element selected as the first element and the mass number of the element selected as the second element.

Specifically, when a value obtained by dividing the content E1 (mass %) of the first element by the mass number of the first element is represented by an index X1, a value obtained by dividing the content E2 (mass %) of the second element by the mass number of the second element is represented by an index X2, and Nb is selected as the second element, the ratio (X1/X2) of the index X1 to the index X2 is preferably 0.1 or more and 1 or less, more preferably 0.12 or more and 0.8 or less, further more preferably 0.15 or more and 0.6 or less. By setting the ratio X1/X2 within the above range, a difference between the timing when a carbide or the like of the first element is deposited and the timing when a carbide or the like of the second element is deposited can be optimized. According to this, pores remaining in a molded body can be eliminated as if they were swept out sequentially from the inside, and therefore, pores generated in a sintered body can be minimized. Therefore, by setting the ratio X1/X2 within the above range, a metal powder capable of producing a sintered body having a high density and excellent mechanical properties can be obtained. Further, the balance between the number of atoms of the first element and the number of atoms of the second element is optimized, and therefore, an effect brought about by the first element and an effect brought about by the second element are synergistically exhibited, and thus, a sintered body having a particularly high density can be obtained.

Here, with respect to a specific example of the combination of the first element with the second element, based on the above-mentioned range of the ratio X1/X2, the ratio (E1/E2) of the content E1 (mass %) to the content E2 (mass %) is also calculated.

For example, in the case where the first element is Zr and the second element is Nb, since the mass number of Zr is 91.2 and the mass number of Nb is 92.9, E1/E2 is preferably 0.1 or more and 0.98 or less, more preferably 0.12 or more and 0.79 or less.

In the case where the first element is Hf and the second element is Nb, since the mass number of Hf is 178.5 and the mass number of Nb is 92.9, E1/E2 is preferably 0.19 or more and 1.92 or less, more preferably 0.23 or more and 1.54 or less.

In the case where the first element is Ti and the second element is Nb, since the mass number of Ti is 47.9 and the mass number of Nb is 92.9, E1/E2 is preferably 0.05 or more and 0.52 or less, more preferably 0.06 or more and 0.41 or less.

In the case where the first element is Y and the second element is Nb, since the mass number of Y is 88.9 and the mass number of Nb is 92.9, E1/E2 is preferably 0.1 or more and 0.96 or less, more preferably 0.11 or more and 0.77 or less.

In the case where the first element is V and the second element is Nb, since the mass number of V is 50.9 and the mass number of Nb is 92.9, E1/E2 is preferably 0.05 or more and 0.55 or less, more preferably 0.07 or more and 0.44 or less.

Also in the case of a combination other than the above-mentioned combinations, E1/E2 can be calculated in the same manner as described above.

The sum (E1+E2) of the content E1 of the first element and the content E2 of the second element is preferably 0.05 mass % or more and 0.8 mass % or less, more preferably 0.10 mass % or more and 0.7 mass % or less, further more preferably 0.12 mass % or more and 0.6 mass % or less. By setting the sum of the content of the first element and the content of the second element within the above range, the densification of a sintered body to be produced becomes necessary and sufficient.

When the ratio of the sum of the content of the first element and the content of the second element to the content of Si is represented by (E1+E2)/Si, (E1+E2)/Si is preferably 0.2 or more and 0.9 or less, more preferably 0.25 or more and 0.8 or less, further more preferably 0.3 or more and 0.7 or less. By setting the ratio (E1+E2)/Si within the above range, a decrease in the toughness or the like when Si is added is sufficiently compensated by the addition of the first element and the second element. As a result, a metal powder capable of producing a sintered body which has excellent mechanical properties such as toughness in spite of having a high density and also has excellent corrosion resistance attributed to Si is obtained.

Further, when the ratio of the sum of the content of the first element and the content of the second element to the content of C is represented by (E1+E2)/C, (E1+E2)/C is preferably 2 or more and 36 or less, more preferably 10 or more and 30 or less, further more preferably 15 or more and 26 or less. By setting the ratio (E1+E2)/C within the above range, an increase in the hardness and a decrease in the toughness when C is added, and an increase in the density brought about by the addition of the first element and the second element can be both achieved. As a result, a metal powder capable of producing a sintered body which has excellent mechanical properties such as tensile strength and toughness is obtained.

Other Element

The metal powder for powder metallurgy may contain, other than the above-mentioned elements, at least one element of Mn, W, N, and S as needed. These elements are also inevitably contained in some cases.

Mn is an element which imparts corrosion resistance and high mechanical properties to a sintered body to be produced in the same manner as Si.

The content of Mn in the metal powder is not particularly limited, but is preferably 0.05 mass % or more and 1.5 mass % or less, more preferably 0.1 mass % or more and 1 mass % or less. By setting the content of Mn within the above range, a sintered body having a high density and excellent mechanical properties is obtained. Further, Mn can increase the mechanical strength while suppressing the decrease in elongation. Further, Mn can suppress the increase in brittleness at a high temperature (when glowing).

If the content of Mn is less than the above lower limit, the corrosion resistance and the mechanical properties of a sintered body to be produced may not be sufficiently enhanced depending on the overall composition. On the other hand, if the content of Mn exceeds the above upper limit, the corrosion resistance or the mechanical properties may be decreased instead.

W is an element which enhances the heat resistance of a sintered body to be produced.

The content of W in the metal powder is not particularly limited, but is preferably 1 mass % or more and 4 mass % or less, more preferably 2 mass % or more and 3 mass % or less. By setting the content of W within the above range, the heat resistance of a sintered body to be produced can be further enhanced without causing a large decrease in the density of the sintered body.

N is an element which enhances the mechanical properties such as proof stress of a sintered body to be produced.

The content of N in the metal powder is not particularly limited, but is preferably 0.03 mass % or more and 1 mass % or less, more preferably 0.08 mass % or more and 0.5 mass % or less, further more preferably 0.1 mass % or more and 0.3 mass % or less. By setting the content of N within the above range, the mechanical properties such as proof stress of a sintered body to be produced can be further enhanced without causing a large decrease in the density of the sintered body.

In the case where the metal powder to which N is added is produced, for example, a method in which a nitrided raw material is used, a method in which nitrogen gas is introduced into a molten metal, a method in which the produced metal powder is subjected to a nitriding treatment, or the like is used.

S is an element which enhances the machinability of a sintered body to be produced.

The content of S in the metal powder is not particularly limited, but is preferably 0.5 mass % or less, more preferably 0.01 mass % or more and 0.3 mass % or less. By setting the content of S within the above range, the machinability of a sintered body to be produced can be further enhanced without causing a large decrease in the density of the sintered body.

To the metal powder for powder metallurgy, B, Se, Te, Pd, or the like may be added other than the above-mentioned elements. At this time, the contents of these elements are not particularly limited, but the content of each of these elements is preferably less than 0.1 mass %, and even the total content of these elements is preferably less than 0.2 mass %. These elements are also inevitably contained in some cases.

The metal powder for powder metallurgy may contain impurities. Examples of the impurities include all elements other than the above-mentioned elements, and specific examples thereof include Li, Be, Na, Mg, P, K, Ca, Sc, Zn, Ga, Ge, Ag, In, Sn, Sb, Os, Ir, Pt, Au, and Bi. The incorporation amounts of these impurity elements are preferably set such that the content of each of the impurity elements is less than the content of each of Fe, Ni, Si, C, the first element, and the second element. Further, the incorporation amounts of these impurity elements are preferably set such that the content of each of the impurity elements is less than 0.03 mass %, more preferably less than 0.02 mass %.

Further, even the total content of these impurity elements is set to preferably less than 0.3 mass %, more preferably less than 0.2 mass %. These elements do not inhibit the effect as described above as long as the contents thereof are within the above range, and therefore may be intentionally added to the metal powder.

Meanwhile, 0 (oxygen) may also be intentionally added to or inevitably mixed in the metal powder, however, the amount thereof is preferably about 0.8 mass % or less, more preferably about 0.5 mass % or less. By controlling the amount of oxygen in the metal powder within the above range, the sinterability is enhanced, and thus, a sintered body having a high density and excellent mechanical properties is obtained. Incidentally, the lower limit thereof is not particularly set, but is preferably 0.03 mass % or more from the viewpoint of ease of mass production or the like.

Fe is a component (principal component) whose content is the highest in the alloy constituting the metal powder for powder metallurgy and has a great influence on the properties of the sintered body. The content of Fe is not particularly limited, but is preferably 50 mass % or more.

The compositional ratio of the metal powder for powder metallurgy can be determined by, for example, Iron and steel—Atomic absorption spectrometric method specified in JIS G 1257 (2000), Iron and steel—ICP atomic emission spectrometric method specified in JIS G 1258 (2007), Iron and steel—Method for spark discharge atomic emission spectrometric analysis specified in JIS G 1253 (2002), Iron and steel—Method for X-ray fluorescence spectrometric analysis specified in JIS G 1256 (1997), gravimetric, titrimetric, and absorption spectrometric methods specified in JIS G 1211 to G 1237, or the like. Specifically, for example, an optical emission spectrometer for solids (spark optical emission spectrometer, model: SPECTROLAB, type: LAVMB08A) manufactured by SPECTRO Analytical Instruments GmbH or an ICP device (model: CIROS-120) manufactured by Rigaku Corporation can be used.

Incidentally, the methods specified in JIS G 1211 to G 1237 are as follows.

JIS G 1211 (2011): Iron and steel—Methods for determination of carbon content

JIS G 1212 (1997): Iron and steel—Methods for determination of silicon content

JIS G 1213 (2001): Iron and steel—Methods for determination of manganese content JIS G 1214 (1998): Iron and steel—Methods for determination of phosphorus content JIS G 1215 (2010): Iron and steel—Methods for determination of sulfur content JIS G 1216 (1997): Iron and steel—Methods for determination of nickel content JIS G 1217 (2005): Iron and steel—Methods for determination of chromium content JIS G 1218 (1999): Iron and steel—Methods for determination of molybdenum content JIS G 1219 (1997): Iron and steel—Methods for determination of copper content JIS G 1220 (1994): Iron and steel—Methods for determination of tungsten content JIS G 1221 (1998): Iron and steel—Methods for determination of vanadium content JIS G 1222 (1999): Iron and steel—Methods for determination of cobalt content JIS G 1223 (1997): Iron and steel—Methods for determination of titanium content JIS G 1224 (2001): Iron and steel—Methods for determination of aluminum content JIS G 1225 (2006): Iron and steel—Methods for determination of arsenic content JIS G 1226 (1994): Iron and steel—Methods for determination of tin content JIS G 1227 (1999): Iron and steel—Methods for determination of boron content JIS G 1228 (2006): Iron and steel—Methods for determination of nitrogen content JIS G 1229 (1994): Steel—Methods for determination of lead content JIS G 1232 (1980): Methods for determination of zirconium in steel JIS G 1233 (1994): Steel—Method for determination of selenium content JIS G 1234 (1981): Methods for determination of tellurium in steel JIS G 1235 (1981): Methods for determination of antimony in iron and steel JIS G 1236 (1992): Method for determination of tantalum in steel JIS G 1237 (1997): Iron and steel—Methods for determination of niobium content Further, when C (carbon) and S (sulfur) are determined, particularly, an infrared absorption method after combustion in a current of oxygen (after combustion in a high-frequency induction heating furnace) specified in JIS G 1211 (2011) is also used. Specifically, a carbon-sulfur analyzer, CS-200 manufactured by LECO Corporation can be used.

Further, when N (nitrogen) and O (oxygen) are determined, particularly, a method for determination of nitrogen content in iron and steel specified in JIS G 1228 (2006) and a method for determination of oxygen content in metallic materials specified in JIS Z2613 (2006) are also used. Specifically, an oxygen-nitrogen analyzer, TC-300/EF-300 manufactured by LECO Corporation can be used.

The sintered body produced using the metal powder for powder metallurgy as described above is a sintered body in which Fe is contained as a principal component, Ni is contained in a proportion of 2 mass % or more and 20 mass % or less, Si is contained in a proportion of 0.3 mass % or more and 5.0 mass % or less, C is contained in a proportion of 0.005 mass % or more and 0.3 mass % or less, the first element is contained in a proportion of 0.01 mass % or more and 0.7 mass % or less, and the second element is contained in a proportion of 0.01 mass % or more and 0.7 mass % or less. That is, it becomes a sintered body having the composition of the metal powder for powder metallurgy.

Such a sintered body has a high density and excellent mechanical properties. That is, a sintered body produced by molding a composition containing the metal powder for powder metallurgy and a binder, followed by degreasing and sintering has a higher relative density than a sintered body obtained by sintering a metal powder in the related art. Therefore, according to the invention, a sintered body having a high density which could not be obtained unless an HIP treatment is performed can be realized without performing an HIP treatment.

Further, also with respect to a hardening treatment of the surface, a sufficient hardness (mechanical properties) can be obtained by a hardening treatment at a lower temperature or a hardening treatment even at a high temperature for a short period of time. Therefore, the change in dimension due to the hardening treatment is suppressed, and a sintered body (gear) having high dimensional accuracy is obtained in the end.

Incidentally, it is observed that in the thus obtained sintered body, the porosity near the surface is relatively smaller than the porosity inside the sintered body in many cases. The reason for this is not clear, however, one of the reasons is due to the fact that by adding the first element and the second element, a sintering reaction is more likely to proceed near the surface than inside the molded body.

Specifically, when the porosity near the surface of the sintered body is represented by A1 and the porosity inside the sintered body is represented by A2, A2-A1 is preferably 0.5% or more and 10% or less, more preferably 1% or more and 5% or less. The sintered body showing the value of A2-A1 within the above range not only has a necessary and sufficient mechanical strength, but also can easily flatten the surface. That is, by polishing the surface of such a sintered body, a surface having high specularity can be obtained. According to this, a gear which has a smooth tooth surface and a small transmission loss is obtained.

Incidentally, the porosity A1 near the surface of the sintered body refers to a porosity in a 25-μm radius region centered on the position at a depth of 50 μm from the surface of the cross section of the sintered body. Further, the porosity A2 inside the sintered body refers to a porosity in a 25-μm radius region centered on the position at a depth of 300 μm from the surface of the cross section of the sintered body. These porosities are values obtained by observing the cross section of the sintered body with a scanning electron microscope and dividing the area of pores present in the region by the area of the region.

Deceleration Device

Next, an embodiment of a deceleration device according to the invention will be described.

Figure 2:
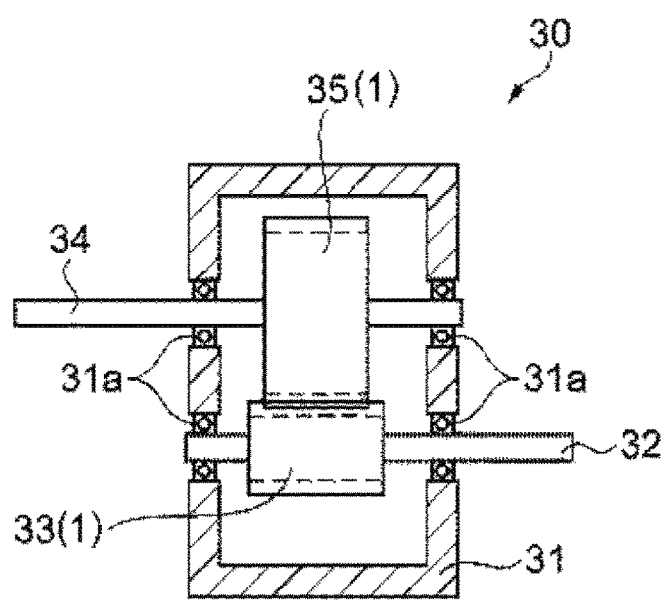
FIG. 2 is a cross-sectional view schematically showing an embodiment of a deceleration device according to the invention.

FIG. 2 is a cross-sectional view schematically showing an embodiment of a deceleration device according to the invention. Incidentally, in FIG. 2, the same constituent parts as those of the above-mentioned embodiment are denoted by the same reference numerals as described previously, and a detailed description thereof is omitted.

A deceleration device 30 shown in FIG. 2 includes a support stand 31. In this support stand 31, two sets of pairs of bearings 31a are provided such that a pair of bearings 31a form one set and the bearings 31a are provided at positions facing each other.

Then, in one set of bearings 31a, an input shaft 32 is provided so as to pass through the pair of bearings 31a. In this input shaft 32, a first gear 33 is inserted and fixed.

Further, in the other set of bearings 31a, an output shaft 34 is provided so as to pass through the pair of bearings 31a. In this output shaft 34, a second gear 35 is inserted and fixed.

The first gear 33 and the second gear 35 are engaged with each other, and the number of teeth of the second gear 35 is larger than the number of teeth of the first gear 33. Therefore, when the input shaft 32 is rotated, decelerated rotation is output to the output shaft 34.

At least one (in this embodiment, both) of these first gear 33 and the second gear 35 is the gear 1. That is, the deceleration device 30 includes the gear 1. According to this, the deceleration device 30 having high reliability is obtained.

Incidentally, the form of the deceleration device according to the invention is not limited to the above-mentioned form. For example, the deceleration device according to the invention may be a so-called spur type deceleration device as described above, but may be a planetary type deceleration device, or may be a deceleration device including a wave gear (wave gear device). Further, it may be a worm deceleration device, a bevel gear deceleration device, a helical deceleration device, a hypoid deceleration device, a ball deceleration device, a roller deceleration device, or the like.

Robot

Next, an embodiment of a robot according to the invention will be described.

Figure 3:
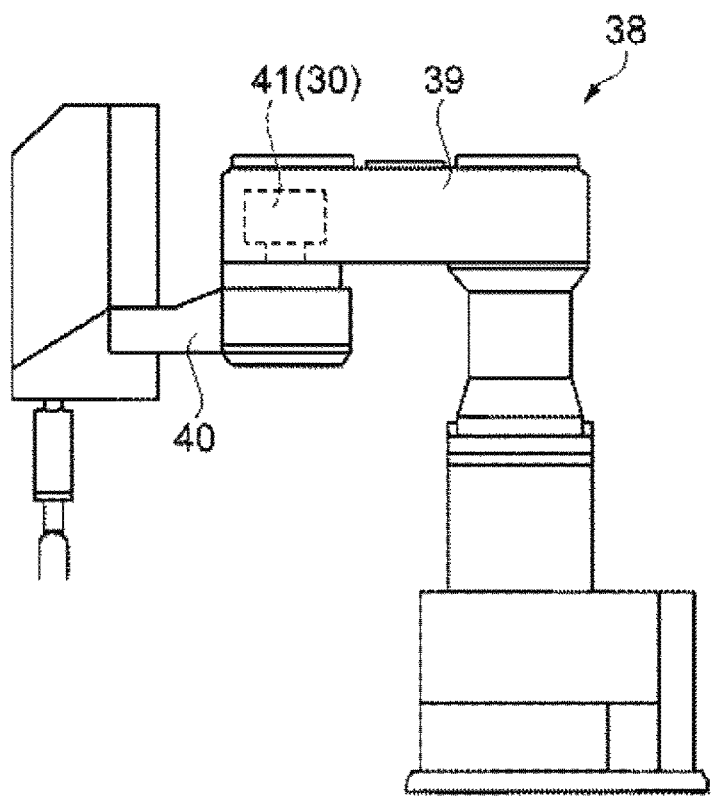
FIG. 3 is a front view schematically showing a first embodiment of a robot according to the invention.

FIG. 3 is a front view schematically showing a first embodiment of a robot according to the invention. Incidentally, in FIG. 3, the same constituent parts as those of the above-mentioned embodiments are denoted by the same reference numerals as described previously, and a detailed description thereof is omitted.

A robot 38 shown in FIG. 3 includes a first arm 39. Further, to the first arm 39, a second arm 40 is connected.

In the first arm 39, a driving device 41 is provided as a driving source. The driving device 41 includes a motor and a deceleration device 30 which decelerates and outputs the rotational speed of the output shaft of the motor. The output shaft of the deceleration device 30 is connected to the second arm 40. According to this configuration, when the driving device 41 is driven, the second arm 40 can be rotationally moved with respect to the first arm 39.

Figure 4:
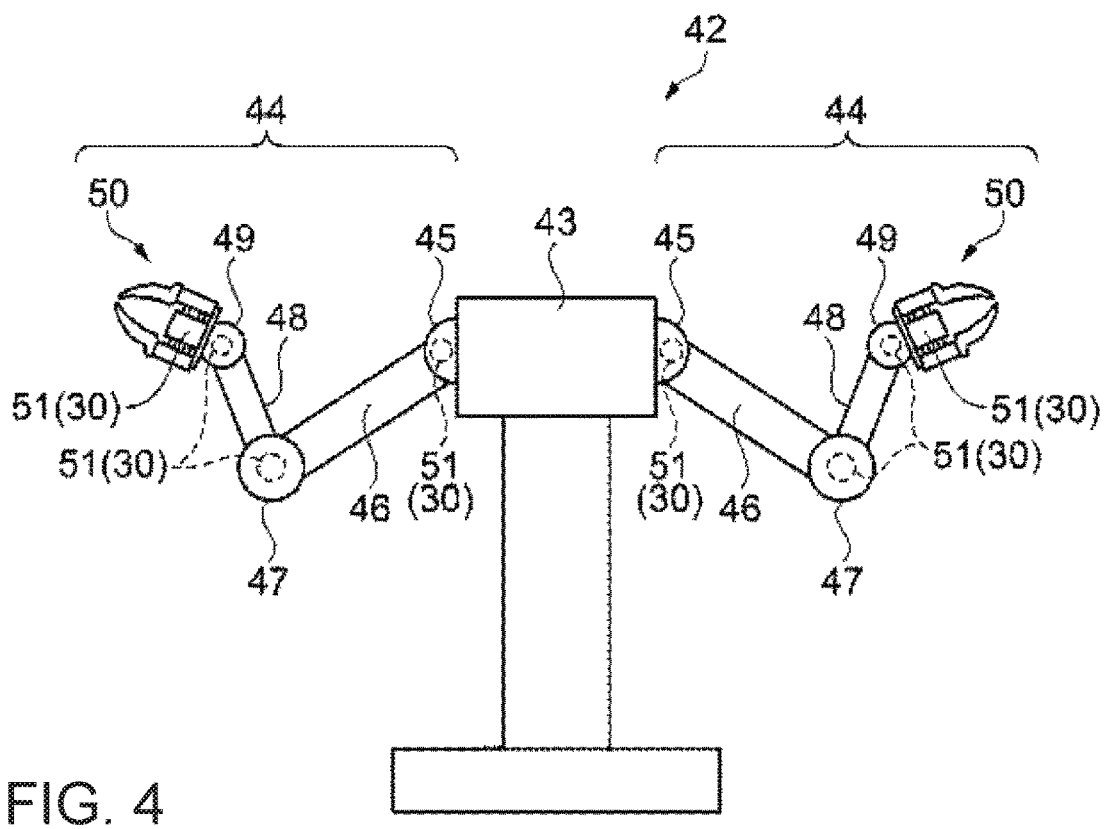
FIG. 4 is a front view schematically showing a second embodiment of a robot according to the invention.

FIG. 4 is a front view schematically showing a second embodiment of the robot according to the invention. Incidentally, in FIG. 4, the same constituent parts as those of the above-mentioned embodiments are denoted by the same reference numerals as described previously, and a detailed description thereof is omitted.

A robot 42 shown in FIG. 4 is a so-called double arm robot having two arms. This robot 42 includes a main body section 43. Further, to the main body section 43, a pair of arm sections 44 are connected. Each of these arm sections 44 has a structure in which a shoulder joint section 45, a first ring 46, an elbow joint section 47, a second ring 48, a wrist joint section 49, and a grip section 50 are connected in this order.

Further, in each of the shoulder joint section 45, the elbow joint section 47, the wrist joint section 49, and the grip section 50, a driving device 51 is provided as a driving source. The driving device 51 includes a motor and a deceleration device 30 which decelerates and outputs the rotational speed of the output shaft of the motor.

That is, the robot 38 shown in FIG. 3 and the robot 42 shown in FIG. 4 each include the deceleration device 30 which is one example of a power transmission section, and this deceleration device 30 includes the gear 1 (see FIG. 1). According to this, the robots 38 and 42 having high reliability are obtained.

Moving Object

Next, an embodiment of a moving object according to the invention will be described.

Figure 5:
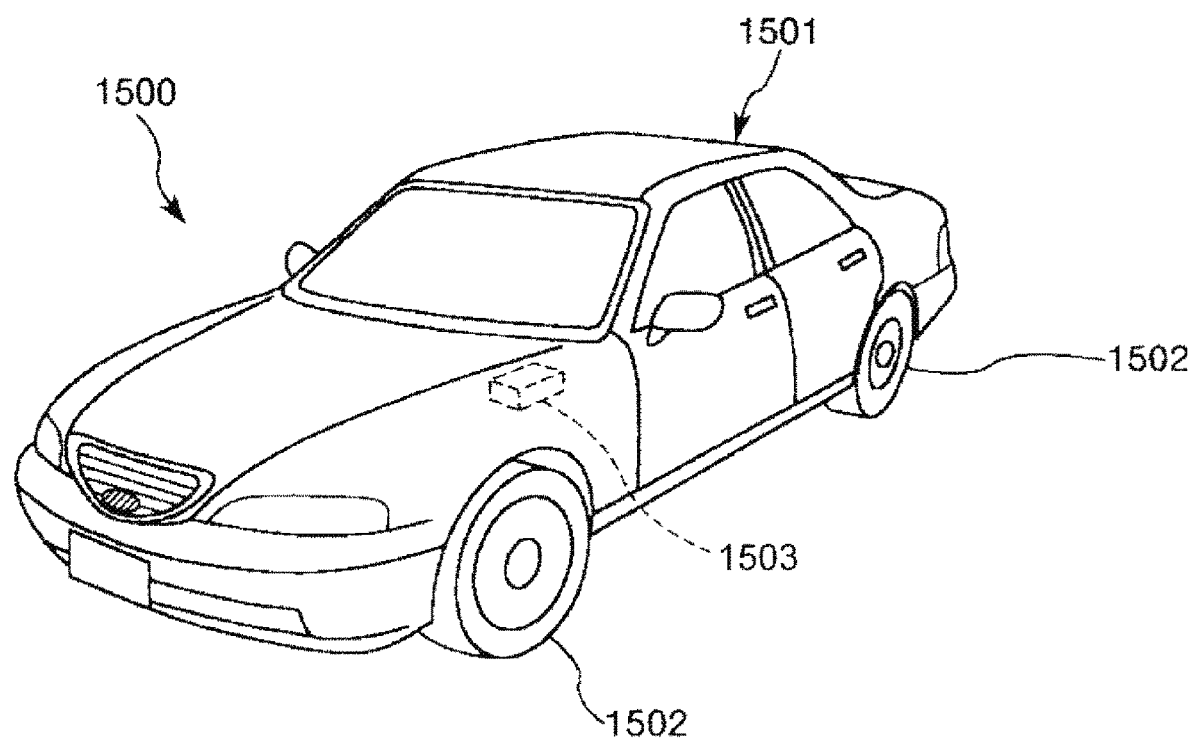
FIG. 5 is a perspective view showing a structure of an automobile which is an embodiment of a moving object according to the invention.

FIG. 5 is a perspective view showing a structure of an automobile which is an embodiment of a moving object according to the invention. Incidentally, in FIG. 5, the same constituent parts as those of the above-mentioned embodiments are denoted by the same reference numerals as described previously, and a detailed description thereof is omitted.

A moving object 1500 shown in FIG. 5 includes a car body 1501 and four wheels 1502, and is configured to rotate the wheels 1502 by a power source (engine) (not shown) provided in the car body 1501.

Further, between the power source and the wheel 1502, a transmission 1503 (an embodiment of the deceleration device according to the invention) is provided. This transmission 1503 transmits the torque, rotational speed, and rotational direction of the power output from the power source to the wheels 1502. According to this, a driver can drive the moving object 1500 freely.

That is, the moving object 1500 shown in FIG. 5 includes the transmission 1503 which is one example of a power transmission section, and this transmission 1503 includes the gear 1 (see FIG. 1).

Incidentally, the moving object according to the invention is not limited to an automobile, and can be applied to, for example, various moving objects such as aircrafts, helicopters, ships, trains, heavy machineries, two-wheeled vehicles, and bicycles.

Hereinabove, the gear, the deceleration device, the robot, and the moving object according to the invention have been described with reference to preferred embodiments, however, the invention is not limited thereto.

Further, the gear according to the invention is used for, for example, components for transport machinery such as components for automobiles, components for bicycles, components for railroad cars, components for ships, components for airplanes, and components for space transport machinery (such as rockets), components for electronic devices such as components for personal computers and components for mobile phone terminals, components for electrical devices such as refrigerators, washing machines, and cooling and heating machines, components for machines such as machine tools and semiconductor production devices, components for plants such as atomic power plants, thermal power plants, hydroelectric power plants, oil refinery plants, and chemical complexes, components for timepieces, and all other sorts of machines.

Further, the above-mentioned sintered body can be also applied to various machine elements such as pulleys, shafts, bearings, levers, wedges, wheels, screws, nuts, and links other than gears. Also in such a case, the same effect as in the case of gears is obtained.

EXAMPLES

Next, Examples of the invention will be described.
1. Production of Sintered Body (Zr—Nb Based)
Sample No. 1
  (1) First, a metal powder having a composition shown in Table 1 produced by a water atomization method was prepared.
  The composition of the powder shown in Table 1 was identified and quantitatively determined by inductively coupled high-frequency plasma optical emission spectrometry (ICP analysis method). In the ICP analysis, an ICP device (model: CIROS-120) manufactured by Rigaku Corporation was used. Further, in the identification and quantitative determination of C, a carbon-sulfur analyzer (CS-200) manufactured by LECO Corporation was used. Further, in the identification and quantitative determination of 0, an oxygen-nitrogen analyzer (TC-300/EF-300) manufactured by LECO Corporation was used.
  (2) Subsequently, the metal powder and a mixture (organic binder) of polypropylene and a wax were weighed at a mass ratio of 9:1 and mixed with each other, whereby a mixed raw material was obtained.
  (3) Subsequently, this mixed raw material was kneaded using a kneader, whereby a compound was obtained.
  (4) Subsequently, this compound was molded using an injection molding machine under the following molding conditions, whereby a molded body was produced.
Molding Conditions
  Material temperature: 150° C.
  Injection pressure: 11 MPa (110 kgf/cm$^2$)
  (5) Subsequently, the obtained molded body was subjected to a heat treatment (degreasing treatment) under the following degreasing conditions, whereby a degreased body was obtained.
Degreasing Conditions
  Degreasing temperature: 500° C.
  Degreasing time: 1 hour (retention time at the degreasing temperature)
  Degreasing atmosphere: nitrogen atmosphere
  (6) Subsequently, the obtained degreased body was fired under the following firing conditions, whereby a sintered body was obtained. The shape of the sintered body was determined to be a cylinder with a diameter of 10 mm and a thickness of 5 mm.
Firing Conditions
  Firing temperature: 1200° C.
  Firing time: 3 hours (retention time at the firing temperature)
  Firing atmosphere: argon atmosphere
  (7) Subsequently, the obtained sintered body was sequentially subjected to a solid solution heat treatment and a precipitation hardening heat treatment under the following conditions.
Conditions for Solid Solution Heat Treatment
  Heating temperature: 1050° C.
  heating time: 10 minutes
  Cooling method: water cooling
Conditions for Precipitation Hardening Heat Treatment
  Heating temperature: 620° C.
  heating time: 60 minutes
  Cooling method: air cooling
Sample Nos. 2 to 24
  Sintered bodies were obtained in the same manner as the method for producing the sintered body of sample No. 1 except that the composition and the like of the metal powder for powder metallurgy were changed as shown in Table 1, respectively. Some sintered bodies were subjected to an HIP treatment under the following conditions after firing. Further, some other sintered bodies were obtained using a metal powder produced by a gas atomization method, respectively, and "Gas" is entered in the column of Remarks in Table 1.
HIP Treatment Conditions
  Heating temperature: 1100° C.
  Heating time: 2 hours
  Applied pressure: 100 MPa

TABLE 1

| | | Metal powder for powder metallurgy | | | | | | | | | | | | | | |
|---|---|---|---|---|---|---|---|---|---|---|---|---|---|---|---|---|
| | | Alloy composition | | | | | | | | | | | | | | |
| Sample No. | — | Cr | Ni | Si | C | E1 (Zr) | E2 (Nb) | Al | Cu | O | Fe | E1/E2 | E1 + E2 | (E1 + E2)/Si | (E1 + E2)/C | Remarks |
| | | mass % | | | | | | | | | | — | mass % | — | — | — |
| No. 1 | Ex. | 16.43 | 4.12 | 0.73 | 0.018 | 0.09 | 0.32 | 0.00 | 3.98 | 0.28 | Remainder | 0.28 | 0.41 | 0.56 | 22.78 | |
| No. 2 | Ex. | 17.15 | 3.58 | 0.63 | 0.023 | 0.07 | 0.17 | 0.00 | 4.25 | 0.31 | Remainder | 0.41 | 0.24 | 0.38 | 10.43 | |
| No. 3 | Ex. | 15.84 | 4.49 | 0.81 | 0.029 | 0.05 | 0.42 | 0.00 | 3.49 | 0.42 | Remainder | 0.12 | 0.47 | 0.58 | 16.21 | |
| No. 4 | Ex. | 16.19 | 3.89 | 0.36 | 0.052 | 0.05 | 0.29 | 0.00 | 4.56 | 0.25 | Remainder | 0.17 | 0.34 | 0.94 | 6.54 | |
| No. 5 | Ex. | 16.88 | 4.05 | 1.63 | 0.069 | 0.12 | 0.18 | 0.00 | 4.78 | 0.36 | Remainder | 0.67 | 0.30 | 0.18 | 4.35 | |
| No. 6 | Ex. | 16.75 | 3.25 | 0.68 | 0.007 | 0.05 | 0.38 | 0.00 | 4.12 | 0.28 | Remainder | 0.13 | 0.43 | 0.63 | 61.43 | |
| No. 7 | Ex. | 17.22 | 4.76 | 0.84 | 0.152 | 0.08 | 0.22 | 0.00 | 3.76 | 0.32 | Remainder | 0.36 | 0.30 | 0.36 | 1.97 | |
| No. 8 | Ex. | 17.78 | 7.36 | 0.75 | 0.048 | 0.07 | 0.08 | 0.84 | 0.00 | 0.48 | Remainder | 0.88 | 0.15 | 0.20 | 3.13 | |
| No. 9 | Ex. | 17.25 | 6.89 | 0.79 | 0.029 | 0.05 | 0.11 | 1.32 | 0.00 | 0.55 | Remainder | 0.45 | 0.16 | 0.20 | 5.52 | |
| No. 10 | Ex. | 16.89 | 8.24 | 0.67 | 0.036 | 0.09 | 0.10 | 1.11 | 0.00 | 0.46 | Remainder | 0.90 | 0.19 | 0.28 | 5.28 | |

TABLE 1-continued

| | | Metal powder for powder metallurgy | | | | | | | | | | | | | | |
|---|---|---|---|---|---|---|---|---|---|---|---|---|---|---|---|---|
| | | Alloy composition | | | | | | | | | | | | | | |
| Sample No. | — | Cr | Ni | Si | C | E1 (Zr) | E2 (Nb) | Al | Cu | O | Fe | E1/E2 | E1 + E2 | (E1 + E2)/Si | (E1 + E2)/C | Remarks |
| | | mass % | | | | | | | | | | — | mass % | — | — | — |
| No. 11 | Ex. | 16.31 | 4.29 | 0.75 | 0.019 | 0.15 | 0.35 | 0.00 | 3.78 | 0.28 | Remainder | 0.43 | 0.50 | 0.67 | 26.32 | Gas |
| No. 12 | Ex. | 17.24 | 3.61 | 0.62 | 0.025 | 0.07 | 0.28 | 0.00 | 4.31 | 0.33 | Remainder | 0.25 | 0.35 | 0.56 | 14.00 | Gas |
| No. 13 | Ex. | 15.54 | 4.67 | 0.88 | 0.031 | 0.05 | 0.43 | 0.00 | 3.61 | 0.45 | Remainder | 0.12 | 0.48 | 0.55 | 15.48 | Gas |
| No. 14 | Comp. Ex. | 16.42 | 4.08 | 0.75 | 0.017 | 0.00 | 0.32 | 0.00 | 3.96 | 0.29 | Remainder | 0.00 | 0.32 | 0.43 | 18.82 | |
| No. 15 | Comp. Ex. | 17.18 | 3.54 | 0.62 | 0.024 | 0.05 | 0.00 | 0.00 | 4.31 | 0.32 | Remainder | — | 0.05 | 0.08 | 2.08 | |
| No. 16 | Comp. Ex. | 15.78 | 4.41 | 0.82 | 0.032 | 0.00 | 0.00 | 0.00 | 3.51 | 0.41 | Remainder | — | 0.00 | 0.00 | 0.00 | |
| No. 17 | Comp. Ex. | 16.25 | 3.86 | 0.88 | 0.021 | 0.75 | 0.07 | 0.00 | 4.11 | 0.36 | Remainder | 10.71 | 0.82 | 0.93 | 39.05 | |
| No. 18 | Comp. Ex. | 17.01 | 4.21 | 0.66 | 0.035 | 0.06 | 0.71 | 0.00 | 3.89 | 0.41 | Remainder | 0.08 | 0.77 | 1.17 | 22.00 | |
| No. 19 | Comp. Ex. | 16.55 | 4.18 | 0.15 | 0.015 | 0.06 | 0.29 | 0.00 | 3.76 | 0.27 | Remainder | 0.21 | 0.35 | 2.33 | 23.33 | |
| No. 20 | Comp. Ex. | 16.94 | 3.54 | 0.66 | 0.002 | 0.08 | 0.34 | 0.00 | 4.23 | 0.29 | Remainder | 0.24 | 0.42 | 0.64 | 210.00 | |
| No. 21 | Comp. Ex. | 17.22 | 4.15 | 0.74 | 0.380 | 0.17 | 0.26 | 0.00 | 3.77 | 0.45 | Remainder | 0.65 | 0.43 | 0.58 | 1.13 | |
| No. 22 | Comp. Ex. | 17.75 | 7.29 | 0.77 | 0.046 | 0.00 | 0.08 | 0.88 | 0.00 | 0.48 | Remainder | 0.00 | 0.08 | 0.10 | 1.74 | |
| No. 23 | Comp. Ex. | 17.19 | 6.91 | 0.81 | 0.031 | 0.05 | 0.00 | 1.35 | 0.00 | 0.53 | Remainder | — | 0.05 | 0.06 | 1.61 | |
| No. 24 | Comp. Ex. | 16.42 | 4.08 | 0.75 | 0.017 | 0.00 | 0.32 | 0.00 | 3.96 | 0.29 | Remainder | 0.00 | 0.32 | 0.43 | 18.82 | HIP treatment |

In Table 1, among the sintered bodies of the respective sample Nos., those corresponding to the invention are denoted by "Ex." (Example), and those not corresponding to the invention are denoted by "Comp. Ex." (Comparative Example).

Each sintered body contained very small amounts of impurities, but the description thereof in Table 1 is omitted.

Sample No. 25

(1) First, a metal powder having a composition shown in Table 2 was produced by a water atomization method in the same manner as in the case of sample No. 1.

(2) Subsequently, the metal powder was granulated by a spray drying method. The binder used at this time was polyvinyl alcohol, which was used in an amount of 1 part by mass with respect to 100 parts by mass of the metal powder. Further, a solvent (ion exchanged water) was used in an amount of 50 parts by mass with respect to 1 part by mass of polyvinyl alcohol. In this manner, a granulated powder having an average particle diameter of 50 μm was obtained.

(3) Subsequently, this granulated powder was subjected to powder compaction molding under the following molding conditions. In this molding, a press molding machine was used. The shape of the molded body to be produced was determined to be a cube with a side length of 20 mm.

Molding Conditions
　Material temperature: 90° C.
　Molding pressure: 600 MPa (6 t/cm²)

(4) Subsequently, the obtained molded body was subjected to a heat treatment (degreasing treatment) under the following degreasing conditions, whereby a degreased body was obtained.

Degreasing Conditions
Degreasing temperature: 450° C.
Degreasing time: 2 hours (retention time at the degreasing temperature)
Degreasing atmosphere: nitrogen atmosphere (5) Subsequently, the obtained degreased body was fired under the following firing conditions, whereby a sintered body was obtained.

Firing Conditions
　Firing temperature: 1200° C.
　Firing time: 3 hours (retention time at the firing temperature)
　Firing atmosphere: argon atmosphere (6) Subsequently, the obtained sintered body was sequentially subjected to a solid solution heat treatment and a precipitation hardening heat treatment under the following conditions.

Conditions for Solid Solution Heat Treatment
　Heating temperature: 1050° C.
　heating time: 10 minutes
　Cooling method: water cooling Conditions for Precipitation Hardening Heat Treatment
　Heating temperature: 480° C.
　heating time: 60 minutes
　Cooling method: air cooling Sample Nos. 26 to 40

Sintered bodies were obtained in the same manner as in the case of sample No. 25 except that the composition and the like of the metal powder for powder metallurgy were changed as shown in Table 2, respectively. Some sintered bodies were subjected to an HIP treatment under the following conditions after firing.

HIP Treatment Conditions
　Heating temperature: 1100° C.
　Heating time: 2 hours
　Applied pressure: 100 MPa

TABLE 2

| | | Metal powder for powder metallurgy | | | | | | | | | | | | | | |
|---|---|---|---|---|---|---|---|---|---|---|---|---|---|---|---|---|
| | | Alloy composition | | | | | | | | | | | | | | |
| Sample No. | — | Cr | Ni | Si | C | E1 (Zr) | E2 (Nb) | Al | Cu | O | Fe | E1/E2 | E1 + E2 | (E1 + E2)/Si | (E1 + E2)/C | Remarks |
| | | mass % | | | | | | | | | | — | mass % | — | — | — |
| No. 25 | Ex. | 16.43 | 4.12 | 0.73 | 0.018 | 0.09 | 0.32 | 0.00 | 3.98 | 0.28 | Remainder | 0.28 | 0.41 | 0.56 | 22.78 | Powder compaction |
| No. 26 | Ex. | 17.15 | 3.58 | 0.63 | 0.023 | 0.07 | 0.17 | 0.00 | 4.25 | 0.31 | Remainder | 0.41 | 0.24 | 0.38 | 10.43 | Powder compaction |

TABLE 2-continued

| | | Metal powder for powder metallurgy | | | | | | | | | | | | | | |
|---|---|---|---|---|---|---|---|---|---|---|---|---|---|---|---|---|
| | | Alloy composition | | | | | | | | | | | | | | |
| Sample No. | — | Cr | Ni | Si | C | E1 (Zr) | E2 (Nb) | Al | Cu | O | Fe | E1/E2 | E1 + E2 mass % | (E1 + E2)/Si | (E1 + E2)/C | Remarks |
| | | mass % | | | | | | | | | | — | | — | — | |
| No. 27 | Ex. | 15.84 | 4.49 | 0.81 | 0.029 | 0.05 | 0.42 | 0.00 | 3.49 | 0.42 | Remainder | 0.12 | 0.47 | 0.58 | 16.21 | Powder compaction |
| No. 28 | Ex. | 16.19 | 3.89 | 0.36 | 0.052 | 0.05 | 0.29 | 0.00 | 4.56 | 0.25 | Remainder | 0.17 | 0.34 | 0.94 | 6.54 | Powder compaction |
| No. 29 | Ex. | 16.88 | 4.05 | 1.63 | 0.069 | 0.12 | 0.18 | 0.00 | 4.78 | 0.36 | Remainder | 0.67 | 0.30 | 0.18 | 4.35 | Powder compaction |
| No. 30 | Ex. | 16.75 | 3.25 | 0.68 | 0.007 | 0.05 | 0.38 | 0.00 | 4.12 | 0.28 | Remainder | 0.13 | 0.43 | 0.63 | 61.43 | Powder compaction |
| No. 31 | Ex. | 17.22 | 4.76 | 0.84 | 0.152 | 0.08 | 0.22 | 0.00 | 3.76 | 0.32 | Remainder | 0.36 | 0.30 | 0.36 | 1.97 | Powder compaction |
| No. 32 | Ex. | 17.78 | 7.36 | 0.75 | 0.048 | 0.07 | 0.08 | 0.84 | 0.00 | 0.48 | Remainder | 0.88 | 0.15 | 0.20 | 3.13 | Powder compaction |
| No. 33 | Ex. | 17.25 | 6.89 | 0.79 | 0.029 | 0.05 | 0.11 | 1.32 | 0.00 | 0.55 | Remainder | 0.45 | 0.16 | 0.20 | 5.52 | Powder compaction |
| No. 34 | Ex. | 16.89 | 8.24 | 0.67 | 0.036 | 0.09 | 0.10 | 1.11 | 0.00 | 0.46 | Remainder | 0.90 | 0.19 | 0.28 | 5.28 | Powder compaction |
| No. 35 | Comp. Ex. | 16.42 | 4.08 | 0.75 | 0.017 | 0.00 | 0.32 | 0.00 | 3.96 | 0.29 | Remainder | 0.00 | 0.32 | 0.43 | 18.82 | Powder compaction |
| No. 36 | Comp. Ex. | 17.18 | 3.54 | 0.62 | 0.024 | 0.05 | 0.00 | 0.00 | 4.31 | 0.32 | Remainder | — | 0.05 | 0.08 | 2.08 | Powder compaction |
| No. 37 | Comp. Ex. | 15.78 | 4.41 | 0.82 | 0.032 | 0.00 | 0.00 | 0.00 | 3.51 | 0.41 | Remainder | — | 0.00 | 0.00 | 0.00 | Powder compaction |
| No. 38 | Comp. Ex. | 16.25 | 3.86 | 0.88 | 0.021 | 0.75 | 0.07 | 0.00 | 4.11 | 0.36 | Remainder | 10.71 | 0.82 | 0.93 | 39.05 | Powder compaction |
| No. 39 | Comp. Ex. | 17.01 | 4.21 | 0.66 | 0.035 | 0.06 | 0.71 | 0.00 | 3.89 | 0.41 | Remainder | 0.08 | 0.77 | 1.17 | 22.00 | Powder compaction |
| No. 40 | Comp. Ex. | 16.42 | 4.08 | 0.75 | 0.017 | 0.00 | 0.32 | 0.00 | 3.96 | 0.29 | Remainder | 0.00 | 0.32 | 0.43 | 18.82 | HIP treatment |

In Table 2, among the sintered bodies of the respective sample Nos., those corresponding to the invention are denoted by "Ex." (Example), and those not corresponding to the invention are denoted by "Comp. Ex." (Comparative Example).

Each sintered body contained very small amounts of impurities, but the description thereof in Table 2 is omitted.

Sample No. 41

(1) First, a metal powder having a composition shown in Table 3 produced by a water atomization method was prepared. Incidentally, the compositional ratio of the metal powder shown in Table 3 is a Zr—Nb-based metal powder in the same manner as in Table 1, however, the compositional ratio of elements other than Zr and Nb is different.

The composition of the powder shown in Table 3 was identified and quantitatively determined by inductively coupled high-frequency plasma optical emission spectrometry (ICP analysis method). In the ICP analysis, an ICP device (model: CIROS-120) manufactured by Rigaku Corporation was used. Further, in the identification and quantitative determination of C, a carbon-sulfur analyzer (CS-200) manufactured by LECO Corporation was used. Further, in the identification and quantitative determination of 0, an oxygen-nitrogen analyzer (TC-300/EF-300) manufactured by LECO Corporation was used.

(2) Subsequently, the metal powder and a mixture (organic binder) of polypropylene and a wax were weighed at a mass ratio of 9:1 and mixed with each other, whereby a mixed raw material was obtained.

(3) Subsequently, this mixed raw material was kneaded using a kneader, whereby a compound was obtained.

(4) Subsequently, this compound was molded using an injection molding machine under the same molding conditions as for sample No. 1, whereby a molded body was produced.

(5) Subsequently, the obtained molded body was subjected to a heat treatment (degreasing treatment) under the same degreasing conditions as for sample No. 1, whereby a degreased body was obtained.

(6) Subsequently, the obtained degreased body was fired under the same firing conditions as for sample No. 1, whereby a sintered body was obtained.

(7) Subsequently, the obtained sintered body was sequentially subjected to a solid solution heat treatment and a precipitation hardening heat treatment under the same conditions as for sample No. 1.

Sample Nos. 42 to 65

Sintered bodies were obtained in the same manner as the method for producing the sintered body of sample No. 1 except that the composition and the like of the metal powder for powder metallurgy were changed as shown in Table 3, respectively. Some sintered bodies were subjected to an HIP treatment under the following conditions after firing. Further, some other sintered bodies were obtained using a metal powder produced by a gas atomization method, respectively, and "Gas" is entered in the column of Remarks in Table 3.

HIP Treatment Conditions

Heating temperature: 1100° C.

Heating time: 2 hours

Applied pressure: 100 MPa

TABLE 3

| | | | | | | E1 (Zr) | E2 (Nb) | | | | | | E1 + E2 | (E1 + E2)/Si | (E1 + E2)/C | |
|---|---|---|---|---|---|---|---|---|---|---|---|---|---|---|---|---|
| Sample No. | — | Cr | Ni | Si | C | mass % | | Co | Mo | O | Fe | E1/E2 | mass % | — | — | Remarks |
| No. 41 | Ex. | 0.00 | 18.05 | 0.71 | 0.015 | 0.07 | 0.08 | 7.95 | 4.87 | 0.16 | Remainder | 0.88 | 0.15 | 0.21 | 10.00 | |
| No. 42 | Ex. | 0.00 | 18.87 | 0.63 | 0.023 | 0.05 | 0.10 | 7.48 | 5.18 | 0.31 | Remainder | 0.50 | 0.15 | 0.24 | 6.52 | |
| No. 43 | Ex. | 0.00 | 17.58 | 0.83 | 0.032 | 0.11 | 0.06 | 8.25 | 3.56 | 0.11 | Remainder | 1.83 | 0.17 | 0.20 | 5.31 | |
| No. 44 | Ex. | 0.00 | 17.24 | 0.31 | 0.055 | 0.03 | 0.05 | 8.92 | 5.78 | 0.22 | Remainder | 0.60 | 0.08 | 0.26 | 1.45 | |
| No. 45 | Ex. | 0.00 | 18.24 | 1.74 | 0.019 | 0.12 | 0.18 | 8.11 | 5.02 | 0.08 | Remainder | 0.67 | 0.30 | 0.17 | 15.79 | |
| No. 46 | Ex. | 0.00 | 18.12 | 1.12 | 0.008 | 0.06 | 0.15 | 7.74 | 4.12 | 0.28 | Remainder | 0.40 | 0.21 | 0.19 | 26.25 | |
| No. 47 | Ex. | 0.00 | 17.89 | 0.82 | 0.148 | 0.08 | 0.06 | 8.57 | 4.98 | 0.25 | Remainder | 1.33 | 0.14 | 0.17 | 0.95 | |
| No. 48 | Ex. | 10.44 | 6.53 | 3.64 | 0.016 | 0.07 | 0.08 | 10.56 | 1.48 | 0.48 | Remainder | 0.88 | 0.15 | 0.04 | 9.38 | Cu: 0.89 Mn: 0.95 |
| No. 49 | Ex. | 10.89 | 6.11 | 4.03 | 0.025 | 0.05 | 0.11 | 10.12 | 0.45 | 0.42 | Remainder | 0.45 | 0.16 | 0.04 | 6.40 | Cu: 1.25 Mn: 0.63 |
| No. 50 | Ex. | 10.12 | 6.97 | 3.06 | 0.036 | 0.12 | 0.10 | 10.88 | 1.93 | 0.52 | Remainder | 1.20 | 0.22 | 0.07 | 6.11 | Cu: 0.72 Mn: 1.26 |
| No. 51 | Ex. | 0.00 | 18.12 | 0.73 | 0.018 | 0.08 | 0.07 | 7.85 | 4.69 | 0.14 | Remainder | 1.14 | 0.15 | 0.21 | 8.33 | Gas |
| No. 52 | Ex. | 0.00 | 18.93 | 0.58 | 0.025 | 0.07 | 0.12 | 7.32 | 5.14 | 0.33 | Remainder | 0.58 | 0.19 | 0.33 | 7.60 | Gas |
| No. 53 | Ex. | 0.00 | 17.56 | 0.84 | 0.033 | 0.12 | 0.05 | 8.22 | 3.67 | 0.15 | Remainder | 2.40 | 0.17 | 0.20 | 5.15 | Gas |
| No. 54 | Comp. Ex. | 0.00 | 18.11 | 0.73 | 0.016 | 0.00 | 0.07 | 7.88 | 4.95 | 0.36 | Remainder | 0.00 | 0.07 | 0.10 | 4.38 | |
| No. 55 | Comp. Ex. | 0.00 | 18.96 | 0.61 | 0.024 | 0.05 | 0.00 | 7.42 | 5.17 | 0.33 | Remainder | — | 0.05 | 0.08 | 2.08 | |
| No. 56 | Comp. Ex. | 0.00 | 17.65 | 0.84 | 0.035 | 0.00 | 0.00 | 8.26 | 3.51 | 0.45 | Remainder | — | 0.00 | 0.00 | 0.00 | |
| No. 57 | Comp. Ex. | 0.00 | 18.23 | 0.72 | 0.019 | 0.77 | 0.06 | 8.14 | 5.24 | 0.47 | Remainder | 12.83 | 0.83 | 1.15 | 43.68 | |
| No. 58 | Comp. Ex. | 0.00 | 18.09 | 0.77 | 0.018 | 0.05 | 0.71 | 8.03 | 4.79 | 0.49 | Remainder | 0.07 | 0.76 | 0.99 | 42.22 | |
| No. 59 | Comp. Ex. | 0.00 | 17.58 | 0.16 | 0.054 | 0.02 | 0.21 | 8.13 | 5.44 | 0.27 | Remainder | 0.10 | 0.23 | 1.44 | 4.26 | |
| No. 60 | Comp. Ex. | 0.00 | 18.36 | 5.24 | 0.024 | 0.31 | 0.03 | 8.47 | 4.88 | 0.45 | Remainder | 10.33 | 0.34 | 0.06 | 14.17 | |
| No. 61 | Comp. Ex. | 0.00 | 18.77 | 0.66 | 0.002 | 0.12 | 0.04 | 8.01 | 5.02 | 0.31 | Remainder | 3.00 | 0.16 | 0.24 | 80.00 | |
| No. 62 | Comp. Ex. | 0.00 | 18.23 | 0.74 | 0.374 | 0.15 | 0.45 | 7.74 | 5.10 | 0.45 | Remainder | 0.33 | 0.60 | 0.81 | 1.60 | |
| No. 63 | Comp. Ex. | 10.52 | 6.47 | 3.55 | 0.018 | 0.00 | 0.07 | 7.89 | 5.02 | 0.44 | Remainder | 0.00 | 0.07 | 0.02 | 3.89 | Cu: 0.93 Mn: 0.97 |
| No. 64 | Comp. Ex. | 10.45 | 6.68 | 4.11 | 0.028 | 0.04 | 0.00 | 7.75 | 4.99 | 0.51 | Remainder | — | 0.04 | 0.01 | 1.43 | Cu: 1.12 Mn: 1.15 |
| No. 65 | Comp. Ex. | 0.00 | 18.11 | 0.73 | 0.016 | 0.00 | 0.07 | 7.88 | 4.95 | 0.36 | Remainder | 0.00 | 0.07 | 0.10 | 4.38 | HIP treatment |

In Table 3, among the sintered bodies of the respective sample Nos., those corresponding to the invention are denoted by "Ex." (Example), and those not corresponding to the invention are denoted by "Comp. Ex." (Comparative Example).

Each sintered body contained very small amounts of impurities, but the description thereof in Table 3 is omitted.

Sample No. 66

(1) First, a metal powder having a composition shown in Table 4 was produced by a water atomization method in the same manner as in the case of sample No. 25. Incidentally, the compositional ratio of the metal powder shown in Table 4 is a Zr—Nb-based metal powder in the same manner as in Table 2, however, the compositional ratio of elements other than Zr and Nb is different.

(2) Subsequently, the metal powder was granulated by a spray drying method. The binder used at this time was polyvinyl alcohol, which was used in an amount of 1 part by mass with respect to 100 parts by mass of the metal powder. Further, a solvent (ion exchanged water) was used in an amount of 50 parts by mass with respect to 1 part by mass of polyvinyl alcohol. In this manner, a granulated powder having an average particle diameter of 50 μm was obtained.

(3) Subsequently, this granulated powder was subjected to powder compaction molding under the same molding conditions as for sample No. 25.

(4) Subsequently, the obtained molded body was subjected to a heat treatment (degreasing treatment) under the same degreasing conditions as for sample No. 25, whereby a degreased body was obtained.

(5) Subsequently, the obtained degreased body was fired under the same firing conditions as for sample No. 25, whereby a sintered body was obtained.

(6) Subsequently, the obtained sintered body was sequentially subjected to a solid solution heat treatment and a precipitation hardening heat treatment under the same conditions as for sample No. 25.

Sample Nos. 67 to 81

Sintered bodies were obtained in the same manner as in the case of sample No. 25 except that the composition and the like of the metal powder for powder metallurgy were changed as shown in Table 4, respectively. Some sintered bodies were subjected to an HIP treatment under the following conditions after firing.

HIP Treatment Conditions

Heating temperature: 1100° C.

Heating time: 2 hours

Applied pressure: 100 MPa

TABLE 4

| Sample No. | — | Cr | Ni | Si | C | E1 (Zr) | E2 (Nb) | Co | Mo | O | Fe | E1/E2 | E1 + E2 | (E1 + E2)/Si | (E1 + E2)/C | Remarks |
|---|---|---|---|---|---|---|---|---|---|---|---|---|---|---|---|---|
| | | | | | | mass % | | | | | | — | mass % | — | — | |
| No. 66 | Ex. | 0.00 | 18.05 | 0.71 | 0.015 | 0.07 | 0.08 | 7.95 | 4.87 | 0.16 | Remainder | 0.88 | 0.15 | 0.21 | 10.00 | Powder compaction |
| No. 67 | Ex. | 0.00 | 18.87 | 0.63 | 0.023 | 0.05 | 0.10 | 7.48 | 5.18 | 0.31 | Remainder | 0.50 | 0.15 | 0.24 | 6.52 | Powder compaction |
| No. 68 | Ex. | 0.00 | 17.58 | 0.83 | 0.032 | 0.11 | 0.06 | 8.25 | 3.56 | 0.11 | Remainder | 1.83 | 0.17 | 0.20 | 5.31 | Powder compaction |
| No. 69 | Ex. | 0.00 | 17.24 | 0.31 | 0.055 | 0.03 | 0.05 | 8.92 | 5.78 | 0.22 | Remainder | 0.60 | 0.08 | 0.26 | 1.45 | Powder compaction |
| No. 70 | Ex. | 0.00 | 18.24 | 1.74 | 0.019 | 0.12 | 0.18 | 8.11 | 5.02 | 0.08 | Remainder | 0.67 | 0.30 | 0.17 | 15.79 | Powder compaction |
| No. 71 | Ex. | 0.00 | 18.12 | 1.12 | 0.008 | 0.06 | 0.15 | 7.74 | 4.12 | 0.28 | Remainder | 0.40 | 0.21 | 0.19 | 26.25 | Powder compaction |
| No. 72 | Ex. | 0.00 | 17.89 | 0.82 | 0.148 | 0.08 | 0.06 | 8.57 | 4.98 | 0.25 | Remainder | 1.33 | 0.14 | 0.17 | 0.95 | Powder compaction |
| No. 73 | Ex. | 10.44 | 6.53 | 3.64 | 0.016 | 0.07 | 0.08 | 10.56 | 1.48 | 0.48 | Remainder | 0.88 | 0.15 | 0.04 | 9.38 | Cu: 0.89 Mn: 0.95 Powder compaction |
| No. 74 | Ex. | 10.89 | 6.11 | 4.03 | 0.025 | 0.05 | 0.11 | 10.12 | 0.45 | 0.42 | Remainder | 0.45 | 0.16 | 0.04 | 6.40 | Cu: 1.25 Mn: 0.63 Powder compaction |
| No. 75 | Ex. | 10.12 | 6.97 | 3.06 | 0.036 | 0.12 | 0.10 | 10.88 | 1.93 | 0.52 | Remainder | 1.20 | 0.22 | 0.07 | 6.11 | Cu: 0.72 Mn: 1.26 Powder compaction |
| No. 76 | Comp. Ex. | 0.00 | 18.11 | 0.73 | 0.016 | 0.00 | 0.07 | 7.88 | 4.95 | 0.36 | Remainder | 0.00 | 0.07 | 0.10 | 4.38 | Powder compaction |
| No. 77 | Comp. Ex. | 0.00 | 18.96 | 0.61 | 0.024 | 0.05 | 0.00 | 7.42 | 5.17 | 0.33 | Remainder | — | 0.05 | 0.08 | 2.08 | Powder compaction |
| No. 78 | Comp. Ex. | 0.00 | 17.65 | 0.84 | 0.035 | 0.00 | 0.00 | 8.26 | 3.51 | 0.45 | Remainder | — | 0.00 | 0.00 | 0.00 | Powder compaction |
| No. 79 | Comp. Ex. | 0.00 | 18.23 | 0.72 | 0.019 | 0.77 | 0.06 | 8.14 | 5.24 | 0.47 | Remainder | 12.83 | 0.83 | 1.15 | 43.68 | Powder compaction |
| No. 80 | Comp. Ex. | 0.00 | 18.09 | 0.77 | 0.018 | 0.05 | 0.71 | 8.03 | 4.79 | 0.49 | Remainder | 0.07 | 0.76 | 0.99 | 42.22 | Powder compaction |
| No. 81 | Comp. Ex. | 0.00 | 18.11 | 0.73 | 0.016 | 0.00 | 0.07 | 7.88 | 4.95 | 0.36 | Remainder | 0.00 | 0.07 | 0.10 | 4.38 | HIP treatment |

In Table 4, among the sintered bodies of the respective sample Nos., those corresponding to the invention are denoted by "Ex." (Example), and those not corresponding to the invention are denoted by "Comp. Ex." (Comparative Example).

Each sintered body contained very small amounts of impurities, but the description thereof in Table 4 is omitted.

2. Evaluation of Sintered Body (Zr—Nb Based)

2.1 Evaluation of Relative Density

With respect to the sintered bodies of the respective sample Nos. shown in Tables 1 to 4, the sintered density was measured in accordance with the method for measuring the density of sintered metal materials specified in JIS Z 2501 (2000), and also the relative density of each sintered body was calculated with reference to the true density of the metal powder for powder metallurgy used for producing each sintered body.

The calculation results are shown in Tables 5 to 8.

2.2 Evaluation of Hardness

With respect to the sintered bodies of the respective sample Nos. shown in Tables 1 to 4, the Vickers hardness was measured in accordance with the Vickers hardness test method specified in JIS Z 2244 (2009).

Then, the measured hardness was evaluated according to the following evaluation criteria.

Evaluation Criteria for Vickers Hardness

A: The Vickers hardness is particularly high.
B: The Vickers hardness is high.
C: The Vickers hardness is somewhat high.
D: The Vickers hardness is somewhat low.
E: The Vickers hardness is low.
F: The Vickers hardness is particularly low.

The evaluation results are shown in Tables 5 to 8.

2.3 Evaluation of Tensile Strength, 0.2% Proof Stress, and Elongation

With respect to the sintered bodies of the respective sample Nos. shown in Tables 1 to 4, the tensile strength, 0.2% proof stress, and elongation were measured in accordance with the metal material tensile test method specified in JIS Z 2241 (2011).

Then, the measured physical property values were evaluated according to the following evaluation criteria.

Evaluation Criteria for Tensile Strength

A: The tensile strength of the sintered body is particularly high.
B: The tensile strength of the sintered body is high.
C: The tensile strength of the sintered body is somewhat high.
D: The tensile strength of the sintered body is somewhat low.
E: The tensile strength of the sintered body is low.

F: The tensile strength of the sintered body is particularly low.

Evaluation Criteria for 0.2% Proof Stress

A: The 0.2% proof stress of the sintered body is particularly high.

B: The 0.2% proof stress of the sintered body is high.

C: The 0.2% proof stress of the sintered body is somewhat high.

D: The 0.2% proof stress of the sintered body is somewhat low.

E: The 0.2% proof stress of the sintered body is low.

F: The 0.2% proof stress of the sintered body is particularly low.

Evaluation Criteria for Elongation

A: The elongation of the sintered body is particularly high.

B: The elongation of the sintered body is high.

C: The elongation of the sintered body is somewhat high.

D: The elongation of the sintered body is somewhat low.

E: The elongation of the sintered body is low.

F: The elongation of the sintered body is particularly low.

The above evaluation results are shown in Tables 5 to 8.

2.4 Evaluation of Fatigue Strength

With respect to the sintered bodies of the respective sample Nos. shown in Tables 1 to 4, the fatigue strength was measured.

The fatigue strength was measured in accordance with the test method specified in JIS Z 2273 (1978). The waveform of an applied load corresponding to a repeated stress was set to an alternating sine wave, and the minimum/maximum stress ratio (minimum stress/maximum stress) was set to 0.1. Further, the repeated frequency was set to 30 Hz, and the repeat count was set to $1 \times 10^7$.

Then, the measured fatigue strength was evaluated according to the following evaluation criteria.

Evaluation Criteria for Fatigue Strength

A: The fatigue strength of the sintered body is particularly high.

B: The fatigue strength of the sintered body is high.

C: The fatigue strength of the sintered body is somewhat high.

D: The fatigue strength of the sintered body is somewhat low.

E: The fatigue strength of the sintered body is low.

F: The fatigue strength of the sintered body is particularly low.

The above evaluation results are shown in Tables 5 to 8.

2.5 Evaluation of Corrosion Resistance

With respect to the sintered bodies of the respective sample Nos. shown in Tables 1 to 4, the corrosion resistance was measured.

Specifically, first, a test piece cut out from each of the sintered bodies of the respective sample Nos. was prepared.

Subsequently, a salt spray test was performed for the test piece in accordance with the Method of salt spray testing specified in JIS Z 2371: 2000. The testing time was set to 24 hours and 48 hours.

Then, the test piece after the test was evaluated according to the following evaluation criteria.

Evaluation Criteria for Salt Spray Test

A: No corrosion is observed.

B: Very little corrosion is observed.

C: Somewhat little corrosion is observed.

D: Somewhat much corrosion is observed.

E: Much corrosion is observed.

F: Particularly much corrosion is observed.

The above evaluation results are shown in Tables 5 to 8.

2.6. Evaluation of Wear Resistance

With respect to the sintered bodies of the respective sample Nos. shown in Tables 1 to 4, the wear resistance was measured.

Specifically, first, a disk-shaped test piece cut out from each of the sintered bodies of the respective sample Nos. was prepared.

Subsequently, the surface of the test piece was subjected to a buff polishing treatment. Subsequently, for the polished surface, a wear resistance test was performed in accordance with Testing method for wear resistance of fine ceramics by ball-on-disc method specified in JIS R 1613 (2010), and a wear amount of the disk-shaped (annular) test piece was measured. The measurement conditions are as follows.

Measurement Conditions for Specific Wear Amount

Material of spherical test piece: high carbon chromium bearing steel (SUJ2)

Size of spherical test piece: 6 mm in diameter

Material of disk-shaped (annular) test piece: each of sintered bodies of respective Sample Nos.

Size of disk-shaped (annular) test piece: 10 mm in diameter

Magnitude of load: 10 N

Sliding rate: 0.1 m/s

Sliding circle diameter: 30 mm

Sliding distance: 50 m

Then, the thus measured wear amount was evaluated according to the following evaluation criteria.

Evaluation Criteria for Wear Amount

A: The wear amount is particularly small.

B: The wear amount is small.

C: The wear amount is somewhat small.

D: The wear amount is somewhat large.

E: The wear amount is large.

F: The wear amount is particularly large.

The above evaluation results are shown in Tables 5 to 8.

2.7 Evaluation of Dimensional Accuracy

With respect to the sintered bodies of the respective sample Nos. shown in Tables 1 to 4, the dimensional accuracy was measured.

Specifically, first, the dimensions of the respective Sample Nos. were measured.

Subsequently, a dimensional difference between the target value and the measurement value of the dimension of the sintered body was calculated and the obtained dimensional difference was evaluated according to the following evaluation criteria.

Evaluation Criteria for Dimensional Accuracy

A: The dimensional accuracy is particularly high (the dimensional difference is particularly small).

B: The dimensional accuracy is high (the dimensional difference is small).

C: The dimensional accuracy is somewhat high (the dimensional difference is somewhat small).

D: The dimensional accuracy is somewhat low (the dimensional difference is somewhat large).

E: The dimensional accuracy is low (the dimensional difference is large).

F: The dimensional accuracy is particularly low (the dimensional difference is particularly large).

The above evaluation results are shown in Tables 5 to 8.

TABLE 5

| Sample No. | — | Metal powder Average particle diameter μm | Relative density % | Vickers hardness | Tensile strength | 0.2% proof stress | Elonga- tion | Fatigue strength | Corrosion resistance 24 h | Corrosion resistance 48 h | Wear resistance | Dimensional accuracy |
|---|---|---|---|---|---|---|---|---|---|---|---|---|
| No. 1 | Ex. | 4.05 | 99.5 | A | A | A | A | A | A | A | A | A |
| No. 2 | Ex. | 3.77 | 99.4 | A | A | A | A | A | A | A | A | A |
| No. 3 | Ex. | 3.96 | 99.3 | A | A | A | A | A | A | A | A | A |
| No. 4 | Ex. | 9.85 | 98.7 | A | B | B | B | B | A | B | A | A |
| No. 5 | Ex. | 8.42 | 98.6 | A | B | B | B | B | A | B | A | A |
| No. 6 | Ex. | 15.87 | 97.9 | A | B | B | B | B | A | B | A | A |
| No. 7 | Ex. | 21.36 | 97.5 | A | B | B | C | B | A | B | A | A |
| No. 8 | Ex. | 2.71 | 99.4 | A | A | A | A | A | A | A | A | A |
| No. 9 | Ex. | 3.89 | 99.3 | A | A | A | A | A | A | A | A | A |
| No. 10 | Ex. | 3.75 | 99.5 | A | A | A | A | A | A | A | A | A |
| No. 11 | Ex. | 8.23 | 99.2 | A | A | A | A | A | A | A | A | A |
| No. 12 | Ex. | 7.74 | 99.3 | A | A | A | A | A | A | A | A | A |
| No. 13 | Ex. | 7.32 | 99.1 | A | A | A | A | A | A | A | A | A |
| No. 14 | Comp. Ex. | 3.78 | 96.3 | A | B | C | C | D | C | D | C | D |
| No. 15 | Comp. Ex. | 4.02 | 96.6 | A | D | D | B | D | C | C | B | D |
| No. 16 | Comp. Ex. | 3.64 | 95.8 | A | E | E | C | E | C | D | C | D |
| No. 17 | Comp. Ex. | 4.92 | 94.7 | A | D | D | D | D | C | D | C | D |
| No. 18 | Comp. Ex. | 4.32 | 94.6 | A | D | D | E | D | C | D | C | D |
| No. 19 | Comp. Ex. | 3.58 | 95.2 | A | E | E | C | E | C | D | C | D |
| No. 20 | Comp. Ex. | 4.98 | 95.8 | A | D | D | B | D | C | D | C | D |
| No. 21 | Comp. Ex. | 4.65 | 93.4 | A | E | E | F | E | C | D | C | D |
| No. 22 | Comp. Ex. | 3.81 | 96.5 | A | C | C | C | D | C | D | C | D |
| No. 23 | Comp. Ex. | 3.77 | 96.7 | A | D | D | D | E | C | D | C | D |
| No. 24 | Comp. Ex. | 3.78 | 99.0 | A | A | A | B | A | B | C | A | E |

TABLE 6

| Sample No. | — | Metal powder Average particle diameter μm | Relative density % | Vickers hardness | Tensile strength | 0.2% proof stress | Elonga- tion | Fatigue strength | Corrosion resistance 24 h | Corrosion resistance 48 h | Wear resistance | Dimensional accuracy |
|---|---|---|---|---|---|---|---|---|---|---|---|---|
| No. 25 | Ex. | 4.05 | 99.6 | A | A | A | A | A | A | A | A | A |
| No. 26 | Ex. | 3.77 | 99.6 | A | A | A | A | A | A | A | A | A |
| No. 27 | Ex. | 3.96 | 99.4 | A | A | A | A | A | A | A | A | A |
| No. 28 | Ex. | 3.85 | 98.9 | A | B | B | B | B | A | B | A | A |
| No. 29 | Ex. | 4.52 | 99.7 | A | B | B | B | B | A | B | A | A |
| No. 30 | Ex. | 5.39 | 98.9 | A | B | B | B | B | A | B | A | A |
| No. 31 | Ex. | 4.23 | 99.0 | A | B | B | C | B | A | B | A | A |
| No. 32 | Ex. | 3.71 | 98.5 | A | A | A | A | A | A | A | A | A |
| No. 33 | Ex. | 3.89 | 98.4 | A | A | A | A | A | A | A | A | A |
| No. 34 | Ex. | 3.75 | 98.7 | A | A | A | A | A | A | A | A | A |
| No. 35 | Comp. Ex. | 3.78 | 96.5 | A | B | C | C | D | C | D | C | D |
| No. 36 | Comp. Ex. | 4.02 | 96.7 | A | D | D | B | D | C | D | C | D |
| No. 37 | Comp. Ex. | 3.64 | 96.2 | A | E | E | C | E | C | D | C | D |
| No. 38 | Comp. Ex. | 4.92 | 94.9 | A | D | D | D | D | C | D | C | D |
| No. 39 | Comp. Ex. | 4.32 | 94.8 | A | D | D | E | D | C | D | C | D |
| No. 40 | Comp. Ex. | 3.78 | 99.0 | A | A | A | B | B | B | C | A | E |

TABLE 7

| Sample No. | — | Metal powder Average particle diameter μm | Relative density % | Vickers hardness | Tensile strength | 0.2% proof stress | Elonga- tion | Fatigue strength | Corrosion resistance 24 h | Corrosion resistance 48 h | Wear resistance | Dimensional accuracy |
|---|---|---|---|---|---|---|---|---|---|---|---|---|
| No. 41 | Ex. | 4.11 | 99.6 | A | A | A | A | A | A | A | A | A |
| No. 42 | Ex. | 3.72 | 99.5 | A | A | A | A | A | A | A | A | A |
| No. 43 | Ex. | 3.84 | 99.4 | A | A | A | A | A | A | A | A | A |
| No. 44 | Ex. | 10.01 | 98.8 | A | B | B | B | B | A | B | A | A |
| No. 45 | Ex. | 7.56 | 98.7 | A | B | B | B | B | A | B | A | A |

TABLE 7-continued

| Sample No. | | Metal powder Average particle diameter μm | Evaluation results of sintered body | | | | | | | | | |
|---|---|---|---|---|---|---|---|---|---|---|---|---|
| | | | Relative density % | Vickers hardness | Tensile strength | 0.2% proof stress | Elonga- tion | Fatigue strength | Corrosion resistance 24 h | 48 h | Wear resistance | Dimensional accuracy |
| No. 46 | Ex. | 16.25 | 98.1 | A | B | B | C | B | A | B | B | A |
| No. 47 | Ex. | 22.12 | 97.7 | A | B | B | C | B | A | B | B | A |
| No. 48 | Ex. | 2.04 | 99.5 | A | A | A | A | A | A | A | A | A |
| No. 49 | Ex. | 3.77 | 99.4 | A | B | A | A | B | A | B | A | A |
| No. 50 | Ex. | 3.64 | 99.6 | A | A | A | A | A | A | A | A | A |
| No. 51 | Ex. | 8.15 | 99.3 | A | A | A | A | A | A | A | A | A |
| No. 52 | Ex. | 7.63 | 99.4 | A | A | A | A | A | A | A | A | A |
| No. 53 | Ex. | 7.24 | 99.2 | A | B | A | A | B | A | B | A | A |
| No. 54 | Comp. Ex. | 4.05 | 96.4 | B | C | C | C | D | C | D | C | D |
| No. 55 | Comp. Ex. | 3.68 | 96.7 | B | D | D | C | D | C | C | B | D |
| No. 56 | Comp. Ex. | 3.89 | 95.9 | B | E | E | D | E | C | D | C | D |
| No. 57 | Comp. Ex. | 4.12 | 94.8 | B | E | E | E | E | C | D | C | D |
| No. 58 | Comp. Ex. | 4.23 | 94.7 | B | D | D | E | D | C | D | C | D |
| No. 59 | Comp. Ex. | 3.66 | 95.3 | B | E | E | D | E | C | D | C | D |
| No. 60 | Comp. Ex. | 3.57 | 93.4 | B | F | F | E | F | C | D | C | D |
| No. 61 | Comp. Ex. | 4.89 | 96.0 | B | D | D | C | D | C | D | C | D |
| No. 62 | Comp. Ex. | 4.45 | 93.6 | B | E | E | F | E | C | D | C | D |
| No. 63 | Comp. Ex. | 3.87 | 96.7 | B | C | C | C | D | C | D | C | D |
| No. 64 | Comp. Ex. | 3.65 | 96.5 | B | D | D | D | E | C | D | C | D |
| No. 65 | Comp. Ex. | 4.05 | 99.1 | A | A | A | B | B | B | C | A | E |

TABLE 8

| Sample No. | | Metal powder Average particle diameter μm | Evaluation results of sintered body | | | | | | | | | |
|---|---|---|---|---|---|---|---|---|---|---|---|---|
| | | | Relative density % | Vickers hardness | Tensile strength | 0.2% proof stress | Elonga- tion | Fatigue strength | Corrosion resistance 24 h | 48 h | Wear resistance | Dimensional accuracy |
| No. 66 | Ex. | 4.11 | 99.7 | A | A | A | A | A | A | A | A | A |
| No. 67 | Ex. | 3.72 | 99.6 | A | A | A | A | A | A | A | A | A |
| No. 68 | Ex. | 3.84 | 99.5 | A | A | A | A | A | A | A | A | A |
| No. 69 | Ex. | 10.01 | 99.0 | A | B | B | B | B | A | B | A | A |
| No. 70 | Ex. | 7.56 | 99.3 | A | B | B | B | B | A | B | A | A |
| No. 71 | Ex. | 16.25 | 99.0 | A | B | B | B | B | A | B | B | A |
| No. 72 | Ex. | 22.12 | 99.1 | A | B | B | C | B | A | B | B | A |
| No. 73 | Ex. | 2.04 | 99.5 | A | A | A | A | A | A | A | A | A |
| No. 74 | Ex. | 3.77 | 99.4 | A | A | A | B | A | A | B | A | A |
| No. 75 | Ex. | 3.64 | 99.6 | A | A | A | A | A | A | A | A | A |
| No. 76 | Comp. Ex. | 4.05 | 96.6 | B | B | C | C | D | C | D | C | D |
| No. 77 | Comp. Ex. | 3.68 | 96.8 | B | D | D | B | D | C | C | C | D |
| No. 78 | Comp. Ex. | 3.89 | 96.3 | B | E | E | C | E | C | D | C | D |
| No. 79 | Comp. Ex. | 4.12 | 95.1 | B | D | D | D | D | C | D | C | D |
| No. 80 | Comp. Ex. | 4.23 | 95.0 | B | D | D | E | D | C | D | C | D |
| No. 81 | Comp. Ex. | 4.05 | 99.2 | A | A | A | B | B | B | C | A | E |

As apparent from Tables 5 to 8, it was confirmed that the sintered bodies corresponding to Example each have a higher relative density than the sintered bodies corresponding to Comparative Example (excluding the sintered bodies having undergone the HIP treatment). It was also confirmed that there is a significant difference in properties such as tensile strength, 0.2% proof stress, and elongation between them. Further, it was also confirmed that there is a significant difference in corrosion resistance, wear resistance, and dimensional accuracy between them. Therefore, it was revealed that according to the invention, a gear having sufficient mechanical properties and also having high dimensional accuracy is obtained even when a heat treatment at a relatively low temperature, or a heat treatment even at a high temperature for a short period of time is performed.

On the other hand, when the respective physical property values were compared between the sintered bodies corresponding to Example and the sintered bodies having undergone the HIP treatment, it was confirmed that the physical property values are all comparable to each other.

3. Production of Sintered Body (Hf—Nb Based)
Sample Nos. 82 to 130

Sintered bodies were obtained in the same manner as the method for producing the sintered body of sample No. 1 except that the composition and the like of the metal powder for powder metallurgy were changed as shown in Tables 9 and 10, respectively. Incidentally, the compositional ratio of the metal powder shown in Table 10 is a Hf—Nb-based metal powder in the same manner as in Table 9, however, the compositional ratio of elements other than Hf and Nb is different. Further, some sintered bodies were subjected to an HIP treatment under the following conditions after firing.

HIP Treatment Conditions
  Heating temperature: 1100° C.
  Heating time: 2 hours
  Applied pressure: 100 MPa

TABLE 9

| | | \multicolumn{11}{c}{Metal powder for powder metallurgy} | | | | |
| | | \multicolumn{10}{c}{Alloy composition} | | | | | |
| Sample No. | — | Cr | Ni | Si | C | E1 (Hf) | E2 (Nb) | Al | Cu | O | Fe | E1/E2 | E1 + E2 | (E1 + E2)/Si | (E1 + E2)/C | Remarks |
| --- | --- | --- | --- | --- | --- | --- | --- | --- | --- | --- | --- | --- | --- | --- | --- | --- |
| | | \multicolumn{9}{c}{mass %} | | — | mass % | — | — | — |
| No. 82 | Ex. | 16.45 | 4.18 | 0.75 | 0.019 | 0.13 | 0.32 | 0.00 | 3.89 | 0.29 | Remainder | 0.41 | 0.45 | 0.60 | 23.68 | |
| No. 83 | Ex. | 17.19 | 3.55 | 0.62 | 0.017 | 0.11 | 0.18 | 0.00 | 4.31 | 0.32 | Remainder | 0.61 | 0.29 | 0.47 | 17.06 | |
| No. 84 | Ex. | 15.78 | 4.52 | 0.82 | 0.032 | 0.13 | 0.41 | 0.00 | 3.46 | 0.41 | Remainder | 0.32 | 0.54 | 0.66 | 16.88 | |
| No. 85 | Ex. | 16.17 | 3.87 | 0.39 | 0.045 | 0.07 | 0.28 | 0.00 | 4.54 | 0.24 | Remainder | 0.25 | 0.35 | 0.90 | 7.78 | |
| No. 86 | Ex. | 16.87 | 4.03 | 1.58 | 0.067 | 0.16 | 0.18 | 0.00 | 4.75 | 0.35 | Remainder | 0.89 | 0.34 | 0.22 | 5.07 | |
| No. 87 | Ex. | 16.77 | 3.31 | 0.69 | 0.008 | 0.09 | 0.37 | 0.00 | 4.15 | 0.29 | Remainder | 0.24 | 0.46 | 0.67 | 57.50 | |
| No. 88 | Ex. | 17.25 | 4.79 | 0.85 | 0.146 | 0.13 | 0.22 | 0.00 | 3.72 | 0.31 | Remainder | 0.59 | 0.35 | 0.41 | 2.40 | |
| No. 89 | Ex. | 17.85 | 7.41 | 0.76 | 0.046 | 0.13 | 0.08 | 0.82 | 0.00 | 0.46 | Remainder | 1.63 | 0.21 | 0.28 | 4.57 | |
| No. 90 | Ex. | 17.21 | 6.87 | 0.81 | 0.028 | 0.09 | 0.13 | 1.35 | 0.00 | 0.51 | Remainder | 0.69 | 0.22 | 0.27 | 7.86 | |
| No. 91 | Ex. | 16.92 | 8.31 | 0.65 | 0.035 | 0.18 | 0.10 | 1.11 | 0.00 | 0.43 | Remainder | 1.80 | 0.28 | 0.43 | 8.00 | |
| No. 92 | Ex. | 16.33 | 4.31 | 0.74 | 0.021 | 0.16 | 0.34 | 0.00 | 3.76 | 0.27 | Remainder | 0.47 | 0.50 | 0.68 | 23.81 | Gas |
| No. 93 | Ex. | 17.23 | 3.59 | 0.63 | 0.024 | 0.08 | 0.27 | 0.00 | 4.29 | 0.32 | Remainder | 0.30 | 0.35 | 0.56 | 14.58 | Gas |
| No. 94 | Ex. | 15.56 | 4.68 | 0.89 | 0.032 | 0.06 | 0.42 | 0.00 | 3.59 | 0.44 | Remainder | 0.14 | 0.48 | 0.54 | 15.00 | Gas |
| No. 95 | Comp. Ex. | 16.45 | 4.06 | 0.73 | 0.018 | 0.00 | 0.31 | 0.00 | 3.98 | 0.28 | Remainder | 0.00 | 0.31 | 0.42 | 17.22 | |
| No. 96 | Comp. Ex. | 17.22 | 3.56 | 0.64 | 0.025 | 0.09 | 0.00 | 0.00 | 4.33 | 0.33 | Remainder | — | 0.09 | 0.14 | 3.60 | |
| No. 97 | Comp. Ex. | 15.75 | 4.43 | 0.83 | 0.033 | 0.00 | 0.00 | 0.00 | 3.48 | 0.42 | Remainder | — | 0.00 | 0.00 | 0.00 | |
| No. 98 | Comp. Ex. | 16.28 | 3.85 | 0.87 | 0.022 | 0.78 | 0.08 | 0.00 | 4.13 | 0.35 | Remainder | 9.75 | 0.86 | 0.99 | 39.09 | |
| No. 99 | Comp. Ex. | 17.03 | 4.25 | 0.65 | 0.034 | 0.11 | 0.72 | 0.00 | 3.86 | 0.42 | Remainder | 0.15 | 0.83 | 1.28 | 24.41 | |
| No. 100 | Comp. Ex. | 16.57 | 4.19 | 0.16 | 0.018 | 0.13 | 0.29 | 0.00 | 3.89 | 0.28 | Remainder | 0.45 | 0.42 | 2.63 | 23.33 | |
| No. 101 | Comp. Ex. | 16.97 | 3.56 | 0.67 | 0.003 | 0.12 | 0.35 | 0.00 | 4.25 | 0.31 | Remainder | 0.34 | 0.47 | 0.70 | 156.67 | |
| No. 102 | Comp. Ex. | 17.24 | 4.18 | 0.75 | 0.384 | 0.16 | 0.27 | 0.00 | 3.79 | 0.44 | Remainder | 0.59 | 0.43 | 0.57 | 1.12 | |
| No. 103 | Comp. Ex. | 17.83 | 7.32 | 0.75 | 0.042 | 0.00 | 0.09 | 0.87 | 0.00 | 0.46 | Remainder | 0.00 | 0.09 | 0.12 | 2.14 | |
| No. 104 | Comp. Ex. | 17.21 | 6.89 | 0.82 | 0.030 | 0.11 | 0.00 | 1.34 | 0.00 | 0.49 | Remainder | — | 0.11 | 0.13 | 3.67 | |
| No. 105 | Comp. Ex. | 16.45 | 4.06 | 0.73 | 0.018 | 0.00 | 0.31 | 0.00 | 3.98 | 0.28 | Remainder | 0.00 | 0.31 | 0.42 | 17.22 | HIP treatment |

TABLE 10

| | | \multicolumn{11}{c}{Metal powder for powder metallurgy} | | | | |
| | | \multicolumn{10}{c}{Alloy composition} | | | | | |
| Sample No. | — | Cr | Ni | Si | C | E1 (Hf) | E2 (Nb) | Co | Mo | O | Fe | E1/E2 | E1 + E2 | (E1 + E2)/Si | (E1 + E2)/C | Remarks |
| --- | --- | --- | --- | --- | --- | --- | --- | --- | --- | --- | --- | --- | --- | --- | --- | --- |
| | | \multicolumn{9}{c}{mass %} | | — | mass % | — | — | — |
| No. 106 | Ex. | 0.00 | 18.12 | 0.73 | 0.015 | 0.08 | 0.05 | 7.88 | 4.76 | 0.15 | Remainder | 1.60 | 0.13 | 0.18 | 8.67 | |
| No. 107 | Ex. | 0.00 | 18.97 | 0.65 | 0.024 | 0.05 | 0.07 | 7.51 | 5.11 | 0.29 | Remainder | 0.71 | 0.12 | 0.18 | 5.00 | |
| No. 108 | Ex. | 0.00 | 17.54 | 0.82 | 0.035 | 0.15 | 0.06 | 8.21 | 3.67 | 0.09 | Remainder | 2.50 | 0.21 | 0.26 | 6.00 | |
| No. 109 | Ex. | 0.00 | 17.18 | 0.33 | 0.059 | 0.04 | 0.06 | 9.05 | 5.84 | 0.24 | Remainder | 0.67 | 0.10 | 0.30 | 1.69 | |
| No. 110 | Ex. | 0.00 | 18.31 | 1.76 | 0.022 | 0.18 | 0.13 | 8.25 | 5.12 | 0.07 | Remainder | 1.38 | 0.31 | 0.18 | 14.09 | |
| No. 111 | Ex. | 0.00 | 18.08 | 1.08 | 0.009 | 0.11 | 0.15 | 7.64 | 4.25 | 0.31 | Remainder | 0.73 | 0.26 | 0.24 | 28.89 | |
| No. 112 | Ex. | 0.00 | 17.77 | 0.79 | 0.138 | 0.08 | 0.06 | 8.51 | 5.03 | 0.23 | Remainder | 1.33 | 0.14 | 0.18 | 1.01 | |
| No. 113 | Ex. | 10.51 | 6.63 | 3.71 | 0.014 | 0.07 | 0.05 | 10.61 | 1.43 | 0.46 | Remainder | 1.40 | 0.12 | 0.03 | 8.57 | Cu: 0.89 Mn: 0.97 |
| No. 114 | Ex. | 10.92 | 6.07 | 4.11 | 0.024 | 0.09 | 0.11 | 9.88 | 0.43 | 0.41 | Remainder | 0.82 | 0.20 | 0.05 | 8.33 | Cu: 1.28 Mn: 0.65 |
| No. 115 | Ex. | 10.08 | 7.05 | 3.11 | 0.034 | 0.14 | 0.10 | 11.02 | 1.64 | 0.48 | Remainder | 1.40 | 0.24 | 0.08 | 7.06 | Cu: 0.74 Mn: 1.29 |
| No. 116 | Ex. | 0.00 | 18.19 | 0.74 | 0.016 | 0.08 | 0.06 | 7.77 | 4.58 | 0.14 | Remainder | 1.33 | 0.14 | 0.19 | 8.75 | Gas |
| No. 117 | Ex. | 0.00 | 18.91 | 0.61 | 0.026 | 0.07 | 0.09 | 7.52 | 5.19 | 0.31 | Remainder | 0.78 | 0.16 | 0.26 | 6.15 | Gas |
| No. 118 | Ex. | 0.00 | 17.61 | 0.83 | 0.036 | 0.12 | 0.06 | 8.25 | 3.78 | 0.13 | Remainder | 2.00 | 0.18 | 0.22 | 5.00 | Gas |
| No. 119 | Comp. Ex. | 0.00 | 18.09 | 0.75 | 0.018 | 0.00 | 0.05 | 7.91 | 4.88 | 0.38 | Remainder | 0.00 | 0.05 | 0.07 | 2.78 | |
| No. 120 | Comp. Ex. | 0.00 | 18.93 | 0.63 | 0.021 | 0.08 | 0.00 | 7.36 | 5.08 | 0.32 | Remainder | — | 0.08 | 0.13 | 3.81 | |
| No. 121 | Comp. Ex. | 0.00 | 17.64 | 0.85 | 0.036 | 0.00 | 0.00 | 8.24 | 3.77 | 0.46 | Remainder | — | 0.00 | 0.00 | 0.00 | |
| No. 122 | Comp. Ex. | 0.00 | 18.12 | 0.73 | 0.015 | 0.75 | 0.05 | 8.21 | 5.15 | 0.48 | Remainder | 15.00 | 0.80 | 1.10 | 53.33 | |
| No. 123 | Comp. Ex. | 0.00 | 18.05 | 0.78 | 0.020 | 0.05 | 0.74 | 8.11 | 4.81 | 0.51 | Remainder | 0.07 | 0.79 | 1.01 | 39.50 | |
| No. 124 | Comp. Ex. | 0.00 | 17.54 | 0.15 | 0.056 | 0.03 | 0.24 | 8.21 | 5.36 | 0.31 | Remainder | 0.13 | 0.27 | 1.80 | 4.82 | |
| No. 125 | Comp. Ex. | 0.00 | 18.41 | 5.26 | 0.023 | 0.32 | 0.03 | 8.51 | 4.91 | 0.43 | Remainder | 10.67 | 0.35 | 0.07 | 15.22 | |
| No. 126 | Comp. Ex. | 0.00 | 18.72 | 0.63 | 0.003 | 0.06 | 0.04 | 8.06 | 5.06 | 0.35 | Remainder | 1.50 | 0.10 | 0.16 | 33.33 | |
| No. 127 | Comp. Ex. | 0.00 | 18.26 | 0.75 | 0.369 | 0.13 | 0.55 | 7.88 | 5.09 | 0.46 | Remainder | 0.24 | 0.68 | 0.91 | 1.84 | |
| No. 128 | Comp. Ex. | 10.55 | 6.58 | 3.61 | 0.016 | 0.00 | 0.06 | 7.93 | 5.06 | 0.46 | Remainder | 0.00 | 0.06 | 0.02 | 3.75 | Cu: 0.92 Mn: 0.98 |
| No. 129 | Comp. Ex. | 10.36 | 6.71 | 4.12 | 0.031 | 0.05 | 0.00 | 7.69 | 4.98 | 0.53 | Remainder | — | 0.05 | 0.01 | 1.61 | Cu: 1.16 Mn: 1.09 |
| No. 130 | Comp. Ex. | 0.00 | 18.09 | 0.75 | 0.018 | 0.00 | 0.05 | 7.91 | 4.88 | 0.38 | Remainder | 0.00 | 0.05 | 0.07 | 2.78 | HIP treatment |

In Tables 9 and 10, among the sintered bodies of the respective sample Nos., those corresponding to the invention are denoted by "Ex." (Example), and those not corresponding to the invention are denoted by "Comp. Ex." (Comparative Example).

Each sintered body contained very small amounts of impurities, but the description thereof in Tables 9 and 10 is omitted.

4. Evaluation of Sintered Body (Hf—Nb Based)

4.1 Evaluation of Relative Density

With respect to the sintered bodies of the respective sample Nos. shown in Tables 9 and 10, the sintered density was measured in accordance with the method for measuring the density of sintered metal materials specified in JIS Z 2501 (2000), and also the relative density of each sintered body was calculated with reference to the true density of the metal powder for powder metallurgy used for producing each sintered body.

The calculation results are shown in Tables 11 and 12.

4.2 Evaluation of Hardness

With respect to the sintered bodies of the respective sample Nos. shown in Tables 9 and 10, the Vickers hardness was measured in accordance with the Vickers hardness test method specified in JIS Z 2244 (2009).

Then, the measured hardness was evaluated according to the evaluation criteria described in 2.2.

The evaluation results are shown in Tables 11 and 12.

4.3 Evaluation of Tensile Strength, 0.2% Proof Stress, and Elongation

With respect to the sintered bodies of the respective sample Nos. shown in Tables 9 and 10, the tensile strength, 0.2% proof stress, and elongation were measured in accordance with the metal material tensile test method specified in JIS Z 2241 (2011).

Then, the measured physical property values were evaluated according to the evaluation criteria described in 2.3.

The evaluation results are shown in Tables 11 and 12.

4.4 Evaluation of Fatigue Strength

With respect to the sintered bodies of the respective sample Nos. shown in Tables 9 and 10, the fatigue strength was measured in the same manner as in 2.4.

Then, the measured fatigue strength was evaluated according to the evaluation criteria described in 2.4.

The evaluation results are shown in Tables 11 and 12.

4.5 Evaluation of Corrosion Resistance

With respect to the sintered bodies of the respective sample Nos. shown in Tables 9 and 10, the corrosion resistance was measured in the same manner as in 2.5.

Then, the measured corrosion resistance was evaluated according to the evaluation criteria described in 2.5.

The evaluation results are shown in Tables 11 and 12.

4.6 Evaluation of Wear Resistance

With respect to the sintered bodies of the respective sample Nos. shown in Tables 9 and 10, the wear resistance was measured in the same manner as in 2.6.

Then, the measured wear resistance was evaluated according to the evaluation criteria described in 2.6.

The evaluation results are shown in Tables 11 and 12.

4.7 Evaluation of Dimensional Accuracy

With respect to the sintered bodies of the respective sample Nos. shown in Tables 9 and 10, the dimensional accuracy was measured in the same manner as in 2.7.

Then, the measured dimensional accuracy was evaluated according to the evaluation criteria described in 2.7.

The evaluation results are shown in Tables 11 and 12.

TABLE 11

| Sample No. | | Metal powder Average particle diameter μm | Relative density % | Vickers hardness | Tensile strength | 0.2% proof stress | Elongation | Fatigue strength | Corrosion resistance 24 h | Corrosion resistance 48 h | Wear resistance | Dimensional accuracy |
|---|---|---|---|---|---|---|---|---|---|---|---|---|
| No. 82 | Ex. | 4.12 | 99.5 | A | A | A | A | A | A | A | A | A |
| No. 83 | Ex. | 3.74 | 99.3 | A | A | A | A | A | A | A | A | A |
| No. 84 | Ex. | 3.88 | 99.3 | A | A | A | A | A | A | A | A | A |
| No. 85 | Ex. | 10.03 | 98.8 | A | B | B | B | B | A | B | A | A |
| No. 86 | Ex. | 8.57 | 98.7 | A | B | B | B | B | A | B | A | A |
| No. 87 | Ex. | 16.35 | 97.6 | A | B | B | B | B | A | B | A | A |
| No. 88 | Ex. | 22.53 | 97.2 | A | B | B | C | B | A | B | A | A |
| No. 89 | Ex. | 3.68 | 99.4 | A | A | A | A | A | A | A | A | A |
| No. 90 | Ex. | 3.97 | 99.3 | A | A | A | A | A | A | A | A | A |
| No. 91 | Ex. | 3.56 | 99.3 | A | A | A | A | A | A | A | A | A |
| No. 92 | Ex. | 8.25 | 99.2 | A | A | A | A | A | A | A | A | A |
| No. 93 | Ex. | 7.45 | 99.1 | A | A | A | A | A | A | A | A | A |
| No. 94 | Ex. | 7.33 | 99.0 | A | A | A | A | A | A | A | A | A |
| No. 95 | Comp. Ex. | 3.78 | 96.4 | A | B | C | C | D | C | D | C | D |
| No. 96 | Comp. Ex. | 3.96 | 96.7 | A | D | D | B | D | C | C | B | D |
| No. 97 | Comp. Ex. | 3.55 | 95.9 | A | E | E | C | E | C | D | C | D |
| No. 98 | Comp. Ex. | 4.98 | 94.8 | A | D | D | D | D | C | D | C | D |
| No. 99 | Comp. Ex. | 4.32 | 94.7 | A | D | D | E | D | C | D | C | D |
| No. 100 | Comp. Ex. | 3.58 | 95.1 | A | E | E | C | E | C | D | C | D |
| No. 101 | Comp. Ex. | 4.89 | 95.7 | A | D | D | B | D | C | D | C | D |
| No. 102 | Comp. Ex. | 4.78 | 93.3 | A | E | E | F | E | C | D | C | D |
| No. 103 | Comp. Ex. | 3.87 | 95.6 | A | C | C | C | D | C | D | C | D |
| No. 104 | Comp. Ex. | 3.68 | 96.6 | A | D | D | D | E | C | D | C | D |
| No. 105 | Comp. Ex. | 3.78 | 98.9 | A | A | A | B | B | B | C | A | E |

TABLE 12

| | | Metal powder Average particle diameter μm | Relative density % | Vickers hardness | Tensile strength | 0.2% proof stress | Elongation | Fatigue strength | Corrosion resistance 24 h | Corrosion resistance 48 h | Wear resistance | Dimensional accuracy |
|---|---|---|---|---|---|---|---|---|---|---|---|---|
| Sample No. | — | | | — | — | — | — | — | — | — | — | — |
| No. 106 | Ex. | 4.16 | 99.6 | A | A | A | A | A | A | A | A | A |
| No. 107 | Ex. | 2.45 | 99.3 | A | A | A | A | A | A | A | A | A |
| No. 108 | Ex. | 3.76 | 99.4 | A | A | A | A | A | A | A | A | A |
| No. 109 | Ex. | 11.21 | 98.7 | A | B | B | B | B | A | B | A | A |
| No. 110 | Ex. | 8.54 | 98.9 | A | A | B | B | B | A | B | A | A |
| No. 111 | Ex. | 17.53 | 97.2 | A | C | B | C | B | A | B | A | B |
| No. 112 | Ex. | 23.14 | 98.9 | A | B | B | B | B | A | B | A | A |
| No. 113 | Ex. | 3.25 | 99.5 | A | A | A | A | A | A | A | A | A |
| No. 114 | Ex. | 1.98 | 99.3 | A | A | A | B | B | A | B | A | A |
| No. 115 | Ex. | 5.26 | 99.4 | A | A | A | A | A | A | A | A | A |
| No. 116 | Ex. | 8.23 | 99.3 | A | A | A | A | A | A | A | A | A |
| No. 117 | Ex. | 7.56 | 99.2 | A | A | A | B | B | A | A | A | A |
| No. 118 | Ex. | 7.12 | 99.1 | A | A | A | A | A | A | A | A | A |
| No. 119 | Comp. Ex. | 3.77 | 96.3 | B | C | C | C | D | C | D | C | D |
| No. 120 | Comp. Ex. | 4.05 | 96.6 | B | D | D | C | D | C | C | B | D |
| No. 121 | Comp. Ex. | 3.69 | 96.1 | B | E | E | D | E | C | D | C | D |
| No. 122 | Comp. Ex. | 5.02 | 95.1 | B | D | D | D | D | C | D | C | D |
| No. 123 | Comp. Ex. | 4.26 | 94.8 | B | D | D | E | D | C | D | C | D |
| No. 124 | Comp. Ex. | 3.64 | 95.0 | B | E | E | E | E | C | D | C | D |
| No. 125 | Comp. Ex. | 3.48 | 93.4 | B | F | F | E | F | C | D | C | D |
| No. 126 | Comp. Ex. | 4.58 | 95.9 | B | E | E | E | E | C | D | C | D |
| No. 127 | Comp. Ex. | 4.96 | 94.1 | B | E | E | F | E | C | D | C | D |
| No. 128 | Comp. Ex. | 3.89 | 95.8 | B | C | C | C | D | C | D | C | D |
| No. 129 | Comp. Ex. | 3.69 | 96.7 | B | D | D | D | E | C | D | C | D |
| No. 130 | Comp. Ex. | 3.77 | 99.0 | A | A | A | B | B | B | C | A | E |

As apparent from Tables 11 and 12, it was confirmed that the sintered bodies corresponding to Example each have a higher relative density than the sintered bodies corresponding to Comparative Example (excluding the sintered bodies having undergone the HIP treatment). It was also confirmed that there is a significant difference in properties such as tensile strength, 0.2% proof stress, and elongation between them. Further, it was also confirmed that there is a significant difference in corrosion resistance, wear resistance, and dimensional accuracy between them. Therefore, it was revealed that according to the invention, a gear having sufficient mechanical properties and also having high dimensional accuracy is obtained even when a heat treatment at a relatively low temperature, or a heat treatment even at a high temperature for a short period of time is performed.

On the other hand, when the respective physical property values were compared between the sintered bodies corresponding to Example and the sintered bodies having undergone the HIP treatment, it was confirmed that the physical property values are all comparable to each other.

5. Production of Sintered Body (Ti—Nb Based)
Sample Nos. 131 to 144 and 146 to 160
Sintered bodies were obtained in the same manner as the method for producing the sintered body of sample No. 1 except that the composition and the like of the metal powder for powder metallurgy were changed as shown in Tables 13 and 14, respectively. Incidentally, the compositional ratio of the metal powder shown in Table 14 is a Ti—Nb-based metal powder in the same manner as in Table 13, however, the compositional ratio of elements other than Ti and Nb is different.
Sample Nos. 145
A mixed powder was prepared by mixing a metal powder having an average particle diameter of 6.77 μm, a Ti powder having an average particle diameter of 40 μm, and a Nb powder having an average particle diameter of 25 μm. In the preparation of the mixed powder, the mixing amount of each of the metal powder, the Ti powder, and the Nb powder was adjusted so that the composition of the mixed powder was as shown in Table 13.
Subsequently, a sintered body was obtained in the same manner as the method for producing the sintered body of sample No. 1 using this mixed powder.

TABLE 13

| | | Metal powder for powder metallurgy | | | | | | | | | | | | | |
|---|---|---|---|---|---|---|---|---|---|---|---|---|---|---|---|
| | | Alloy composition | | | | | | | | | | | | | |
| Sample No. | | Cr | Ni | Si | C | E1 (Ti) | E2 (Nb) | Al | Cu | O | Fe | E1/E2 | E1 + E2 | (E1 + E2)/ Si | (E1 + E2)/ C | Remarks |
| | — | | | | | mass % | | | | | | — | mass % | — | — | — |
| No. 131 | Ex. | 16.43 | 4.21 | 0.73 | 0.020 | 0.05 | 0.32 | 0.00 | 3.93 | 0.31 | Remainder | 0.16 | 0.37 | 0.51 | 18.50 | |
| No. 132 | Ex. | 17.16 | 3.54 | 0.61 | 0.018 | 0.07 | 0.18 | 0.00 | 4.29 | 0.33 | Remainder | 0.39 | 0.25 | 0.41 | 13.89 | |
| No. 133 | Ex. | 15.76 | 4.49 | 0.83 | 0.033 | 0.13 | 0.41 | 0.00 | 3.44 | 0.42 | Remainder | 0.32 | 0.54 | 0.65 | 16.36 | |
| No. 134 | Ex. | 17.84 | 7.43 | 0.77 | 0.045 | 0.08 | 0.12 | 0.79 | 0.00 | 0.42 | Remainder | 0.67 | 0.20 | 0.26 | 4.44 | |
| No. 135 | Ex. | 17.19 | 6.85 | 0.82 | 0.027 | 0.06 | 0.11 | 1.32 | 0.00 | 0.48 | Remainder | 0.55 | 0.17 | 0.21 | 6.30 | |

TABLE 13-continued

Metal powder for powder metallurgy

Alloy composition

| Sample No. | — | Cr | Ni | Si | C | E1 (Ti) | E2 (Nb) mass % | Al | Cu | O | Fe | E1/ E2 — | E1 + E2 mass % | (E1 + E2)/ Si — | (E1 + E2)/ C — | Remarks — |
|---|---|---|---|---|---|---|---|---|---|---|---|---|---|---|---|---|
| No. 136 | Ex. | 16.87 | 8.25 | 0.64 | 0.034 | 0.10 | 0.18 | 1.12 | 0.00 | 0.39 | Remainder | 0.56 | 0.28 | 0.44 | 8.24 | |
| No. 137 | Ex. | 13.75 | 6.64 | 0.74 | 0.021 | 0.24 | 0.08 | 0.00 | 0.12 | 0.29 | Remainder | 3.00 | 0.32 | 0.43 | 15.24 | |
| No. 138 | Ex. | 14.58 | 7.25 | 0.63 | 0.024 | 0.48 | 0.08 | 0.00 | 0.56 | 0.33 | Remainder | 6.00 | 0.56 | 0.89 | 23.33 | |
| No. 139 | Ex. | 15.41 | 7.58 | 0.89 | 0.032 | 0.63 | 0.12 | 0.00 | 0.89 | 0.45 | Remainder | 5.25 | 0.75 | 0.84 | 23.44 | |
| No. 140 | Comp. Ex. | 16.39 | 4.06 | 0.73 | 0.021 | 0.00 | 0.31 | 0.00 | 3.89 | 0.29 | Remainder | 0.00 | 0.31 | 0.42 | 14.76 | |
| No. 141 | Comp. Ex. | 13.87 | 7.44 | 0.66 | 0.025 | 0.48 | 0.00 | 0.00 | 0.54 | 0.31 | Remainder | — | 0.48 | 0.73 | 19.20 | |
| No. 142 | Comp. Ex. | 15.04 | 6.82 | 0.81 | 0.032 | 0.00 | 0.00 | 0.00 | 0.51 | 0.42 | Remainder | — | 0.00 | 0.00 | 0.00 | |
| No. 143 | Comp. Ex. | 16.29 | 3.84 | 0.85 | 0.021 | 0.85 | 0.08 | 0.00 | 4.09 | 0.34 | Remainder | 10.63 | 0.93 | 1.09 | 44.29 | |
| No. 144 | Comp. Ex. | 17.11 | 4.21 | 0.64 | 0.033 | 0.11 | 0.89 | 0.00 | 3.87 | 0.41 | Remainder | 0.12 | 1.00 | 1.56 | 30.30 | |
| No. 145 | Comp. Ex. | 16.41 | 4.08 | 0.72 | 0.022 | 0.08 | 0.29 | 0.00 | 3.95 | 0.35 | Remainder | 0.28 | 0.37 | 0.51 | 16.82 | Mixed powder |

TABLE 14

Metal powder for powder metallurgy

Alloy composition

| Sample No. | — | Cr | Ni | Si | C | E1 (Ti) | E2 (Nb) mass % | Co | Mo | O | Fe | E1/ E2 — | E1 + E2 mass % | (E1 + E2)/ Si — | (E1 + E2)/ C — | Remarks — |
|---|---|---|---|---|---|---|---|---|---|---|---|---|---|---|---|---|
| No. 146 | Ex. | 0.00 | 18.15 | 0.71 | 0.016 | 0.04 | 0.07 | 7.88 | 4.76 | 0.15 | Remainder | 0.57 | 0.11 | 0.15 | 6.88 | |
| No. 147 | Ex. | 0.00 | 18.86 | 0.62 | 0.022 | 0.07 | 0.07 | 7.48 | 5.16 | 0.28 | Remainder | 1.00 | 0.14 | 0.23 | 6.36 | |
| No. 148 | Ex. | 0.00 | 17.53 | 0.83 | 0.036 | 0.12 | 0.09 | 8.23 | 3.88 | 0.08 | Remainder | 1.33 | 0.21 | 0.25 | 5.83 | |
| No. 149 | Ex. | 0.00 | 17.16 | 0.35 | 0.062 | 0.03 | 0.05 | 8.98 | 5.74 | 0.33 | Remainder | 0.60 | 0.08 | 0.23 | 1.29 | |
| No. 150 | Ex. | 0.00 | 18.33 | 1.74 | 0.023 | 0.17 | 0.14 | 8.21 | 5.08 | 0.08 | Remainder | 1.21 | 0.31 | 0.18 | 13.48 | |
| No. 151 | Ex. | 0.00 | 18.14 | 1.05 | 0.008 | 0.11 | 0.14 | 7.66 | 4.33 | 0.32 | Remainder | 0.79 | 0.25 | 0.24 | 31.25 | |
| No. 152 | Ex. | 0.00 | 17.75 | 0.76 | 0.135 | 0.04 | 0.06 | 8.51 | 4.99 | 0.23 | Remainder | 0.67 | 0.10 | 0.13 | 0.74 | |
| No. 153 | Ex. | 10.46 | 6.58 | 3.92 | 0.018 | 0.05 | 0.05 | 10.58 | 1.48 | 0.52 | Remainder | 1.00 | 0.10 | 0.03 | 5.56 | Cu: 0.92 Mn: 1.05 |
| No. 154 | Ex. | 10.99 | 6.08 | 4.21 | 0.021 | 0.08 | 0.11 | 10.12 | 0.39 | 0.35 | Remainder | 0.73 | 0.19 | 0.05 | 9.05 | Cu: 1.31 Mn: 0.67 |
| No. 155 | Ex. | 11.56 | 7.05 | 3.11 | 0.034 | 0.14 | 0.10 | 11.02 | 1.64 | 0.48 | Remainder | 1.40 | 0.24 | 0.08 | 7.06 | Cu: 0.78 Mn: 1.32 |
| No. 156 | Comp. Ex. | 0.00 | 18.15 | 0.78 | 0.016 | 0.00 | 0.06 | 8.02 | 4.86 | 0.39 | Remainder | 0.00 | 0.06 | 0.08 | 3.75 | |
| No. 157 | Comp. Ex. | 0.00 | 18.81 | 0.62 | 0.023 | 0.09 | 0.00 | 7.25 | 5.11 | 0.31 | Remainder | — | 0.09 | 0.15 | 3.91 | |
| No. 158 | Comp. Ex. | 0.00 | 17.61 | 0.89 | 0.035 | 0.00 | 0.00 | 8.26 | 3.75 | 0.51 | Remainder | — | 0.00 | 0.00 | 0.00 | |
| No. 159 | Comp. Ex. | 0.00 | 18.06 | 0.75 | 0.018 | 0.74 | 0.04 | 8.16 | 4.98 | 0.36 | Remainder | 18.50 | 0.78 | 1.04 | 43.33 | |
| No. 160 | Comp. Ex. | 0.00 | 18.25 | 0.77 | 0.026 | 0.05 | 0.78 | 8.09 | 5.02 | 0.48 | Remainder | 0.06 | 0.83 | 1.08 | 31.92 | |

In Tables 13 and 14, among the sintered bodies of the respective sample Nos., those corresponding to the invention are denoted by "Ex." (Example), and those not corresponding to the invention are denoted by "Comp. Ex." (Comparative Example).

Each sintered body contained very small amounts of impurities, but the description thereof in Tables 13 and 14 is omitted.

6. Evaluation of Sintered Body (Ti—Nb Based)

6.1 Evaluation of Relative Density

With respect to the sintered bodies of the respective sample Nos. shown in Tables 13 and 14, the sintered density was measured in accordance with the method for measuring the density of sintered metal materials specified in JIS Z 2501 (2000), and also the relative density of each sintered body was calculated with reference to the true density of the metal powder for powder metallurgy used for producing each sintered body.

The calculation results are shown in Tables 15 and 16.

6.2 Evaluation of Hardness

With respect to the sintered bodies of the respective sample Nos. shown in Tables 13 and 14, the Vickers hardness was measured in accordance with the Vickers hardness test method specified in JIS Z 2244 (2009).

Then, the measured hardness was evaluated according to the evaluation criteria described in 2.2.

The evaluation results are shown in Tables 15 and 16.

6.3 Evaluation of Tensile Strength, 0.2% Proof Stress, and Elongation

With respect to the sintered bodies of the respective sample Nos. shown in Tables 13 and 14, the tensile strength, 0.2% proof stress, and elongation were measured in accordance with the metal material tensile test method specified in JIS Z 2241 (2011).

Then, the measured physical property values were evaluated according to the evaluation criteria described in 2.3.

The evaluation results are shown in Tables 15 and 16.

6.4 Evaluation of Fatigue Strength

With respect to the sintered bodies of the respective sample Nos. shown in Tables 13 and 14, the fatigue strength was measured in the same manner as in 2.4.

Then, the measured fatigue strength was evaluated according to the evaluation criteria described in 2.4.

The evaluation results are shown in Tables 15 and 16.

6.5 Evaluation of Corrosion Resistance

With respect to the sintered bodies of the respective sample Nos. shown in Tables 13 and 14, the corrosion resistance was measured in the same manner as in 2.5.

Then, the measured corrosion resistance was evaluated according to the evaluation criteria described in 2.5.

The evaluation results are shown in Tables 15 and 16.

6.6 Evaluation of Wear Resistance

With respect to the sintered bodies of the respective sample Nos. shown in Tables 13 and 14, the wear resistance was measured in the same manner as in 2.6.

Then, the measured wear resistance was evaluated according to the evaluation criteria described in 2.6.

The evaluation results are shown in Tables 15 and 16.

6.7 Evaluation of Dimensional Accuracy

With respect to the sintered bodies of the respective sample Nos. shown in Tables 13 and 14, the dimensional accuracy was measured in the same manner as in 2.7.

Then, the measured dimensional accuracy was evaluated according to the evaluation criteria described in 2.7.

The evaluation results are shown in Tables 15 and 16.

TABLE 15

| Sample No. | | Metal powder Average particle diameter μm | Evaluation results of sintered body | | | | | | | | | |
|---|---|---|---|---|---|---|---|---|---|---|---|---|
| | | | Relative density % | Vickers hardness | Tensile strength | 0.2% proof stress | Elongation | Fatigue strength | Corrosion resistance 24 h | Corrosion resistance 48 h | Wear resistance | Dimensional accuracy |
| No. 131 | Ex. | 4.11 | 99.0 | A | A | A | A | A | A | A | A | A |
| No. 132 | Ex. | 3.93 | 98.9 | A | A | A | A | A | A | A | A | A |
| No. 133 | Ex. | 3.77 | 98.8 | A | A | A | A | A | A | A | A | A |
| No. 134 | Ex. | 3.65 | 99.0 | A | A | A | A | B | A | B | A | A |
| No. 135 | Ex. | 3.84 | 98.8 | A | A | A | A | B | A | B | A | A |
| No. 136 | Ex. | 3.74 | 98.9 | A | A | A | A | B | A | B | A | A |
| No. 137 | Ex. | 8.36 | 99.0 | A | A | A | A | A | A | A | A | A |
| No. 138 | Ex. | 7.52 | 98.7 | A | A | A | A | B | A | B | A | A |
| No. 139 | Ex. | 7.13 | 98.6 | A | A | A | B | B | A | B | A | B |
| No. 140 | Comp. Ex. | 3.86 | 96.4 | A | B | B | C | D | C | D | C | D |
| No. 141 | Comp. Ex. | 4.56 | 96.8 | A | B | B | C | D | C | D | C | D |
| No. 142 | Comp. Ex. | 3.54 | 96.2 | A | E | E | C | E | C | D | D | D |
| No. 143 | Comp. Ex. | 4.99 | 94.7 | A | D | D | D | D | C | D | C | D |
| No. 144 | Comp. Ex. | 4.32 | 94.6 | A | D | D | E | D | C | D | C | D |
| No. 145 | Comp. Ex. | 6.77 | 94.6 | A | C | C | D | D | D | E | D | E |

TABLE 16

| Sample No. | | Metal powder Average particle diameter μm | Evaluation results of sintered body | | | | | | | | | |
|---|---|---|---|---|---|---|---|---|---|---|---|---|
| | | | Relative density % | Vickers hardness | Tensile strength | 0.2% proof stress | Elongation | Fatigue strength | Corrosion resistance 24 h | Corrosion resistance 48 h | Wear resistance | Dimensional accuracy |
| No. 146 | Ex. | 4.25 | 99.1 | A | A | A | A | A | A | A | A | A |
| No. 147 | Ex. | 2.95 | 99.0 | A | A | A | A | A | A | A | A | A |
| No. 148 | Ex. | 3.86 | 98.9 | A | A | A | A | A | A | A | A | A |
| No. 149 | Ex. | 3.74 | 98.8 | A | A | A | A | B | A | B | A | A |
| No. 150 | Ex. | 5.87 | 98.7 | A | A | A | A | B | A | B | A | A |
| No. 151 | Ex. | 2.06 | 98.6 | A | A | A | B | B | A | B | A | A |
| No. 152 | Ex. | 9.87 | 98.5 | A | A | A | B | B | A | B | A | B |
| No. 153 | Ex. | 7.15 | 99.0 | A | A | A | A | A | A | A | A | A |
| No. 154 | Ex. | 6.54 | 99.0 | A | A | A | A | A | A | A | A | A |
| No. 155 | Ex. | 9.26 | 98.9 | A | A | A | B | B | A | B | A | B |
| No. 156 | Comp. Ex. | 4.01 | 96.5 | B | C | C | C | D | C | D | C | D |
| No. 157 | Comp. Ex. | 4.65 | 96.7 | B | C | C | C | D | C | D | C | D |
| No. 158 | Comp. Ex. | 3.78 | 96.3 | B | E | E | D | E | C | D | D | D |
| No. 159 | Comp. Ex. | 5.02 | 94.8 | B | D | D | D | D | C | D | C | D |
| No. 160 | Comp. Ex. | 4.26 | 94.7 | B | D | D | E | D | C | D | C | D |

As apparent from Tables 15 and 16, it was confirmed that the sintered bodies corresponding to Example each have a higher relative density than the sintered bodies corresponding to Comparative Example. It was also confirmed that there is a significant difference in properties such as tensile strength, 0.2% proof stress, and elongation between them. Further, it was also confirmed that there is a significant difference in corrosion resistance, wear resistance, and dimensional accuracy between them. Therefore, it was revealed that according to the invention, a gear having sufficient mechanical properties and also having high dimensional accuracy is obtained even when a heat treatment at a relatively low temperature, or a heat treatment even at a high temperature for a short period of time is performed.

7. Production of Sintered Body (Nb—Ta Based)

Sample Nos. 161 to 182

Sintered bodies were obtained in the same manner as the method for producing the sintered body of sample No. 1 except that the composition and the like of the metal powder for powder metallurgy were changed as shown in Tables 17 and 18, respectively. Incidentally, the compositional ratio of the metal powder shown in Table 18 is a Nb—Ta-based metal powder in the same manner as in Table 17, however, the compositional ratio of elements other than Nb and Ta is different.

TABLE 17

| | | Metal powder for powder metallurgy | | | | | | | | | | | | | |
|---|---|---|---|---|---|---|---|---|---|---|---|---|---|---|---|
| | | Alloy composition | | | | | | | | | | | | | |
| Sample No. | — | Cr | Ni | Si | C | E1 (Nb) | E2 (Ta) | Al | Cu | O | Fe | E1/E2 — | E1 + E2 | (E1 + E2)/Si | (E1 + E2)/C | Remarks |
| | | | | | | mass % | | | | | | | mass % | | | — |
| No. 161 | Ex. | 16.46 | 4.19 | 0.76 | 0.018 | 0.32 | 0.13 | 0.00 | 3.95 | 0.28 | Remainder | 2.46 | 0.45 | 0.59 | 25.00 | |
| No. 162 | Ex. | 17.23 | 3.54 | 0.63 | 0.016 | 0.18 | 0.11 | 0.00 | 4.41 | 0.31 | Remainder | 1.64 | 0.29 | 0.46 | 18.13 | |
| No. 163 | Ex. | 15.84 | 4.54 | 0.83 | 0.028 | 0.41 | 0.13 | 0.00 | 3.38 | 0.42 | Remainder | 3.15 | 0.54 | 0.65 | 19.29 | |
| No. 164 | Ex. | 17.76 | 7.43 | 0.75 | 0.045 | 0.08 | 0.13 | 0.81 | 0.00 | 0.47 | Remainder | 0.62 | 0.21 | 0.28 | 4.67 | |
| No. 165 | Ex. | 17.15 | 6.85 | 0.82 | 0.027 | 0.09 | 0.13 | 1.32 | 0.00 | 0.49 | Remainder | 0.69 | 0.22 | 0.27 | 8.15 | |
| No. 166 | Ex. | 16.89 | 8.25 | 0.66 | 0.033 | 0.10 | 0.18 | 1.08 | 0.00 | 0.42 | Remainder | 0.56 | 0.28 | 0.42 | 8.48 | |
| No. 167 | Comp. Ex. | 16.42 | 4.04 | 0.72 | 0.019 | 0.00 | 0.08 | 0.00 | 3.89 | 0.25 | Remainder | 0.00 | 0.08 | 0.11 | 4.21 | |
| No. 168 | Comp. Ex. | 17.18 | 3.54 | 0.66 | 0.023 | 0.32 | 0.00 | 0.00 | 4.29 | 0.29 | Remainder | — | 0.32 | 0.48 | 13.91 | |
| No. 169 | Comp. Ex. | 15.76 | 4.38 | 0.82 | 0.032 | 0.00 | 0.00 | 0.00 | 3.45 | 0.41 | Remainder | — | 0.00 | 0.00 | 0.00 | |
| No. 170 | Comp. Ex. | 16.27 | 3.83 | 0.86 | 0.021 | 0.78 | 0.08 | 0.00 | 4.12 | 0.33 | Remainder | 9.75 | 0.86 | 1.00 | 40.95 | |
| No. 171 | Comp. Ex. | 17.06 | 4.21 | 0.63 | 0.032 | 0.34 | 0.85 | 0.00 | 3.85 | 0.36 | Remainder | 0.40 | 1.19 | 1.89 | 37.19 | |

TABLE 18

| | | Metal powder for powder metallurgy | | | | | | | | | | | | | |
|---|---|---|---|---|---|---|---|---|---|---|---|---|---|---|---|
| | | Alloy composition | | | | | | | | | | | | | |
| Sample No. | — | Cr | Ni | Si | C | E1 (Nb) | E2 (Ta) | Co | Mo | O | Fe | E1/E2 — | E1 + E2 | (E1 + E2)/Si | (E1 + E2)/C | Remarks |
| | | | | | | mass % | | | | | | | mass % | | | — |
| No. 172 | Ex. | 0.00 | 18.02 | 0.68 | 0.013 | 0.05 | 0.08 | 7.87 | 4.65 | 0.14 | Remainder | 0.63 | 0.13 | 0.19 | 10.00 | |
| No. 173 | Ex. | 0.00 | 18.97 | 0.54 | 0.024 | 0.06 | 0.07 | 7.23 | 5.14 | 0.26 | Remainder | 0.86 | 0.13 | 0.24 | 5.42 | |
| No. 174 | Ex. | 0.00 | 17.56 | 0.84 | 0.039 | 0.13 | 0.10 | 8.47 | 3.65 | 0.07 | Remainder | 1.30 | 0.23 | 0.27 | 5.90 | |
| No. 175 | Ex. | 10.54 | 6.57 | 3.84 | 0.016 | 0.06 | 0.05 | 10.45 | 1.43 | 0.41 | Remainder | 1.20 | 0.11 | 0.03 | 6.88 | Cu: 0.93 Mn: 1.08 |
| No. 176 | Ex. | 9.89 | 6.01 | 4.15 | 0.021 | 0.08 | 0.12 | 10.08 | 0.36 | 0.34 | Remainder | 0.67 | 0.20 | 0.05 | 9.52 | Cu: 1.28 Mn: 0.69 |
| No. 177 | Ex. | 11.42 | 7.11 | 3.08 | 0.032 | 0.13 | 0.09 | 11.12 | 1.58 | 0.46 | Remainder | 1.44 | 0.22 | 0.07 | 6.88 | Cu: 0.75 Mn: 1.34 |
| No. 178 | Comp. Ex. | 0.00 | 18.21 | 0.79 | 0.014 | 0.00 | 0.08 | 8.06 | 4.75 | 0.37 | Remainder | 0.00 | 0.08 | 0.10 | 5.71 | |
| No. 179 | Comp. Ex. | 0.00 | 18.79 | 0.61 | 0.021 | 0.08 | 0.00 | 7.23 | 5.06 | 0.34 | Remainder | — | 0.08 | 0.13 | 3.81 | |
| No. 180 | Comp. Ex. | 0.00 | 17.59 | 0.87 | 0.033 | 0.00 | 0.00 | 8.24 | 3.74 | 0.48 | Remainder | — | 0.00 | 0.00 | 0.00 | |
| No. 181 | Comp. Ex. | 0.00 | 18.04 | 0.73 | 0.015 | 0.76 | 0.05 | 8.11 | 4.87 | 0.34 | Remainder | 15.20 | 0.81 | 1.11 | 54.00 | |
| No. 182 | Comp. Ex. | 0.00 | 18.31 | 0.78 | 0.029 | 0.06 | 0.74 | 8.07 | 4.99 | 0.45 | Remainder | 0.08 | 0.80 | 1.03 | 27.59 | |

In Tables 17 and 18, among the sintered bodies of the respective sample Nos., those corresponding to the invention are denoted by "Ex." (Example), and those not corresponding to the invention are denoted by "Comp. Ex." (Comparative Example).

Each sintered body contained very small amounts of impurities, but the description thereof in Tables 17 and 18 is omitted.

8. Evaluation of Sintered Body (Nb—Ta Based)

8.1 Evaluation of Relative Density

With respect to the sintered bodies of the respective sample Nos. shown in Tables 17 and 18, the sintered density was measured in accordance with the method for measuring the density of sintered metal materials specified in JIS Z 2501 (2000), and also the relative density of each sintered body was calculated with reference to the true density of the metal powder for powder metallurgy used for producing each sintered body.

The calculation results are shown in Tables 19 and 20.

8.2 Evaluation of Hardness

With respect to the sintered bodies of the respective sample Nos. shown in Tables 17 and 18, the Vickers hardness was measured in accordance with the Vickers hardness test method specified in JIS Z 2244 (2009).

Then, the measured hardness was evaluated according to the evaluation criteria described in 2.2.

The evaluation results are shown in Tables 19 and 20.

8.3 Evaluation of Tensile Strength, 0.2% Proof Stress, and Elongation

With respect to the sintered bodies of the respective sample Nos. shown in Tables 17 and 18, the tensile strength, 0.2% proof stress, and elongation were measured in accordance with the metal material tensile test method specified in JIS Z 2241 (2011).

Then, the measured physical property values were evaluated according to the evaluation criteria described in 2.3.

The evaluation results are shown in Tables 19 and 20.

8.4 Evaluation of Fatigue Strength

With respect to the sintered bodies of the respective sample Nos. shown in Tables 17 and 18, the fatigue strength was measured in the same manner as in 2.4.

Then, the measured fatigue strength was evaluated according to the evaluation criteria described in 2.4.

The evaluation results are shown in Tables 19 and 20.

8.5 Evaluation of Corrosion Resistance

With respect to the sintered bodies of the respective sample Nos. shown in Tables 17 and 18, the corrosion resistance was measured in the same manner as in 2.5.

Then, the measured corrosion resistance was evaluated according to the evaluation criteria described in 2.5.

The evaluation results are shown in Tables 19 and 20.

8.6 Evaluation of Wear Resistance

With respect to the sintered bodies of the respective sample Nos. shown in Tables 17 and 18, the wear resistance was measured in the same manner as in 2.6.

Then, the measured wear resistance was evaluated according to the evaluation criteria described in 2.6.

The evaluation results are shown in Tables 19 and 20.

8.7 Evaluation of Dimensional Accuracy

With respect to the sintered bodies of the respective sample Nos. shown in Tables 17 and 18, the dimensional accuracy was measured in the same manner as in 2.7.

Then, the measured dimensional accuracy was evaluated according to the evaluation criteria described in 2.7.

The evaluation results are shown in Tables 19 and 20.

TABLE 19

| | | Metal powder Average particle | Relative | Vickers | Tensile | 0.2% | | Fatigue | Corrosion resistance | | Wear | Dimensional |
| Sample No. | | diameter μm | density % | hardness — | strength — | proof stress — | Elongation — | strength — | 24 h — | 48 h — | resistance — | accuracy — |
| --- | --- | --- | --- | --- | --- | --- | --- | --- | --- | --- | --- | --- |
| No. 161 | Ex. | 4.55 | 98.8 | A | A | A | B | B | A | B | A | A |
| No. 162 | Ex. | 5.89 | 99.0 | A | A | A | A | B | A | B | A | A |
| No. 163 | Ex. | 7.82 | 98.8 | A | A | A | B | B | A | B | A | A |
| No. 164 | Ex. | 2.15 | 98.8 | A | A | A | A | B | A | A | A | A |
| No. 165 | Ex. | 3.88 | 98.9 | A | A | A | A | B | A | A | A | A |
| No. 166 | Ex. | 3.69 | 98.6 | A | A | A | A | B | A | A | A | A |
| No. 167 | Comp. Ex. | 3.64 | 96.5 | A | D | D | B | D | C | D | C | D |
| No. 168 | Comp. Ex. | 4.58 | 96.8 | A | D | D | B | D | C | D | C | D |
| No. 169 | Comp. Ex. | 5.69 | 96.1 | A | E | E | C | E | C | D | D | D |
| No. 170 | Comp. Ex. | 2.45 | 94.6 | A | D | D | D | D | C | D | D | D |
| No. 171 | Comp. Ex. | 4.65 | 94.5 | A | D | D | E | D | C | D | D | D |

TABLE 20

| | | Metal powder Average particle | Relative | Vickers | Tensile | 0.2% | | Fatigue | Corrosion resistance | | Wear | Dimensional |
| Sample No. | | diameter μm | density % | hardness — | strength — | proof stress — | Elongation — | strength — | 24 h — | 48 h — | resistance — | accuracy — |
| --- | --- | --- | --- | --- | --- | --- | --- | --- | --- | --- | --- | --- |
| No. 172 | Ex. | 4.53 | 98.7 | A | A | A | B | B | A | A | A | A |
| No. 173 | Ex. | 5.91 | 98.9 | A | A | A | A | B | A | A | A | A |
| No. 174 | Ex. | 7.76 | 98.6 | A | A | A | B | B | A | A | B | A |
| No. 175 | Ex. | 2.08 | 98.5 | A | A | A | A | A | A | A | A | A |

TABLE 20-continued

| | | Evaluation results of sintered body | | | | | | | | | |
|---|---|---|---|---|---|---|---|---|---|---|---|
| Sample No. | Metal powder Average particle diameter μm | Relative density % | Vickers hardness | Tensile strength | 0.2% proof stress | Elongation | Fatigue strength | Corrosion resistance 24 h | 48 h | Wear resistance | Dimensional accuracy |
| | — | | — | — | — | — | — | — | — | — | — |
| No. 176 Ex. | 3.76 | 98.8 | A | A | A | A | A | A | A | A | A |
| No. 177 Ex. | 3.54 | 98.7 | A | A | A | B | B | A | B | A | A |
| No. 178 Comp. Ex. | 3.48 | 96.4 | B | D | D | C | D | C | D | C | D |
| No. 179 Comp. Ex. | 4.39 | 96.7 | B | D | D | C | D | C | C | C | D |
| No. 180 Comp. Ex. | 5.71 | 96.0 | B | E | E | D | E | D | E | D | D |
| No. 181 Comp. Ex. | 2.41 | 94.7 | B | D | D | D | D | C | D | D | D |
| No. 182 Comp. Ex. | 4.55 | 94.4 | B | D | D | E | D | C | D | D | D |

As apparent from Tables 19 and 20, it was confirmed that the sintered bodies corresponding to Example each have a higher relative density than the sintered bodies corresponding to Comparative Example. It was also confirmed that there is a significant difference in properties such as tensile strength, 0.2% proof stress, and elongation between them. Further, it was also confirmed that there is a significant difference in corrosion resistance, wear resistance, and dimensional accuracy between them. Therefore, it was revealed that according to the invention, a gear having sufficient mechanical properties and also having high dimensional accuracy is obtained even when a heat treatment at a relatively low temperature, or a heat treatment even at a high temperature for a short period of time is performed.

9. Production of Sintered Body (Y—Nb Based)

Sample Nos. 183 to 208

Sintered bodies were obtained in the same manner as the method for producing the sintered body of sample No. 1 except that the composition and the like of the metal powder for powder metallurgy were changed as shown in Tables 21 and 22, respectively. Incidentally, the compositional ratio of the metal powder shown in Table 22 is a Y—Nb-based metal powder in the same manner as in Table 21, however, the compositional ratio of elements other than Y and Nb is different.

TABLE 21

| | Metal powder for powder metallurgy | | | | | | | | | | | | | | |
|---|---|---|---|---|---|---|---|---|---|---|---|---|---|---|---|
| | Alloy composition | | | | | | | | | | | (E1 + | (E1 + | | |
| Sample No. | Cr | Ni | Si | C | E1 (Y) | E2 (Nb) | Al | Cu | O | Fe | E1/E2 | E1 + E2 | E2)/Si | E2)/C | Remarks |
| | | | | | mass % | | | | | | — | mass % | — | — | — |
| No. 183 Ex. | 16.51 | 4.21 | 0.74 | 0.018 | 0.13 | 0.32 | 0.00 | 3.89 | 0.29 | Remainder | 0.41 | 0.45 | 0.61 | 25.00 | |
| No. 184 Ex. | 17.21 | 3.57 | 0.61 | 0.016 | 0.06 | 0.18 | 0.00 | 4.42 | 0.33 | Remainder | 0.33 | 0.24 | 0.39 | 15.00 | |
| No. 185 Ex. | 15.74 | 4.57 | 0.83 | 0.033 | 0.10 | 0.42 | 0.00 | 3.45 | 0.39 | Remainder | 0.24 | 0.52 | 0.63 | 15.76 | |
| No. 186 Ex. | 17.75 | 7.36 | 0.75 | 0.045 | 0.08 | 0.12 | 0.85 | 0.00 | 0.45 | Remainder | 0.67 | 0.20 | 0.27 | 4.44 | |
| No. 187 Ex. | 17.23 | 6.86 | 0.80 | 0.027 | 0.09 | 0.13 | 1.36 | 0.00 | 0.48 | Remainder | 0.69 | 0.22 | 0.28 | 8.15 | |
| No. 188 Ex. | 16.95 | 8.28 | 0.64 | 0.033 | 0.09 | 0.17 | 1.14 | 0.00 | 0.41 | Remainder | 0.53 | 0.26 | 0.41 | 7.88 | |
| No. 189 Comp. Ex. | 16.43 | 4.03 | 0.74 | 0.019 | 0.00 | 0.32 | 0.00 | 3.96 | 0.29 | Remainder | 0.00 | 0.32 | 0.43 | 16.84 | |
| No. 190 Comp. Ex. | 17.23 | 3.54 | 0.63 | 0.024 | 0.08 | 0.00 | 0.00 | 4.36 | 0.35 | Remainder | — | 0.08 | 0.13 | 3.33 | |
| No. 191 Comp. Ex. | 15.78 | 4.42 | 0.84 | 0.032 | 0.00 | 0.00 | 0.00 | 3.46 | 0.41 | Remainder | — | 0.00 | 0.00 | 0.00 | |
| No. 192 Comp. Ex. | 16.25 | 3.83 | 0.88 | 0.021 | 0.84 | 0.16 | 0.00 | 4.06 | 0.36 | Remainder | 5.25 | 1.00 | 1.14 | 47.62 | |
| No. 193 Comp. Ex. | 17.10 | 4.21 | 0.67 | 0.029 | 0.09 | 0.78 | 0.00 | 3.84 | 0.41 | Remainder | 0.12 | 0.87 | 1.30 | 30.00 | |
| No. 194 Comp. Ex. | 17.81 | 7.35 | 0.76 | 0.041 | 0.00 | 0.10 | 0.88 | 0.00 | 0.47 | Remainder | 0.00 | 0.10 | 0.13 | 2.44 | |
| No. 195 Comp. Ex. | 17.25 | 6.92 | 0.83 | 0.034 | 0.11 | 0.00 | 1.25 | 0.00 | 0.48 | Remainder | — | 0.11 | 0.13 | 3.24 | |

TABLE 22

| | Metal powder for powder metallurgy | | | | | | | | | | | | | | |
|---|---|---|---|---|---|---|---|---|---|---|---|---|---|---|---|
| | Alloy composition | | | | | | | | | | | (E1 + | (E1 + | | |
| Sample No. | Cr | Ni | Si | C | E1 (Y) | E2 (Nb) | Co | Mo | O | Fe | E1/E2 | E1 + E2 | E2)/Si | E2)/C | Remarks |
| | | | | | mass % | | | | | | — | mass % | — | — | — |
| No. 196 Ex. | 0.00 | 18.11 | 0.66 | 0.015 | 0.07 | 0.08 | 8.25 | 4.88 | 0.13 | Remainder | 0.88 | 0.15 | 0.23 | 10.00 | |
| No. 197 Ex. | 0.00 | 18.86 | 0.51 | 0.023 | 0.06 | 0.09 | 7.25 | 5.09 | 0.28 | Remainder | 0.67 | 0.15 | 0.29 | 6.52 | |
| No. 198 Ex. | 0.00 | 17.61 | 0.85 | 0.041 | 0.15 | 0.10 | 8.61 | 3.74 | 0.09 | Remainder | 1.50 | 0.25 | 0.29 | 6.10 | |
| No. 199 Ex. | 10.48 | 6.61 | 3.91 | 0.015 | 0.06 | 0.06 | 10.43 | 1.41 | 0.42 | Remainder | 1.00 | 0.12 | 0.03 | 8.00 | Cu: 0.98 Mn: 1.11 |
| No. 200 Ex. | 9.86 | 5.89 | 4.21 | 0.023 | 0.08 | 0.14 | 9.89 | 0.41 | 0.35 | Remainder | 0.57 | 0.22 | 0.05 | 9.57 | Cu: 1.33 Mn: 0.64 |
| No. 201 Ex. | 11.48 | 7.12 | 3.09 | 0.035 | 0.14 | 0.09 | 11.21 | 1.63 | 0.48 | Remainder | 1.56 | 0.23 | 0.07 | 6.57 | Cu: 0.79 Mn: 1.28 |

TABLE 22-continued

| | | Metal powder for powder metallurgy | | | | | | | | | | | | | | |
|---|---|---|---|---|---|---|---|---|---|---|---|---|---|---|---|---|
| | | Alloy composition | | | | | | | | | | | (E1 + | (E1 + | | |
| Sample No. | — | Cr | Ni | Si | C | E1 (Y) | E2 (Nb) mass % | Co | Mo | O | Fe | E1/E2 — | E1 + E2 mass % | E2)/Si — | E2)/C — | Remarks — |
| No. 202 | Comp. Ex. | 0.00 | 18.16 | 0.75 | 0.013 | 0.00 | 0.07 | 8.04 | 4.78 | 0.36 | Remainder | 0.00 | 0.07 | 0.09 | 5.38 | |
| No. 203 | Comp. Ex. | 0.00 | 18.81 | 0.59 | 0.022 | 0.09 | 0.00 | 7.32 | 5.11 | 0.33 | Remainder | — | 0.09 | 0.15 | 4.09 | |
| No. 204 | Comp. Ex. | 0.00 | 17.54 | 0.86 | 0.031 | 0.00 | 0.00 | 8.31 | 3.72 | 0.45 | Remainder | — | 0.00 | 0.00 | 0.00 | |
| No. 205 | Comp. Ex. | 0.00 | 18.06 | 0.74 | 0.016 | 0.78 | 0.06 | 8.15 | 4.69 | 0.35 | Remainder | 13.00 | 0.84 | 1.14 | 52.50 | |
| No. 206 | Comp. Ex. | 0.00 | 18.35 | 0.79 | 0.031 | 0.07 | 0.74 | 8.09 | 5.01 | 0.42 | Remainder | 0.09 | 0.81 | 1.03 | 26.13 | |
| No. 207 | Comp. Ex. | 10.51 | 6.58 | 3.87 | 0.017 | 0.00 | 0.09 | 10.74 | 1.46 | 0.42 | Remainder | 0.00 | 0.09 | 0.02 | 5.29 | Cu: 0.95 Mn: 1.06 |
| No. 208 | Comp. Ex. | 9.87 | 6.11 | 4.21 | 0.024 | 0.15 | 0.00 | 10.06 | 0.37 | 0.35 | Remainder | — | 0.15 | 0.04 | 6.25 | Cu: 1.35 Mn: 0.59 |

In Tables 21 and 22, among the sintered bodies of the respective sample Nos., those corresponding to the invention are denoted by "Ex." (Example), and those not corresponding to the invention are denoted by "Comp. Ex." (Comparative Example).

Each sintered body contained very small amounts of impurities, but the description thereof in Tables 21 and 22 is omitted.

10. Evaluation of Sintered Body (Y—Nb Based)

10.1 Evaluation of Relative Density

With respect to the sintered bodies of the respective sample Nos. shown in Tables 21 and 22, the sintered density was measured in accordance with the method for measuring the density of sintered metal materials specified in JIS Z 2501 (2000), and also the relative density of each sintered body was calculated with reference to the true density of the metal powder for powder metallurgy used for producing each sintered body.

The calculation results are shown in Tables 23 and 24.

10.2 Evaluation of Hardness

With respect to the sintered bodies of the respective sample Nos. shown in Tables 21 and 22, the Vickers hardness was measured in accordance with the Vickers hardness test method specified in JIS Z 2244 (2009).

Then, the measured hardness was evaluated according to the evaluation criteria described in 2.2.

The evaluation results are shown in Tables 23 and 24.

10.3 Evaluation of Tensile Strength, 0.2% Proof Stress, and Elongation

With respect to the sintered bodies of the respective sample Nos. shown in Tables 21 and 22, the tensile strength, 0.2% proof stress, and elongation were measured in accordance with the metal material tensile test method specified in JIS Z 2241 (2011).

Then, the measured physical property values were evaluated according to the evaluation criteria described in 2.3.

The evaluation results are shown in Tables 23 and 24.

10.4 Evaluation of Fatigue Strength

With respect to the sintered bodies of the respective sample Nos. shown in Tables 21 and 22, the fatigue strength was measured in the same manner as in 2.4.

Then, the measured fatigue strength was evaluated according to the evaluation criteria described in 2.4.

The evaluation results are shown in Tables 23 and 24.

10.5 Evaluation of Corrosion Resistance

With respect to the sintered bodies of the respective sample Nos. shown in Tables 21 and 22, the corrosion resistance was measured in the same manner as in 2.5.

Then, the measured corrosion resistance was evaluated according to the evaluation criteria described in 2.5.

The evaluation results are shown in Tables 23 and 24.

10.6 Evaluation of Wear Resistance

With respect to the sintered bodies of the respective sample Nos. shown in Tables 21 and 22, the wear resistance was measured in the same manner as in 2.6.

Then, the measured wear resistance was evaluated according to the evaluation criteria described in 2.6.

The evaluation results are shown in Tables 23 and 24.

10.7 Evaluation of Dimensional Accuracy

With respect to the sintered bodies of the respective sample Nos. shown in Tables 21 and 22, the dimensional accuracy was measured in the same manner as in 2.7.

Then, the measured dimensional accuracy was evaluated according to the evaluation criteria described in 2.7.

The evaluation results are shown in Tables 23 and 24.

TABLE 23

| | | Metal powder | Evaluation results of sintered body | | | | | | | | | |
|---|---|---|---|---|---|---|---|---|---|---|---|---|
| | | Average particle | Relative | Vickers | Tensile | 0.2% | | Fatigue | Corrosion resistance | | | Dimensional |
| Sample No. | — | diameter μm | density % | hardness — | strength — | proof stress — | Elongation — | strength — | 24 h — | 48 h — | Wear resistance — | accuracy — |
| No. 183 | Ex. | 4.38 | 99.1 | A | A | A | A | A | A | A | A | A |
| No. 184 | Ex. | 8.54 | 98.8 | A | A | A | A | A | A | A | A | A |
| No. 185 | Ex. | 3.22 | 99.0 | A | A | A | A | A | A | A | A | A |
| No. 186 | Ex. | 2.36 | 98.7 | A | A | A | A | A | A | A | B | A |
| No. 187 | Ex. | 7.75 | 98.9 | A | A | A | A | A | A | A | B | A |
| No. 188 | Ex. | 9.87 | 98.8 | A | A | A | A | A | A | A | B | A |
| No. 189 | Comp. Ex. | 4.56 | 96.8 | A | B | B | C | C | C | D | C | D |
| No. 190 | Comp. Ex. | 3.89 | 96.5 | A | C | C | C | D | C | D | C | D |
| No. 191 | Comp. Ex. | 3.54 | 96.0 | A | D | D | E | E | C | D | D | E |

TABLE 23-continued

| | | Metal powder | | Evaluation results of sintered body | | | | | | | | |
|---|---|---|---|---|---|---|---|---|---|---|---|---|
| | | Average particle | Relative | Vickers | Tensile | 0.2% | | Fatigue | Corrosion resistance | | Wear | Dimensional |
| Sample No. | — | diameter μm | density % | hardness — | strength — | proof stress — | Elongation — | strength — | 24 h — | 48 h — | resistance — | accuracy — |
| No. 192 | Comp. Ex. | 4.89 | 94.5 | F | F | F | F | F | C | D | D | D |
| No. 193 | Comp. Ex. | 5.21 | 94.3 | A | D | D | D | E | C | D | D | D |
| No. 194 | Comp. Ex. | 3.79 | 96.3 | A | B | B | C | C | C | D | C | D |
| No. 195 | Comp. Ex. | 3.84 | 96.2 | A | C | C | C | D | C | D | C | D |

TABLE 24

| | | Metal powder | | Evaluation results of sintered body | | | | | | | | |
|---|---|---|---|---|---|---|---|---|---|---|---|---|
| | | Average particle | Relative | Vickers | Tensile | 0.2% | | Fatigue | Corrosion resistance | | Wear | Dimensional |
| Sample No. | — | diameter μm | density % | hardness — | strength — | proof stress — | Elongation — | strength — | 24 h — | 48 h — | resistance — | accuracy — |
| No. 196 | Ex. | 4.41 | 99.0 | A | A | A | A | A | A | A | A | A |
| No. 197 | Ex. | 8.25 | 98.7 | A | A | A | A | B | A | A | A | A |
| No. 198 | Ex. | 3.05 | 98.9 | A | A | A | A | A | A | A | A | A |
| No. 199 | Ex. | 2.14 | 98.8 | A | A | A | A | A | A | A | A | A |
| No. 200 | Ex. | 7.87 | 99.0 | A | A | A | B | B | A | A | A | A |
| No. 201 | Ex. | 10.05 | 98.9 | A | A | A | A | B | A | A | A | A |
| No. 202 | Comp. Ex. | 4.52 | 96.7 | B | C | C | C | C | C | D | C | D |
| No. 203 | Comp. Ex. | 3.81 | 96.4 | B | C | C | C | D | C | D | C | D |
| No. 204 | Comp. Ex. | 3.65 | 95.9 | B | D | D | E | E | D | E | C | D |
| No. 205 | Comp. Ex. | 4.59 | 94.4 | F | F | F | F | F | C | D | C | D |
| No. 206 | Comp. Ex. | 5.36 | 94.2 | B | D | D | D | E | C | D | C | D |
| No. 207 | Comp. Ex. | 2.15 | 95.8 | B | C | C | C | D | C | D | C | C |
| No. 208 | Comp. Ex. | 7.68 | 95.7 | B | C | C | C | D | C | D | C | C |

As apparent from Tables 23 and 24, it was confirmed that the sintered bodies corresponding to Example each have a higher relative density than the sintered bodies corresponding to Comparative Example. It was also confirmed that there is a significant difference in properties such as tensile strength, 0.2% proof stress, and elongation between them. Further, it was also confirmed that there is a significant difference in corrosion resistance, wear resistance, and dimensional accuracy between them. Therefore, it was revealed that according to the invention, a gear having sufficient mechanical properties and also having high dimensional accuracy is obtained even when a heat treatment at a relatively low temperature, or a heat treatment even at a high temperature for a short period of time is performed.

11. Production of Sintered Body (V—Nb Based)

Sample Nos. 209 to 234

Sintered bodies were obtained in the same manner as the method for producing the sintered body of sample No. 1 except that the composition and the like of the metal powder for powder metallurgy were changed as shown in Tables 25 and 26, respectively. Incidentally, the compositional ratio of the metal powder shown in Table 26 is a V—Nb-based metal powder in the same manner as in Table 25, however, the compositional ratio of elements other than V and Nb is different.

TABLE 25

| | | Metal powder for powder metallurgy | | | | | | | | | | | | | |
|---|---|---|---|---|---|---|---|---|---|---|---|---|---|---|---|
| | | Alloy composition | | | | | | | | | | | (E1 + E2)/Si | (E1 + E2)/C | |
| Sample No. | — | Cr | Ni | Si | C | E1 (V) | E2 (Nb) | Al | Cu | O | Fe | E1/E2 — | E1 + E2 mass % | | Remarks |
| | | | | | | mass % | | | | | | | | | — |
| No. 209 | Ex. | 16.48 | 4.15 | 0.75 | 0.021 | 0.07 | 0.32 | 0.00 | 3.86 | 0.31 | Remainder | 0.22 | 0.39 | 0.52 | 18.57 | |
| No. 210 | Ex. | 17.26 | 3.54 | 0.63 | 0.015 | 0.05 | 0.19 | 0.00 | 4.41 | 0.29 | Remainder | 0.26 | 0.24 | 0.38 | 16.00 | |
| No. 211 | Ex. | 15.68 | 4.59 | 0.85 | 0.032 | 0.10 | 0.43 | 0.00 | 3.43 | 0.41 | Remainder | 0.23 | 0.53 | 0.62 | 16.56 | |
| No. 212 | Ex. | 17.68 | 7.29 | 0.73 | 0.044 | 0.07 | 0.14 | 0.84 | 0.00 | 0.44 | Remainder | 0.50 | 0.21 | 0.29 | 4.77 | |
| No. 213 | Ex. | 17.21 | 6.85 | 0.79 | 0.028 | 0.05 | 0.14 | 1.34 | 0.00 | 0.47 | Remainder | 0.36 | 0.19 | 0.24 | 6.79 | |
| No. 214 | Ex. | 16.92 | 8.25 | 0.65 | 0.031 | 0.09 | 0.17 | 1.12 | 0.00 | 0.39 | Remainder | 0.53 | 0.26 | 0.40 | 8.39 | |
| No. 215 | Comp. Ex. | 16.45 | 4.08 | 0.75 | 0.018 | 0.00 | 0.30 | 0.00 | 3.91 | 0.29 | Remainder | 0.00 | 0.30 | 0.40 | 16.67 | |
| No. 216 | Comp. Ex. | 17.28 | 3.49 | 0.62 | 0.025 | 0.09 | 0.00 | 0.00 | 4.34 | 0.32 | Remainder | — | 0.09 | 0.15 | 3.60 | |
| No. 217 | Comp. Ex. | 15.74 | 4.39 | 0.79 | 0.029 | 0.00 | 0.00 | 0.00 | 3.44 | 0.43 | Remainder | — | 0.00 | 0.00 | 0.00 | |
| No. 218 | Comp. Ex. | 16.31 | 3.85 | 0.87 | 0.019 | 0.85 | 0.15 | 0.00 | 4.11 | 0.35 | Remainder | 5.67 | 1.00 | 1.15 | 52.63 | |

TABLE 25-continued

| | | | | | | Metal powder for powder metallurgy | | | | | | | | | |
|---|---|---|---|---|---|---|---|---|---|---|---|---|---|---|---|
| | | Alloy composition | | | | | | | | | | | (E1 + | (E1 + | |
| Sample No. | | Cr | Ni | Si | C | E1 (V) | E2 (Nb) | Al | Cu | O | Fe | E1/E2 | E1 + E2 | E2)/Si | E2)/C Remarks |
| | — | | | | | mass % | | | | | | — | mass % | — | — — |
| No. 219 | Comp. Ex. | 17.09 | 4.23 | 0.68 | 0.028 | 0.10 | 0.81 | 0.00 | 3.83 | 0.42 | Remainder | 0.12 | 0.91 | 1.34 | 32.50 |
| No. 220 | Comp. Ex. | 17.82 | 7.38 | 0.75 | 0.039 | 0.00 | 0.12 | 0.84 | 0.00 | 0.45 | Remainder | 0.00 | 0.12 | 0.16 | 3.08 |
| No. 221 | Comp. Ex. | 17.34 | 6.88 | 0.79 | 0.033 | 0.08 | 0.00 | 1.23 | 0.00 | 0.46 | Remainder | — | 0.08 | 0.10 | 2.42 |

TABLE 26

| | | | | | | Metal powder for powder metallurgy | | | | | | | | | |
|---|---|---|---|---|---|---|---|---|---|---|---|---|---|---|---|
| | | Alloy composition | | | | | | | | | | | (E1 + | (E1 + | |
| Sample No. | | Cr | Ni | Si | C | E1 (V) | E2 (Nb) | Co | Mo | O | Fe | E1/E2 | E1 + E2 | E2)/Si | E2)/C Remarks |
| | — | | | | | mass % | | | | | | — | mass % | — | — — |
| No. 222 | Ex. | 0.00 | 18.06 | 0.59 | 0.016 | 0.05 | 0.09 | 8.04 | 4.89 | 0.14 | Remainder | 0.56 | 0.14 | 0.24 | 8.75 |
| No. 223 | Ex. | 0.00 | 18.97 | 0.51 | 0.025 | 0.03 | 0.10 | 7.42 | 5.14 | 0.29 | Remainder | 0.30 | 0.13 | 0.25 | 5.20 |
| No. 224 | Ex. | 0.00 | 17.64 | 0.87 | 0.043 | 0.14 | 0.12 | 8.57 | 3.72 | 0.08 | Remainder | 1.17 | 0.26 | 0.30 | 6.05 |
| No. 225 | Ex. | 10.43 | 6.58 | 3.87 | 0.014 | 0.06 | 0.07 | 10.36 | 1.28 | 0.41 | Remainder | 0.86 | 0.13 | 0.03 | 9.29 Cu: 0.95 Mn: 1.15 |
| No. 226 | Ex. | 9.81 | 5.84 | 4.32 | 0.021 | 0.08 | 0.15 | 9.94 | 0.42 | 0.36 | Remainder | 0.53 | 0.23 | 0.05 | 10.95 Cu: 1.34 Mn: 0.65 |
| No. 227 | Ex. | 11.45 | 7.15 | 3.04 | 0.034 | 0.13 | 0.08 | 11.25 | 1.65 | 0.47 | Remainder | 1.63 | 0.21 | 0.07 | 6.18 Cu: 0.81 Mn: 1.31 |
| No. 228 | Comp. Ex. | 0.00 | 18.04 | 0.61 | 0.014 | 0.00 | 0.08 | 8.03 | 4.75 | 0.34 | Remainder | 0.00 | 0.08 | 0.13 | 5.71 |
| No. 229 | Comp. Ex. | 0.00 | 18.96 | 0.58 | 0.021 | 0.08 | 0.00 | 7.26 | 5.12 | 0.32 | Remainder | — | 0.08 | 0.14 | 3.81 |
| No. 230 | Comp. Ex. | 0.00 | 17.52 | 0.88 | 0.034 | 0.00 | 0.00 | 8.35 | 3.74 | 0.48 | Remainder | — | 0.00 | 0.00 | 0.00 |
| No. 231 | Comp. Ex. | 0.00 | 18.09 | 0.76 | 0.015 | 0.77 | 0.06 | 8.14 | 4.75 | 0.34 | Remainder | 12.83 | 0.83 | 1.09 | 55.33 |
| No. 232 | Comp. Ex. | 0.00 | 18.34 | 0.81 | 0.029 | 0.07 | 0.73 | 8.11 | 4.98 | 0.41 | Remainder | 0.10 | 0.80 | 0.99 | 27.59 |
| No. 233 | Comp. Ex. | 10.49 | 6.61 | 3.85 | 0.015 | 0.00 | 0.10 | 10.67 | 1.42 | 0.46 | Remainder | 0.00 | 0.10 | 0.03 | 6.67 Cu: 0.96 Mn: 1.09 |
| No. 234 | Comp. Ex. | 9.85 | 6.09 | 4.16 | 0.025 | 0.16 | 0.00 | 10.08 | 0.35 | 0.25 | Remainder | — | 0.16 | 0.04 | 6.40 Cu: 1.32 Mn: 0.67 |

In Tables 25 and 26, among the sintered bodies of the respective sample Nos., those corresponding to the invention are denoted by "Ex." (Example), and those not corresponding to the invention are denoted by "Comp. Ex." (Comparative Example).

Each sintered body contained very small amounts of impurities, but the description thereof in Tables 25 and 26 is omitted.

12. Evaluation of Sintered Body (V—Nb Based)
12.1 Evaluation of Relative Density With respect to the sintered bodies of the respective sample Nos. shown in Tables 25 and 26, the sintered density was measured in accordance with the method for measuring the density of sintered metal materials specified in JIS Z 2501 (2000), and also the relative density of each sintered body was calculated with reference to the true density of the metal powder for powder metallurgy used for producing each sintered body.

The calculation results are shown in Tables 27 and 28.
12.2 Evaluation of Hardness With respect to the sintered bodies of the respective sample Nos. shown in Tables 25 and 26, the Vickers hardness was measured in accordance with the Vickers hardness test method specified in JIS Z 2244 (2009).

Then, the measured hardness was evaluated according to the evaluation criteria described in 2.2.

The evaluation results are shown in Tables 27 and 28.
12.3 Evaluation of Tensile Strength, 0.2% Proof Stress, and Elongation With respect to the sintered bodies of the respective sample Nos. shown in Tables 25 and 26, the tensile strength, 0.2% proof stress, and elongation were measured in accordance with the metal material tensile test method specified in JIS Z 2241 (2011).

Then, the measured physical property values were evaluated according to the evaluation criteria described in 2.3.

The evaluation results are shown in Tables 27 and 28.
12.4 Evaluation of Fatigue Strength With respect to the sintered bodies of the respective sample Nos. shown in Tables 25 and 26, the fatigue strength was measured in the same manner as in 2.4.

Then, the measured fatigue strength was evaluated according to the evaluation criteria described in 2.4.

The evaluation results are shown in Tables 27 and 28.
12.5 Evaluation of Corrosion Resistance With respect to the sintered bodies of the respective sample Nos. shown in Tables 25 and 26, the corrosion resistance was measured in the same manner as in 2.5.

Then, the measured corrosion resistance was evaluated according to the evaluation criteria described in 2.5.

The evaluation results are shown in Tables 27 and 28.
12.6 Evaluation of Wear Resistance With respect to the sintered bodies of the respective sample Nos. shown in Tables 25 and 26, the wear resistance was measured in the same manner as in 2.6.

Then, the measured wear resistance was evaluated according to the evaluation criteria described in 2.6.

The evaluation results are shown in Tables 27 and 28.

12.7 Evaluation of Dimensional Accuracy

With respect to the sintered bodies of the respective sample Nos. shown in Tables 25 and 26, the dimensional accuracy was measured in the same manner as in 2.7.

Then, the measured dimensional accuracy was evaluated according to the evaluation criteria described in 2.7.

The evaluation results are shown in Tables 27 and 28.

TABLE 27

| Sample No. | | Metal powder Average particle diameter μm | Evaluation results of sintered body | | | | | | | | | |
|---|---|---|---|---|---|---|---|---|---|---|---|---|
| | | | Relative density % | Vickers hardness | Tensile strength | 0.2% proof stress | Elongation | Fatigue strength | Corrosion resistance 24 h | Corrosion resistance 48 h | Wear resistance | Dimensional accuracy |
| No. 209 | Ex. | 4.56 | 98.7 | A | A | A | B | B | A | A | A | A |
| No. 210 | Ex. | 8.59 | 98.6 | A | A | A | B | B | A | A | A | A |
| No. 211 | Ex. | 3.25 | 98.7 | A | A | A | B | B | A | A | A | A |
| No. 212 | Ex. | 2.63 | 98.5 | A | A | A | B | B | A | A | A | A |
| No. 213 | Ex. | 3.88 | 98.7 | A | A | A | B | B | A | A | A | A |
| No. 214 | Ex. | 3.65 | 98.8 | A | A | A | B | B | A | A | A | A |
| No. 215 | Comp. Ex. | 3.75 | 96.5 | A | B | B | C | C | C | C | C | C |
| No. 216 | Comp. Ex. | 4.25 | 96.7 | A | C | C | D | D | C | D | C | C |
| No. 217 | Comp. Ex. | 3.54 | 96.1 | A | E | E | E | E | D | D | C | D |
| No. 218 | Comp. Ex. | 5.21 | 94.5 | F | E | E | E | F | C | D | C | D |
| No. 219 | Comp. Ex. | 4.36 | 94.4 | A | E | E | E | F | C | D | C | D |
| No. 220 | Comp. Ex. | 3.88 | 96.3 | A | B | B | C | C | C | C | C | C |
| No. 221 | Comp. Ex. | 3.74 | 96.5 | A | C | C | D | D | C | C | C | C |

TABLE 28

| Sample No. | | Metal powder Average particle diameter μm | Evaluation results of sintered body | | | | | | | | | |
|---|---|---|---|---|---|---|---|---|---|---|---|---|
| | | | Relative density % | Vickers hardness | Tensile strength | 0.2% proof stress | Elongation | Fatigue strength | Corrosion resistance 24 h | Corrosion resistance 48 h | Wear resistance | Dimensional accuracy |
| No. 222 | Ex. | 4.51 | 98.6 | A | A | A | B | A | A | A | A | A |
| No. 223 | Ex. | 8.63 | 98.5 | A | A | A | B | B | A | A | A | A |
| No. 224 | Ex. | 3.21 | 98.6 | A | A | A | B | B | A | A | A | A |
| No. 225 | Ex. | 2.59 | 98.4 | A | A | A | B | A | A | A | A | A |
| No. 226 | Ex. | 3.85 | 98.6 | A | A | A | B | B | A | A | A | A |
| No. 227 | Ex. | 3.58 | 98.7 | A | A | A | B | B | A | A | A | A |
| No. 228 | Comp. Ex. | 3.78 | 96.4 | B | C | C | C | C | C | D | C | C |
| No. 229 | Comp. Ex. | 4.29 | 96.6 | B | C | C | D | D | C | D | C | C |
| No. 230 | Comp. Ex. | 3.65 | 96.0 | B | E | E | E | E | D | E | D | E |
| No. 231 | Comp. Ex. | 5.55 | 94.4 | F | E | E | E | F | C | D | C | D |
| No. 232 | Comp. Ex. | 4.45 | 94.3 | B | E | E | E | F | C | D | C | D |
| No. 233 | Comp. Ex. | 3.89 | 96.2 | B | C | C | C | C | C | D | C | C |
| No. 234 | Comp. Ex. | 3.54 | 96.4 | B | C | C | D | D | C | D | C | C |

As apparent from Tables 27 and 28, it was confirmed that the sintered bodies corresponding to Example each have a higher relative density than the sintered bodies corresponding to Comparative Example. It was also confirmed that there is a significant difference in properties such as tensile strength, 0.2% proof stress, and elongation between them. Further, it was also confirmed that there is a significant difference in corrosion resistance, wear resistance, and dimensional accuracy between them. Therefore, it was revealed that according to the invention, a gear having sufficient mechanical properties and also having high dimensional accuracy is obtained even when a heat treatment at a relatively low temperature, or a heat treatment even at a high temperature for a short period of time is performed.

13. Production of Sintered Body (Ti—Zr Based)

Sample Nos. 235 to 260

Sintered bodies were obtained in the same manner as the method for producing the sintered body of sample No. 1 except that the composition and the like of the metal powder for powder metallurgy were changed as shown in Tables 29 and 30, respectively. Incidentally, the compositional ratio of the metal powder shown in Table 30 is a Ti—Zr-based metal powder in the same manner as in Table 29, however, the compositional ratio of elements other than Ti and Zr is different.

TABLE 29

Metal powder for powder metallurgy

| Sample No. | | Cr | Ni | Si | C | E1 (Ti) | E2 (Zr) | Al | Cu | O | Fe | E1/E2 | E1 + E2 | (E1 + E2)/Si | (E1 + E2)/C | Remarks |
|---|---|---|---|---|---|---|---|---|---|---|---|---|---|---|---|---|
| | | | | | | mass % | | | | | | | mass % | | | |
| No. 235 | Ex. | 16.47 | 4.13 | 0.74 | 0.019 | 0.08 | 0.13 | 0.00 | 3.84 | 0.32 | Remainder | 0.62 | 0.21 | 0.28 | 11.05 | |
| No. 236 | Ex. | 17.28 | 3.51 | 0.60 | 0.015 | 0.06 | 0.10 | 0.00 | 4.39 | 0.28 | Remainder | 0.60 | 0.16 | 0.27 | 10.67 | |
| No. 237 | Ex. | 15.71 | 4.60 | 0.84 | 0.031 | 0.13 | 0.23 | 0.00 | 3.42 | 0.39 | Remainder | 0.57 | 0.36 | 0.43 | 11.61 | |
| No. 238 | Ex. | 13.81 | 6.72 | 0.73 | 0.023 | 0.23 | 0.07 | 0.00 | 0.08 | 0.25 | Remainder | 3.29 | 0.30 | 0.41 | 13.04 | |
| No. 239 | Ex. | 14.56 | 7.23 | 0.64 | 0.027 | 0.45 | 0.09 | 0.00 | 0.53 | 0.32 | Remainder | 5.00 | 0.54 | 0.84 | 20.00 | |
| No. 240 | Ex. | 15.38 | 7.57 | 0.87 | 0.031 | 0.59 | 0.13 | 0.00 | 0.88 | 0.43 | Remainder | 4.54 | 0.72 | 0.83 | 23.23 | |
| No. 241 | Comp. Ex. | 16.43 | 4.06 | 0.73 | 0.019 | 0.00 | 0.08 | 0.00 | 3.93 | 0.27 | Remainder | 0.00 | 0.08 | 0.11 | 4.21 | |
| No. 242 | Comp. Ex. | 17.25 | 3.47 | 0.63 | 0.024 | 0.25 | 0.00 | 0.00 | 4.28 | 0.33 | Remainder | — | 0.25 | 0.40 | 10.42 | |
| No. 243 | Comp. Ex. | 15.72 | 4.37 | 0.78 | 0.031 | 0.00 | 0.00 | 0.00 | 3.46 | 0.42 | Remainder | — | 0.00 | 0.00 | 0.00 | |
| No. 244 | Comp. Ex. | 16.33 | 3.83 | 0.88 | 0.018 | 0.84 | 0.13 | 0.00 | 4.12 | 0.34 | Remainder | 6.46 | 0.97 | 1.10 | 53.89 | |
| No. 245 | Comp. Ex. | 17.08 | 4.21 | 0.65 | 0.027 | 0.25 | 0.81 | 0.00 | 3.83 | 0.42 | Remainder | 0.31 | 1.06 | 1.63 | 39.26 | |
| No. 246 | Comp. Ex. | 13.88 | 6.97 | 0.67 | 0.026 | 0.49 | 0.00 | 0.00 | 0.49 | 0.31 | Remainder | — | 0.49 | 0.73 | 18.85 | |
| No. 247 | Comp. Ex. | 15.24 | 7.39 | 0.82 | 0.034 | 0.00 | 0.00 | 0.00 | 0.51 | 0.42 | Remainder | — | 0.00 | 0.00 | 0.00 | |

TABLE 30

Metal powder for powder metallurgy

| Sample No. | | Cr | Ni | Si | C | E1 (Ti) | E2 (Zr) | Co | Mo | O | Fe | E1/E2 | E1 + E2 | (E1 + E2)/Si | (E1 + E2)/C | Remarks |
|---|---|---|---|---|---|---|---|---|---|---|---|---|---|---|---|---|
| | | | | | | mass % | | | | | | | mass % | | | |
| No. 248 | Ex. | 0.00 | 18.02 | 0.61 | 0.018 | 0.06 | 0.11 | 8.09 | 4.78 | 0.15 | Remainder | 0.55 | 0.17 | 0.28 | 9.44 | |
| No. 249 | Ex. | 0.00 | 18.92 | 0.48 | 0.028 | 0.03 | 0.11 | 7.55 | 5.06 | 0.31 | Remainder | 0.27 | 0.14 | 0.29 | 5.00 | |
| No. 250 | Ex. | 0.00 | 17.58 | 0.88 | 0.041 | 0.13 | 0.11 | 8.61 | 3.84 | 0.07 | Remainder | 1.18 | 0.24 | 0.27 | 5.85 | |
| No. 251 | Ex. | 10.45 | 6.61 | 3.85 | 0.013 | 0.05 | 0.09 | 10.25 | 1.11 | 0.39 | Remainder | 0.59 | 0.14 | 0.04 | 10.38 | Cu: 0.95 Mn: 1.15 |
| No. 252 | Ex. | 9.89 | 5.74 | 4.29 | 0.024 | 0.07 | 0.21 | 9.89 | 0.43 | 0.37 | Remainder | 0.33 | 0.28 | 0.07 | 11.67 | Cu: 1.34 Mn: 0.65 |
| No. 253 | Ex. | 11.42 | 7.21 | 3.06 | 0.032 | 0.12 | 0.08 | 11.12 | 1.58 | 0.45 | Remainder | 1.50 | 0.20 | 0.07 | 6.25 | Cu: 0.81 Mn: 1.31 |
| No. 254 | Comp. Ex. | 0.00 | 18.02 | 0.63 | 0.012 | 0.00 | 0.07 | 8.01 | 4.56 | 0.28 | Remainder | 0.00 | 0.07 | 0.11 | 5.83 | |
| No. 255 | Comp. Ex. | 0.00 | 19.02 | 0.54 | 0.023 | 0.07 | 0.00 | 7.29 | 5.06 | 0.34 | Remainder | — | 0.07 | 0.13 | 3.04 | |
| No. 256 | Comp. Ex. | 0.00 | 17.48 | 0.87 | 0.032 | 0.00 | 0.00 | 8.25 | 3.75 | 0.49 | Remainder | — | 0.00 | 0.00 | 0.00 | |
| No. 257 | Comp. Ex. | 0.00 | 18.15 | 0.74 | 0.014 | 0.75 | 0.06 | 8.09 | 4.81 | 0.32 | Remainder | 12.50 | 0.81 | 1.09 | 57.86 | |
| No. 258 | Comp. Ex. | 0.00 | 18.36 | 0.83 | 0.025 | 0.07 | 0.75 | 8.05 | 4.92 | 0.43 | Remainder | 0.09 | 0.82 | 0.99 | 32.80 | |
| No. 259 | Comp. Ex. | 10.42 | 6.63 | 3.88 | 0.014 | 0.00 | 0.09 | 10.56 | 1.45 | 0.48 | Remainder | — | 0.09 | 0.02 | 6.43 | Cu: 0.96 Mn: 1.09 |
| No. 260 | Comp. Ex. | 10.02 | 6.04 | 4.25 | 0.024 | 0.15 | 0.00 | 10.23 | 0.31 | 0.24 | Remainder | — | 0.15 | 0.04 | 6.25 | Cu: 1.32 Mn: 0.67 |

In Tables 29 and 30, among the sintered bodies of the respective sample Nos., those corresponding to the invention are denoted by "Ex." (Example), and those not corresponding to the invention are denoted by "Comp. Ex." (Comparative Example).

Each sintered body contained very small amounts of impurities, but the description thereof in Tables 29 and 30 is omitted.

14. Evaluation of Sintered Body (Ti—Zr Based)

14.1 Evaluation of Relative Density

With respect to the sintered bodies of the respective sample Nos. shown in Tables 29 and 30, the sintered density was measured in accordance with the method for measuring the density of sintered metal materials specified in JIS Z 2501 (2000), and also the relative density of each sintered body was calculated with reference to the true density of the metal powder for powder metallurgy used for producing each sintered body.

The calculation results are shown in Tables 31 and 32.

14.2 Evaluation of Hardness

With respect to the sintered bodies of the respective sample Nos. shown in Tables 29 and 30, the Vickers hardness was measured in accordance with the Vickers hardness test method specified in JIS Z 2244 (2009).

Then, the measured hardness was evaluated according to the evaluation criteria described in 2.2.

The evaluation results are shown in Tables 31 and 32.

14.3 Evaluation of Tensile Strength, 0.2% Proof Stress, and Elongation

With respect to the sintered bodies of the respective sample Nos. shown in Tables 29 and 30, the tensile strength, 0.2% proof stress, and elongation were measured in accordance with the metal material tensile test method specified in JIS Z 2241 (2011).

Then, the measured physical property values were evaluated according to the evaluation criteria described in 2.3.

The evaluation results are shown in Tables 31 and 32.

14.4 Evaluation of Fatigue Strength

With respect to the sintered bodies of the respective sample Nos. shown in Tables 29 and 30, the fatigue strength was measured in the same manner as in 2.4.

Then, the measured fatigue strength was evaluated according to the evaluation criteria described in 2.4.

The evaluation results are shown in Tables 31 and 32.

14.5 Evaluation of Corrosion Resistance

With respect to the sintered bodies of the respective sample Nos. shown in Tables 29 and 30, the corrosion resistance was measured in the same manner as in 2.5.

Then, the measured corrosion resistance was evaluated according to the evaluation criteria described in 2.5.

The evaluation results are shown in Tables 31 and 32.

14.6 Evaluation of Wear Resistance

With respect to the sintered bodies of the respective sample Nos. shown in Tables 29 and 30, the wear resistance was measured in the same manner as in 2.6.

Then, the measured wear resistance was evaluated according to the evaluation criteria described in 2.6.

The evaluation results are shown in Tables 31 and 32.

14.7 Evaluation of Dimensional Accuracy

With respect to the sintered bodies of the respective sample Nos. shown in Tables 29 and 30, the dimensional accuracy was measured in the same manner as in 2.7.

Then, the measured dimensional accuracy was evaluated according to the evaluation criteria described in 2.7.

The evaluation results are shown in Tables 31 and 32.

TABLE 31

| Sample No. | | Metal powder Average particle diameter μm | Evaluation results of sintered body | | | | | | | | |
|---|---|---|---|---|---|---|---|---|---|---|---|
| | | | Relative density % | Vickers hardness — | Tensile strength — | 0.2% proof stress — | Elongation — | Fatigue strength — | Corrosion resistance | | Wear resistance — | Dimensional accuracy — |
| | | | | | | | | | 24 h — | 48 h — | | |
| No. 235 | Ex. | 4.36 | 98.5 | A | A | A | B | B | A | A | A | A |
| No. 236 | Ex. | 8.54 | 98.6 | A | A | A | B | B | A | A | A | A |
| No. 237 | Ex. | 3.35 | 98.5 | A | A | A | B | B | A | A | A | A |
| No. 238 | Ex. | 2.11 | 98.7 | A | A | A | B | B | A | A | A | A |
| No. 239 | Ex. | 11.56 | 98.5 | A | A | A | B | B | A | A | A | A |
| No. 240 | Ex. | 12.54 | 98.4 | A | A | A | B | B | A | A | A | A |
| No. 241 | Comp. Ex. | 3.89 | 96.5 | A | B | B | C | D | C | D | C | D |
| No. 242 | Comp. Ex. | 4.29 | 96.7 | A | B | B | C | D | C | C | C | D |
| No. 243 | Comp. Ex. | 3.21 | 96.0 | A | E | E | E | E | D | E | D | E |
| No. 244 | Comp. Ex. | 5.87 | 94.5 | A | D | D | D | D | C | D | C | D |
| No. 245 | Comp. Ex. | 6.45 | 94.3 | A | F | F | F | F | C | D | C | D |
| No. 246 | Comp. Ex. | 3.77 | 96.1 | A | B | B | C | D | C | C | C | C |
| No. 247 | Comp. Ex. | 3.98 | 95.3 | A | D | D | D | E | C | C | C | C |

TABLE 32

| Sample No. | | Metal powder Average particle diameter μm | Evaluation results of sintered body | | | | | | | | |
|---|---|---|---|---|---|---|---|---|---|---|---|
| | | | Relative density % | Vickers hardness — | Tensile strength — | 0.2% proof stress — | Elongation — | Fatigue strength — | Corrosion resistance | | Wear resistance — | Dimensional accuracy — |
| | | | | | | | | | 24 h — | 48 h — | | |
| No. 248 | Ex. | 4.25 | 98.7 | A | A | A | B | A | A | A | A | A |
| No. 249 | Ex. | 8.52 | 98.5 | A | A | A | B | B | A | A | A | A |
| No. 250 | Ex. | 3.12 | 98.4 | A | A | A | B | B | A | A | A | A |
| No. 251 | Ex. | 2.06 | 98.6 | A | A | A | B | A | A | A | A | A |
| No. 252 | Ex. | 11.25 | 98.4 | A | A | A | B | B | A | A | A | A |
| No. 253 | Ex. | 12.69 | 98.3 | A | A | A | B | B | A | A | A | A |
| No. 254 | Comp. Ex. | 3.56 | 96.1 | B | C | C | C | D | C | D | C | D |
| No. 255 | Comp. Ex. | 4.25 | 96.2 | B | C | C | C | D | C | D | C | D |
| No. 256 | Comp. Ex. | 3.05 | 95.8 | B | E | E | E | E | D | E | D | E |
| No. 257 | Comp. Ex. | 5.69 | 94.1 | B | D | D | D | D | C | D | C | D |
| No. 258 | Comp. Ex. | 6.52 | 93.8 | B | F | F | F | F | C | D | C | D |
| No. 259 | Comp. Ex. | 3.87 | 95.7 | B | C | C | C | D | C | C | C | C |
| No. 260 | Comp. Ex. | 4.05 | 95.1 | B | D | D | D | E | C | C | C | C |

As apparent from Tables 31 and 32, it was confirmed that the sintered bodies corresponding to Example each have a higher relative density than the sintered bodies corresponding to Comparative Example. It was also confirmed that there is a significant difference in properties such as tensile strength, 0.2% proof stress, and elongation between them. Further, it was also confirmed that there is a significant difference in corrosion resistance, wear resistance, and dimensional accuracy between them. Therefore, it was revealed that according to the invention, a gear having sufficient mechanical properties and also having high dimensional accuracy is obtained even when a heat treatment at a relatively low temperature, or a heat treatment even at a high temperature for a short period of time is performed.

15. Production of Sintered Body (Zr—Ta Based)

Sample Nos. 261 to 282

Sintered bodies were obtained in the same manner as the method for producing the sintered body of sample No. 1 except that the composition and the like of the metal powder for powder metallurgy were changed as shown in Tables 33 and 34, respectively. Incidentally, the compositional ratio of the metal powder shown in Table 34 is a Zr—Ta-based metal powder in the same manner as in Table 33, however, the compositional ratio of elements other than Zr and Ta is different.

TABLE 33

| | | Metal powder for powder metallurgy | | | | | | | | | | | | | |
|---|---|---|---|---|---|---|---|---|---|---|---|---|---|---|---|
| | | Alloy composition | | | | | | | | | | | | | |
| Sample No. | | Cr | Ni | Si | C | E1 (Zr) | E2 (Ta) | Al | Cu | O | Fe | E1/E2 | E1 + E2 | (E1 + E2)/Si | (E1 + E2)/C | Remarks |
| | | | | | | mass % | | | | | | — | mass % | — | — | — |
| No. 261 | Ex. | 16.44 | 4.21 | 0.74 | 0.019 | 0.08 | 0.13 | 0.00 | 3.92 | 0.29 | Remainder | 0.62 | 0.21 | 0.28 | 11.05 | |
| No. 262 | Ex. | 17.21 | 3.48 | 0.62 | 0.015 | 0.07 | 0.11 | 0.00 | 4.39 | 0.32 | Remainder | 0.64 | 0.18 | 0.29 | 12.00 | |
| No. 263 | Ex. | 15.82 | 4.52 | 0.82 | 0.029 | 0.06 | 0.14 | 0.00 | 3.32 | 0.41 | Remainder | 0.43 | 0.20 | 0.24 | 6.90 | |
| No. 264 | Ex. | 17.73 | 7.42 | 0.76 | 0.043 | 0.04 | 0.15 | 0.79 | 0.00 | 0.46 | Remainder | 0.27 | 0.19 | 0.25 | 4.42 | |
| No. 265 | Ex. | 17.13 | 6.82 | 0.83 | 0.025 | 0.08 | 0.08 | 1.28 | 0.00 | 0.48 | Remainder | 1.00 | 0.16 | 0.19 | 6.40 | |
| No. 266 | Ex. | 16.88 | 8.21 | 0.65 | 0.032 | 0.05 | 0.06 | 1.04 | 0.00 | 0.41 | Remainder | 0.83 | 0.11 | 0.17 | 3.44 | |
| No. 267 | Comp. Ex. | 16.41 | 4.02 | 0.71 | 0.018 | 0.00 | 0.07 | 0.00 | 3.86 | 0.23 | Remainder | 0.00 | 0.07 | 0.10 | 3.89 | |
| No. 268 | Comp. Ex. | 17.16 | 3.52 | 0.65 | 0.022 | 0.08 | 0.00 | 0.00 | 4.26 | 0.28 | Remainder | — | 0.08 | 0.12 | 3.64 | |
| No. 269 | Comp. Ex. | 15.78 | 4.35 | 0.80 | 0.029 | 0.00 | 0.00 | 0.00 | 3.41 | 0.39 | Remainder | — | 0.00 | 0.00 | 0.00 | |
| No. 270 | Comp. Ex. | 16.31 | 3.81 | 0.85 | 0.019 | 0.79 | 0.08 | 0.00 | 4.10 | 0.32 | Remainder | 9.88 | 0.87 | 1.02 | 45.79 | |
| No. 271 | Comp. Ex. | 17.04 | 4.19 | 0.62 | 0.029 | 0.06 | 0.85 | 0.00 | 3.81 | 0.34 | Remainder | 0.07 | 0.91 | 1.47 | 31.38 | |

TABLE 34

| | | Metal powder for powder metallurgy | | | | | | | | | | | | | |
|---|---|---|---|---|---|---|---|---|---|---|---|---|---|---|---|
| | | Alloy composition | | | | | | | | | | | | | |
| Sample No. | | Cr | Ni | Si | C | E1 (Zr) | E2 (Ta) | Co | Mo | O | Fe | E1/E2 | E1 + E2 | (E1 + E2)/Si | (E1 + E2)/C | Remarks |
| | | | | | | mass % | | | | | | — | mass % | — | — | — |
| No. 272 | Ex. | 0.00 | 18.08 | 0.63 | 0.015 | 0.05 | 0.10 | 8.14 | 4.65 | 0.16 | Remainder | 0.50 | 0.15 | 0.24 | 10.00 | |
| No. 273 | Ex. | 0.00 | 18.95 | 0.51 | 0.031 | 0.04 | 0.11 | 7.68 | 5.11 | 0.34 | Remainder | 0.36 | 0.15 | 0.29 | 4.84 | |
| No. 274 | Ex. | 0.00 | 17.54 | 0.87 | 0.036 | 0.12 | 0.10 | 8.72 | 3.95 | 0.08 | Remainder | 1.20 | 0.22 | 0.25 | 6.11 | |
| No. 275 | Ex. | 10.61 | 6.74 | 3.81 | 0.014 | 0.06 | 0.06 | 10.02 | 1.08 | 0.37 | Remainder | 1.00 | 0.12 | 0.03 | 8.57 | Cu: 0.98 Mn: 1.05 |
| No. 276 | Ex. | 10.02 | 5.68 | 4.11 | 0.025 | 0.08 | 0.21 | 9.95 | 0.45 | 0.32 | Remainder | 0.38 | 0.29 | 0.07 | 11.60 | Cu: 1.22 Mn: 0.71 |
| No. 277 | Ex. | 11.45 | 7.25 | 3.08 | 0.033 | 0.11 | 0.08 | 11.08 | 1.54 | 0.46 | Remainder | 1.38 | 0.19 | 0.06 | 5.76 | Cu: 0.84 Mn: 1.29 |
| No. 278 | Comp. Ex. | 0.00 | 18.11 | 0.61 | 0.015 | 0.00 | 0.08 | 8.14 | 4.63 | 0.29 | Remainder | 0.00 | 0.08 | 0.13 | 5.33 | |
| No. 279 | Comp. Ex. | 0.00 | 18.88 | 0.53 | 0.025 | 0.08 | 0.00 | 7.00 | 5.14 | 0.36 | Remainder | — | 0.08 | 0.15 | 3.20 | |
| No. 280 | Comp. Ex. | 0.00 | 17.52 | 0.88 | 0.028 | 0.00 | 0.00 | 8.21 | 3.84 | 0.51 | Remainder | — | 0.00 | 0.00 | 0.00 | |
| No. 281 | Comp. Ex. | 0.00 | 18.17 | 0.76 | 0.016 | 0.76 | 0.08 | 8.11 | 4.83 | 0.36 | Remainder | 9.50 | 0.84 | 1.11 | 52.50 | |
| No. 282 | Comp. Ex. | 0.00 | 18.41 | 0.81 | 0.024 | 0.06 | 0.72 | 8.04 | 4.96 | 0.45 | Remainder | 0.08 | 0.78 | 0.96 | 32.50 | |

In Tables 33 and 34, among the sintered bodies of the respective sample Nos., those corresponding to the invention are denoted by "Ex." (Example), and those not corresponding to the invention are denoted by "Comp. Ex." (Comparative Example).

Each sintered body contained very small amounts of impurities, but the description thereof in Tables 33 and 34 is omitted.

16. Evaluation of Sintered Body (Zr—Ta Based)
16.1 Evaluation of Relative Density With respect to the sintered bodies of the respective sample Nos. shown in Tables 33 and 34, the sintered density was measured in accordance with the method for measuring the density of sintered metal materials specified in JIS Z 2501 (2000), and also the relative density of each sintered body was calculated with reference to the true density of the metal powder for powder metallurgy used for producing each sintered body.

The calculation results are shown in Tables 35 and 36.
16.2 Evaluation of Hardness With respect to the sintered bodies of the respective sample Nos. shown in Tables 33 and 34, the Vickers hardness was measured in accordance with the Vickers hardness test method specified in JIS Z 2244 (2009).

Then, the measured hardness was evaluated according to the evaluation criteria described in 2.2.

The evaluation results are shown in Tables 35 and 36.
16.3 Evaluation of Tensile Strength, 0.2% Proof Stress, and Elongation With respect to the sintered bodies of the respective sample Nos. shown in Tables 33 and 34, the tensile strength, 0.2% proof stress, and elongation were measured in accordance with the metal material tensile test method specified in JIS Z 2241 (2011).

Then, the measured physical property values were evaluated according to the evaluation criteria described in 2.3.

The evaluation results are shown in Tables 35 and 36.
16.4 Evaluation of Fatigue Strength With respect to the sintered bodies of the respective sample Nos. shown in Tables 33 and 34, the fatigue strength was measured in the same manner as in 2.4.

Then, the measured fatigue strength was evaluated according to the evaluation criteria described in 2.4.

The evaluation results are shown in Tables 35 and 36.
16.5 Evaluation of Corrosion Resistance With respect to the sintered bodies of the respective sample Nos. shown in Tables 33 and 34, the corrosion resistance was measured in the same manner as in 2.5.

Then, the measured corrosion resistance was evaluated according to the evaluation criteria described in 2.5.

The evaluation results are shown in Tables 35 and 36.
16.6 Evaluation of Wear Resistance With respect to the sintered bodies of the respective sample Nos. shown in Tables 33 and 34, the wear resistance was measured in the same manner as in 2.6.

Then, the measured wear resistance was evaluated according to the evaluation criteria described in 2.6.

The evaluation results are shown in Tables 35 and 36.
16.7 Evaluation of Dimensional Accuracy With respect to the sintered bodies of the respective sample Nos. shown in Tables 33 and 34, the dimensional accuracy was measured in the same manner as in 2.7.

Then, the measured dimensional accuracy was evaluated according to the evaluation criteria described in 2.7.

The evaluation results are shown in Tables 35 and 36.

TABLE 35

| Sample No. | | Metal powder Average particle diameter μm | Evaluation results of sintered body | | | | | | | | | |
|---|---|---|---|---|---|---|---|---|---|---|---|---|
| | | | Relative density % | Vickers hardness | Tensile strength | 0.2% proof stress | Elongation | Fatigue strength | Corrosion resistance | | Wear resistance | Dimensional accuracy |
| | | | | | | | | | 24 h | 48 h | | |
| No. 261 | Ex. | 4.39 | 99.2 | A | A | A | A | B | A | A | A | A |
| No. 262 | Ex. | 9.54 | 99.1 | A | A | A | A | B | A | A | A | A |
| No. 263 | Ex. | 2.56 | 99.3 | A | A | A | A | A | A | A | A | A |
| No. 264 | Ex. | 3.98 | 99.3 | A | A | A | A | A | A | A | A | A |
| No. 265 | Ex. | 4.58 | 99.1 | A | A | A | A | B | A | A | A | A |
| No. 266 | Ex. | 5.24 | 99.0 | A | A | A | B | B | A | A | A | A |
| No. 267 | Comp. Ex. | 3.88 | 96.5 | A | B | B | D | D | C | D | C | D |
| No. 268 | Comp. Ex. | 4.21 | 96.9 | A | B | B | D | D | C | C | C | D |
| No. 269 | Comp. Ex. | 3.56 | 96.0 | A | E | E | C | E | D | E | D | E |
| No. 270 | Comp. Ex. | 4.97 | 94.6 | A | D | D | D | D | C | D | C | D |
| No. 271 | Comp. Ex. | 5.21 | 94.3 | A | E | E | E | E | C | D | C | D |

TABLE 36

| Sample No. | | Metal powder Average particle diameter μm | Evaluation results of sintered body | | | | | | | | | |
|---|---|---|---|---|---|---|---|---|---|---|---|---|
| | | | Relative density % | Vickers hardness | Tensile strength | 0.2% proof stress | Elongation | Fatigue strength | Corrosion resistance | | Wear resistance | Dimensional accuracy |
| | | | | | | | | | 24 h | 48 h | | |
| No. 272 | Ex. | 4.22 | 99.2 | A | A | A | A | A | A | A | A | A |
| No. 273 | Ex. | 9.21 | 99.1 | A | A | A | B | B | A | A | A | A |
| No. 274 | Ex. | 2.41 | 99.1 | A | A | A | B | A | A | A | A | A |

TABLE 36-continued

| | | Evaluation results of sintered body | | | | | | | | | |
|---|---|---|---|---|---|---|---|---|---|---|---|
| | Metal powder Average particle | Relative | Vickers | Tensile | 0.2% | | Fatigue | Corrosion resistance | | Wear | Dimensional |
| Sample No. | diameter μm | density % | hardness | strength | proof stress | Elongation | strength | 24 h | 48 h | resistance | accuracy |
| No. 275 Ex. | 3.89 | 99.3 | A | A | A | A | A | A | A | A | A |
| No. 276 Ex. | 4.56 | 99.0 | A | A | A | A | B | A | A | A | A |
| No. 277 Ex. | 5.36 | 99.0 | A | A | A | B | B | A | A | A | A |
| No. 278 Comp. Ex. | 3.81 | 96.4 | B | C | C | D | D | C | D | C | D |
| No. 279 Comp. Ex. | 4.08 | 96.6 | B | B | B | D | D | C | D | C | D |
| No. 280 Comp. Ex. | 2.98 | 95.9 | B | E | E | D | E | D | E | D | E |
| No. 281 Comp. Ex. | 4.58 | 94.5 | B | D | D | D | D | C | D | C | D |
| No. 282 Comp. Ex. | 5.23 | 94.2 | B | E | E | E | E | C | D | C | D |

As apparent from Tables 35 and 36, it was confirmed that the sintered bodies corresponding to Example each have a higher relative density than the sintered bodies corresponding to Comparative Example. It was also confirmed that there is a significant difference in properties such as tensile strength, 0.2% proof stress, and elongation between them. Further, it was also confirmed that there is a significant difference in corrosion resistance, wear resistance, and dimensional accuracy between them. Therefore, it was revealed that according to the invention, a gear having sufficient mechanical properties and also having high dimensional accuracy is obtained even when a heat treatment at a relatively low temperature, or a heat treatment even at a high temperature for a short period of time is performed.

17. Production of Sintered Body (Zr—V Based)

Sample Nos. 283 to 304

Sintered bodies were obtained in the same manner as the method for producing the sintered body of sample No. 1 except that the composition and the like of the metal powder for powder metallurgy were changed as shown in Tables 37 and 38, respectively. Incidentally, the compositional ratio of the metal powder shown in Table 38 is a Zr—V-based metal powder in the same manner as in Table 37, however, the compositional ratio of elements other than Zr and V is different.

TABLE 37

| | Metal powder for powder metallurgy | | | | | | | | | | | | | | |
|---|---|---|---|---|---|---|---|---|---|---|---|---|---|---|---|
| | Alloy composition | | | | | | | | | | | | | | |
| Sample No. | Cr | Ni | Si | C | E1 (Zr) | E2 (V) mass % | Al | Cu | O | Fe | E1/ E2 | E1 + E2 mass % | (E1 + E2)/ Si | (E1 + E2)/ C | Remarks |
| No. 283 Ex. | 16.42 | 4.23 | 0.76 | 0.022 | 0.13 | 0.08 | 0.00 | 3.89 | 0.27 | Remainder | 1.63 | 0.21 | 0.28 | 9.55 | |
| No. 284 Ex. | 17.25 | 3.45 | 0.61 | 0.018 | 0.11 | 0.06 | 0.00 | 4.37 | 0.29 | Remainder | 1.83 | 0.17 | 0.28 | 9.44 | |
| No. 285 Ex. | 15.76 | 4.49 | 0.81 | 0.031 | 0.08 | 0.08 | 0.00 | 3.27 | 0.42 | Remainder | 1.00 | 0.16 | 0.20 | 5.16 | |
| No. 286 Ex. | 17.75 | 7.38 | 0.74 | 0.041 | 0.15 | 0.05 | 0.77 | 0.00 | 0.43 | Remainder | 3.00 | 0.20 | 0.27 | 4.88 | |
| No. 287 Ex. | 17.11 | 6.79 | 0.84 | 0.026 | 0.07 | 0.08 | 1.29 | 0.00 | 0.51 | Remainder | 0.88 | 0.15 | 0.18 | 5.77 | |
| No. 288 Ex. | 16.85 | 8.12 | 0.66 | 0.029 | 0.05 | 0.04 | 1.02 | 0.00 | 0.39 | Remainder | 1.25 | 0.09 | 0.14 | 3.10 | |
| No. 289 Comp. Ex. | 16.38 | 4.08 | 0.74 | 0.019 | 0.00 | 0.08 | 0.00 | 3.88 | 0.29 | Remainder | 0.00 | 0.08 | 0.11 | 4.21 | |
| No. 290 Comp. Ex. | 17.18 | 3.55 | 0.66 | 0.023 | 0.09 | 0.00 | 0.00 | 4.19 | 0.28 | Remainder | — | 0.09 | 0.14 | 3.91 | |
| No. 291 Comp. Ex. | 15.74 | 4.32 | 0.81 | 0.031 | 0.00 | 0.00 | 0.00 | 3.38 | 0.38 | Remainder | — | 0.00 | 0.00 | 0.00 | |
| No. 292 Comp. Ex. | 16.32 | 3.79 | 0.84 | 0.017 | 0.81 | 0.08 | 0.00 | 4.07 | 0.30 | Remainder | 10.13 | 0.89 | 1.06 | 52.35 | |
| No. 293 Comp. Ex. | 17.08 | 4.25 | 0.65 | 0.027 | 0.05 | 0.83 | 0.00 | 3.84 | 0.32 | Remainder | 0.06 | 0.88 | 1.35 | 32.59 | |

TABLE 38

| | Metal powder for powder metallurgy | | | | | | | | | | | | | | |
|---|---|---|---|---|---|---|---|---|---|---|---|---|---|---|---|
| | Alloy composition | | | | | | | | | | | | | | |
| Sample No. | Cr | Ni | Si | C | E1 (Zr) | E2 (V) mass % | Co | Mo | O | Fe | E1/ E2 | E1 + E2 mass % | (E1 + E2)/ Si | (E1 + E2)/ C | Remarks |
| No. 294 Ex. | 0.00 | 18.04 | 0.61 | 0.018 | 0.08 | 0.05 | 8.08 | 4.77 | 0.18 | Remainder | 1.60 | 0.13 | 0.21 | 7.22 | |
| No. 295 Ex. | 0.00 | 18.99 | 0.48 | 0.032 | 0.07 | 0.11 | 7.69 | 5.16 | 0.35 | Remainder | 0.64 | 0.18 | 0.38 | 5.63 | |
| No. 296 Ex. | 0.00 | 17.58 | 0.90 | 0.038 | 0.16 | 0.07 | 8.81 | 3.97 | 0.07 | Remainder | 2.29 | 0.23 | 0.26 | 6.05 | |
| No. 297 Ex. | 10.58 | 6.67 | 3.85 | 0.016 | 0.09 | 0.05 | 10.11 | 1.06 | 0.35 | Remainder | 1.80 | 0.14 | 0.04 | 8.75 | Cu: 0.98 Mn: 1.05 |
| No. 298 Ex. | 10.04 | 5.71 | 4.08 | 0.026 | 0.09 | 0.11 | 10.02 | 0.48 | 0.35 | Remainder | 0.82 | 0.20 | 0.05 | 7.69 | Cu: 1.22 Mn: 0.71 |

TABLE 38-continued

Metal powder for powder metallurgy

| Sample No. | | Cr | Ni | Si | C | E1 (Zr) mass % | E2 (V) | Co | Mo | O | Fe | E1/ E2 | E1 + E2 mass % | (E1 + E2)/ Si | (E1 + E2)/ C | Remarks |
|---|---|---|---|---|---|---|---|---|---|---|---|---|---|---|---|---|
| No. 299 | Ex. | 11.41 | 7.21 | 3.06 | 0.031 | 0.08 | 0.08 | 11.05 | 1.51 | 0.42 | Remainder | 1.00 | 0.16 | 0.05 | 5.16 | Cu: 0.84 Mn: 1.29 |
| No. 300 | Comp. Ex. | 0.00 | 18.09 | 0.60 | 0.014 | 0.00 | 0.07 | 8.05 | 4.45 | 0.25 | Remainder | 0.00 | 0.07 | 0.12 | 5.00 | |
| No. 301 | Comp. Ex. | 0.00 | 18.78 | 0.56 | 0.024 | 0.07 | 0.00 | 7.15 | 5.36 | 0.35 | Remainder | — | 0.07 | 0.13 | 2.92 | |
| No. 302 | Comp. Ex. | 0.00 | 17.48 | 0.86 | 0.025 | 0.00 | 0.00 | 8.15 | 3.95 | 0.48 | Remainder | — | 0.00 | 0.00 | 0.00 | |
| No. 303 | Comp. Ex. | 0.00 | 18.16 | 0.72 | 0.015 | 0.78 | 0.07 | 8.05 | 4.91 | 0.38 | Remainder | 11.14 | 0.85 | 1.18 | 56.67 | |
| No. 304 | Comp. Ex. | 0.00 | 18.52 | 0.83 | 0.025 | 0.07 | 0.73 | 8.11 | 5.02 | 0.49 | Remainder | 0.10 | 0.80 | 0.96 | 32.00 | |

In Tables 37 and 38, among the sintered bodies of the respective sample Nos., those corresponding to the invention are denoted by "Ex." (Example), and those not corresponding to the invention are denoted by "Comp. Ex." (Comparative Example).

Each sintered body contained very small amounts of impurities, but the description thereof in Tables 37 and 38 is omitted.

18. Evaluation of Sintered Body (Zr—V Based)

18.1 Evaluation of Relative Density

With respect to the sintered bodies of the respective sample Nos. shown in Tables 37 and 38, the sintered density was measured in accordance with the method for measuring the density of sintered metal materials specified in JIS Z 2501 (2000), and also the relative density of each sintered body was calculated with reference to the true density of the metal powder for powder metallurgy used for producing each sintered body.

The calculation results are shown in Tables 39 and 40.

18.2 Evaluation of Hardness

With respect to the sintered bodies of the respective sample Nos. shown in Tables 37 and 38, the Vickers hardness was measured in accordance with the Vickers hardness test method specified in JIS Z 2244 (2009).

Then, the measured hardness was evaluated according to the evaluation criteria described in 2.2.

The evaluation results are shown in Tables 39 and 40.

18.3 Evaluation of Tensile Strength, 0.2% Proof Stress, and Elongation

With respect to the sintered bodies of the respective sample Nos. shown in Tables 37 and 38, the tensile strength, 0.2% proof stress, and elongation were measured in accordance with the metal material tensile test method specified in JIS Z 2241 (2011).

Then, the measured physical property values were evaluated according to the evaluation criteria described in 2.3.

The evaluation results are shown in Tables 39 and 40.

18.4 Evaluation of Fatigue Strength

With respect to the sintered bodies of the respective sample Nos. shown in Tables 37 and 38, the fatigue strength was measured in the same manner as in 2.4.

Then, the measured fatigue strength was evaluated according to the evaluation criteria described in 2.4.

The evaluation results are shown in Tables 39 and 40.

18.5 Evaluation of Corrosion Resistance

With respect to the sintered bodies of the respective sample Nos. shown in Tables 37 and 38, the corrosion resistance was measured in the same manner as in 2.5.

Then, the measured corrosion resistance was evaluated according to the evaluation criteria described in 2.5.

The evaluation results are shown in Tables 39 and 40.

18.6 Evaluation of Wear Resistance

With respect to the sintered bodies of the respective sample Nos. shown in Tables 37 and 38, the wear resistance was measured in the same manner as in 2.6.

Then, the measured wear resistance was evaluated according to the evaluation criteria described in 2.6.

The evaluation results are shown in Tables 39 and 40.

18.7 Evaluation of Dimensional Accuracy

With respect to the sintered bodies of the respective sample Nos. shown in Tables 37 and 38, the dimensional accuracy was measured in the same manner as in 2.7.

Then, the measured dimensional accuracy was evaluated according to the evaluation criteria described in 2.7.

The evaluation results are shown in Tables 39 and 40.

TABLE 39

| | | Evaluation results of sintered body | | | | | | | | | |
|---|---|---|---|---|---|---|---|---|---|---|---|
| Sample No. | | Metal powder Average particle diameter μm | Relative density % | Vickers hardness | Tensile strength | 0.2% proof stress | Elongation | Fatigue strength | Corrosion resistance 24 h | Corrosion resistance 48 h | Wear resistance | Dimensional accuracy |
| No. 283 | Ex. | 4.15 | 99.2 | A | A | A | A | A | A | A | A | A |
| No. 284 | Ex. | 3.89 | 99.0 | A | A | A | A | A | A | A | A | A |
| No. 285 | Ex. | 9.65 | 99.1 | A | A | A | A | A | A | A | A | A |
| No. 286 | Ex. | 2.03 | 99.0 | A | A | A | A | A | A | A | A | A |
| No. 287 | Ex. | 3.88 | 98.9 | A | A | A | A | B | A | A | A | A |
| No. 288 | Ex. | 5.47 | 98.8 | A | A | A | A | B | A | A | A | A |
| No. 289 | Comp. Ex. | 3.98 | 96.4 | A | B | B | C | D | C | D | C | D |
| No. 290 | Comp. Ex. | 4.56 | 96.8 | A | B | B | C | D | C | C | C | D |
| No. 291 | Comp. Ex. | 5.21 | 96.2 | A | E | E | E | E | D | E | D | E |

TABLE 39-continued

| | | Evaluation results of sintered body | | | | | | | | | |
|---|---|---|---|---|---|---|---|---|---|---|---|
| | Metal powder | | | | | | | Corrosion resistance | | | |
| Sample No. | Average particle diameter μm | Relative density % | Vickers hardness | Tensile strength | 0.2% proof stress | Elongation | Fatigue strength | 24 h | 48 h | Wear resistance | Dimensional accuracy |
| No. 292 Comp. Ex. | 3.54 | 94.7 | A | D | D | D | E | C | D | C | D |
| No. 293 Comp. Ex. | 3.25 | 94.6 | A | E | E | E | E | C | D | C | D |

TABLE 40

| | | Evaluation results of sintered body | | | | | | | | | |
|---|---|---|---|---|---|---|---|---|---|---|---|
| | Metal powder | | | | | | | Corrosion resistance | | | |
| Sample No. | Average particle diameter μm | Relative density % | Vickers hardness | Tensile strength | 0.2% proof stress | Elongation | Fatigue strength | 24 h | 48 h | Wear resistance | Dimensional accuracy |
| No. 294 Ex. | 4.08 | 99.3 | A | A | A | A | A | A | A | A | A |
| No. 295 Ex. | 3.92 | 99.0 | A | A | A | B | A | A | A | A | A |
| No. 296 Ex. | 9.54 | 99.1 | A | A | A | A | A | A | A | A | A |
| No. 297 Ex. | 2.15 | 99.0 | A | A | A | A | A | A | A | A | A |
| No. 298 Ex. | 3.81 | 98.7 | A | A | A | A | B | A | A | A | A |
| No. 299 Ex. | 5.63 | 98.9 | A | A | A | A | B | A | A | A | A |
| No. 300 Comp. Ex. | 3.87 | 96.3 | B | C | C | C | D | C | D | C | D |
| No. 301 Comp. Ex. | 4.25 | 96.7 | B | B | B | C | D | C | D | C | D |
| No. 302 Comp. Ex. | 5.36 | 96.3 | B | E | E | E | E | D | E | D | E |
| No. 303 Comp. Ex. | 3.24 | 94.6 | B | D | D | D | E | C | D | C | D |
| No. 304 Comp. Ex. | 3.05 | 94.5 | B | E | E | E | E | C | D | C | D |

As apparent from Tables 39 and 40, it was confirmed that the sintered bodies corresponding to Example each have a higher relative density than the sintered bodies corresponding to Comparative Example. It was also confirmed that there is a significant difference in properties such as tensile strength, 0.2% proof stress, and elongation between them. Further, it was also confirmed that there is a significant difference in corrosion resistance, wear resistance, and dimensional accuracy between them. Therefore, it was revealed that according to the invention, a gear having sufficient mechanical properties and also having high dimensional accuracy is obtained even when a heat treatment at a relatively low temperature, or a heat treatment even at a high temperature for a short period of time is performed.

19. Evaluation of Specularity of Sintered Body
19.1 Evaluation of Porosity Near Surface and Inside First, each of the sintered bodies of the respective sample Nos. shown in Table 41 was cut and the cross section was polished.

Subsequently, a porosity A1 near the surface of the sintered body and a porosity A2 inside the sintered body were calculated and also A2-A1 was calculated.

The above calculation results are shown in Table 41.

19.2 Evaluation of Specular Gloss

First, each of the sintered bodies of the respective sample Nos. shown in Table 41 was subjected to a barrel polishing treatment.

Subsequently, the specular gloss of the sintered body was measured in accordance with the method for measuring the specular gloss specified in JIS Z 8741 (1997). The incident angle of light with respect to the surface of the sintered body was set to 60°, and as a reference plane for calculating the specular gloss, a glass having a specular gloss of 90 and a refractive index of 1.500 was used. Then, the measured specular gloss was evaluated according to the following evaluation criteria.

Evaluation Criteria for Specular Gloss

A: The specularity of the surface is very high (the specular gloss is 200 or more).

B: The specularity of the surface is high (the specular gloss is 150 or more and less than 200).

C: The specularity of the surface is somewhat high (the specular gloss is 100 or more and less than 150).

D: The specularity of the surface is somewhat low (the specular gloss is 60 or more and less than 100).

E: The specularity of the surface is low (the specular gloss is 30 or more and less than 60).

F: The specularity of the surface is very low (the specular gloss is less than 30).

The above evaluation results are shown in Table 41.

TABLE 41

| | | Alloy composition | | Evaluation results | |
|---|---|---|---|---|---|
| Sample No. | Ex./Comp. Ex. | E1 | E2 | A2-A1 [%] | Specular gloss |
| 1 | Ex. | Zr | Nb | 3.2 | A |
| 14 | Comp. Ex. | | | 0.3 | E |
| 82 | Ex. | Hf | Nb | 2.9 | A |
| 95 | Comp. Ex. | | | 0.2 | E |
| 131 | Ex. | Ti | Nb | 4.7 | A |
| 140 | Comp. Ex. | | | 0.2 | E |
| 161 | Ex. | Nb | Ta | 1.2 | C |
| 167 | Comp. Ex. | | | 0.2 | E |
| 183 | Ex. | Y | Nb | 4.5 | A |
| 189 | Comp. Ex. | | | 0.3 | E |

TABLE 41-continued

| Sample No. | Ex./Comp. Ex. | Alloy composition | | Evaluation results | |
|---|---|---|---|---|---|
| | | E1 | E2 | A2-A1 [%] | Specular gloss |
| 209 | Ex. | V | Nb | 1.0 | C |
| 215 | Comp. Ex. | | | 0.2 | E |
| 235 | Ex. | Ti | Zr | 0.7 | C |
| 241 | Comp. Ex. | | | 0.3 | E |
| 261 | Ex. | Zr | Ta | 2.3 | B |
| 267 | Comp. Ex. | | | 0.3 | E |
| 283 | Ex. | Zr | V | 2.2 | B |
| 289 | Comp. Ex. | | | 0.3 | E |

As apparent from Table 41, it was confirmed that the sintered bodies corresponding to Example each have a higher specular gloss than the sintered bodies corresponding to Comparative Example. This is considered to be because the porosity near the surface of the sintered body is particularly low, and therefore, light scattering is suppressed, however, the ratio of regular reflection is increased.

What is claimed is:

1. A gear, comprising a sintered body having a composition consisting of:
   Fe is contained as a principal component,
   Ni is contained in a proportion of 2 to 20 mass %,
   Si is contained in a proportion of 0.3 to 5.0 mass %,
   C is contained in a proportion of 0.005 to 0.3 mass %,
   Hf is contained in a proportion of 0.01 to 0.7 mass %;
   Nb in a proportion of 0.01 to 0.7 mass %; and
   Zr in a proportion of up to 0.7 mass %.

2. The gear according to claim 1, wherein when a ratio X1/X2 of a value X1 which is obtained by dividing a content E1 of either Hf or Zr by the mass number of either Hf or Zr to a value X2 which is obtained by dividing a content E2 of Nb by the mass number of Nb is 0.3 to 3.

3. The gear according to claim 1, wherein the sum of the content of either Hf or Zr and the content of Nb is 0.05 to 0.8 mass %.

4. A deceleration device, comprising the gear according to claim 1.

5. A deceleration device, comprising the gear according to claim 2.

6. A deceleration device, comprising the gear according to claim 3.

7. A robot, comprising a power transmission section including the gear according to claim 1.

8. A robot, comprising a power transmission section including the gear according to claim 2.

9. A robot, comprising a power transmission section including the gear according to claim 3.

10. A moving object, comprising a power transmission section including the gear according to claim 1.

11. A moving object, comprising a power transmission section including the gear according to claim 2.

12. A moving object, comprising a power transmission section including the gear according to claim 3.

* * * * *